United States Patent [19]

Kawabata et al.

[11] 4,377,742
[45] Mar. 22, 1983

[54] IMAGE SHARPNESS DETECTING SYSTEM

[75] Inventors: Takashi Kawabata, Kamakura; Kazuya Hosoe, Machida; Nobuhiko Shinoda, Tokyo; Shinji Sakai, Tokyo; Takao Kinoshita, Tokyo, all of Japan

[73] Assignee: Canon Kabushiki Kaisha, Tokyo, Japan

[21] Appl. No.: 151,703

[22] Filed: May 20, 1980

[30] Foreign Application Priority Data

| May 23, 1979 | [JP] | Japan | 54-63377 |
| May 23, 1979 | [JP] | Japan | 54-63378 |
| May 23, 1979 | [JP] | Japan | 54-63379 |
| May 23, 1979 | [JP] | Japan | 54-63380 |
| May 23, 1979 | [JP] | Japan | 54-63381 |

[51] Int. Cl.³ .............................................. G01J 1/36
[52] U.S. Cl. .............................................. 250/204
[58] Field of Search ............... 250/201, 204, 208, 209, 250/211 J, 578, 214 L; 354/25 R, 31 R, 31 F; 357/24, 30, 31

[56] References Cited

U.S. PATENT DOCUMENTS

| 3,944,816 | 3/1976 | Harada | 357/24 |
| 4,176,928 | 12/1979 | Nakamura et al. | 354/31 F |
| 4,203,031 | 5/1980 | Kamachi et al. | 250/201 |
| 4,223,988 | 9/1980 | Jyojiki et al. | 354/25 R |

Primary Examiner—David C. Nelms
Attorney, Agent, or Firm—Toren, McGeady and Stanger

[57] ABSTRACT

Disclosed is an image sharpness detecting system in which an image formed by an image forming optical system is received by an array of a plurality of optical-electronic transducer elements, and an illumination difference in each individual minute compartment of the above-described image is detected on the basis of the concurrently obtained output signal from a corresponding one of the optical-electronic transducer elements, while all the illumination differences are summed up over the entire area of a sensing region of the above-described image, whereby is obtained a signal representing the degree of sharpness of the image on the above-described array of optical-electronic transducer elements. In this system, the signal representative of the illumination difference in each individual minute compartment of the above-described image is at least non-linearly transformed by utilizing the non-linear characteristics for output versus input of a semiconductor element such as a transistor, and the signal representative of the degree of sharpness of the above-described image is obtained on the basis of the non-linearly transformed signal.

86 Claims, 46 Drawing Figures

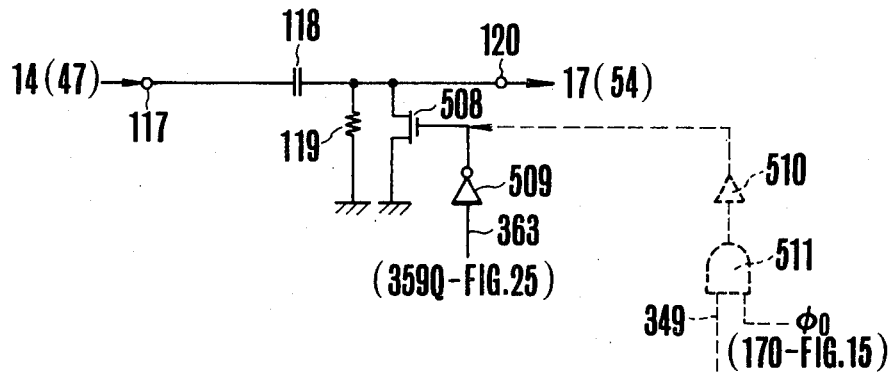
FIG.40
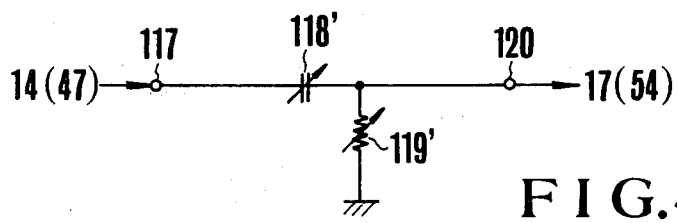
FIG.41
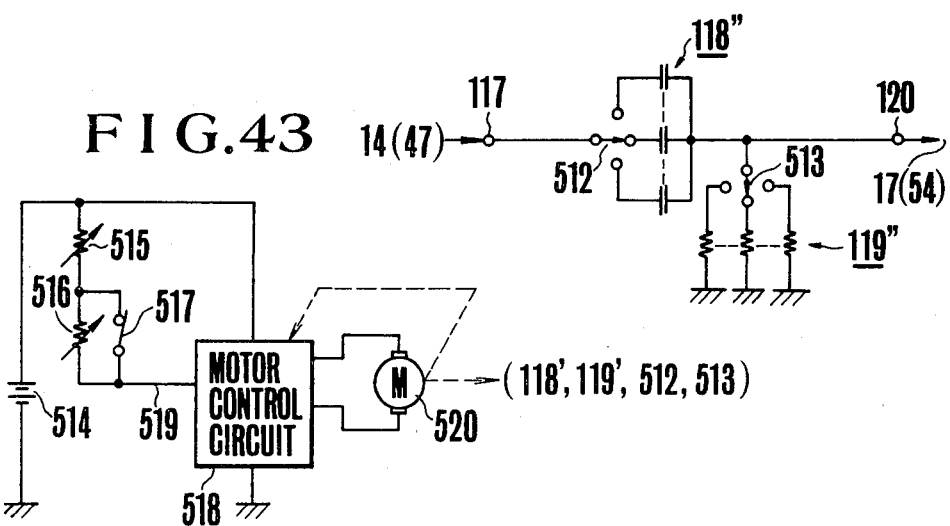
FIG.42
FIG.43

IMAGE SHARPNESS DETECTING SYSTEM

BACKGROUND OF THE INVENTION

1. Field of the Invention

This invention relates to image sharpness detecting systems, and more particularly to such image sharpness detecting system that an image formed by an optical objective lens system is received by an array of optical-electronic transducer elements, and an illumination difference in each individual minute compartment of the optical image is detected on the basis of the output signal from a corresponding one of the optical-electronic transducer elements, while all the illumination differences are summed up over the entire area of an image sensing region, whereby is obtained a signal representing the degree of sharpness of the optical image on the array of transducer elements.

2. Description of the Prior Art

Image sharpness detecting systems of the character described above have already been proposed as the focus detecting system applicable to optical instruments such as photographic cameras. For example, even the assignee of the present patent application also has proposed that an image sharpness detecting device in which as the above-described array of optical-electronic transducer elements use is made of an image sensor known in the form of a photo-diode array, and which operates in such a manner that while an image formed by the above-described optical objective lens system is scanned by that image sensor, a signal representing an illumination difference between two adjacent picture elements to each other in the above-described optical image is obtained on the basis of the scanning signal in the form of an absolute value, and the absolute value signal is integrated over the entire area of detecting region of the above-described image determined by the light-receiving region of the above-described image sensor to produce an output signal representing the degree of sharpness of the above-described optical image is applied to a focus detecting system for use in an optical instrument such as a photographic camera in Japanese patent application Sho 49-36790, now Japanese laid-open patent application Sho 50-129220 (U.S. patent application Ser. No. 563,462 filed Mar. 31, 1975 entitled "System for Exposure Measurement and/or Focus Detection by Means of Image Sensor" by MASHIMO et al. now U.S. Pat. No. 4,047,187 of Sept. 6, 1977 (under reissue application Ser. No. 072,666). The thus proposed focus detecting system is very novel in the point that in stead of using the conventional photo-conductive element such as CdS as the optical-electronic target means, as its development is recently flourishing, the image sensor is utilized in detecting the degree of sharpness of an optical image, and is very superior in the standpoint that since the scanning of the optical image by the image sensor provides a signal accurately commensurate with focus thereof, the sharpest image can be detected with high accuracy.

It is, of course, natural that even such focus detecting system should leave room to be much more improved, for example, with respect to a further increase in the accuracy of detection. For example, as is conventionally well known, in the case of the photo-conductive element such as CdS, when $\gamma \neq 1$ is given, a non-linear input response output characteristic can be obtained, and, by utilizing this non-linear response characteristic it is made possible to detect the image sharpness. On the other hand, in the case of the image sensor, however, as is generally known, the gamma of its optical-electronic transducer element is limited to unity. On this account, after the analogy of the effect of the non-linear response characteristic found with the photo-conductive element such as CdS, as it brings forth a great advantage, therefore, it can be expected from, for example, the system according to the above-described proposal that the accuracy of detection is made to further improve by providing means for non-linear transformation of the signal representative of an illumination difference between the two image compartments adjacent to each other as has been mentioned above.

With the above consideration in mind, the assignee of the present patent application had, as an improvement over the system proposed in the preceding Japanese patent application Sho 49-36789, to propose a focus detecting device in which the above-described signal representative of the illumination difference between the adjacent two image compartments is processed by a non-linear transforming and absolute value deriving circuit as comprising either a square circuit, or a combination of a circuit having the non-linear response characteristic and an absolute value deriving circuit, and the thus transformed signal is then integrated to obtain a signal representative of the degree of sharpness of the image in Japanese patent application Sho 53-92099 (U.S. patent application Ser. No. 059,635, filed July 23, 1979, entitled "Focus Detecting Device" KINOSHITA et al. The thus proposed focus detecting device has achieved a great advance in facilitating a further improvement of the detection accuracy by virtue of the treatment called the non-linear transformation of the illumination difference dependent signal, as will be seen in pursuit of the foregoing description.

As such focus detecting system or device is aimed at application to a small size optical instrument such as a camera, it is particularly of its circuit unit that reduction in bulk and size to compactness owing to as far integration as possible is required. Therefore, for example, the non-linear signal transforming circuit means in the focus detecting device of Japanese patent application Sho 53-92099 as well is necessarily constructed particularly in a simpler form, therefore, of a very low price, while nevertheless more suited to integration-fabricating techniques.

Besides this, there are left ever so many more points to be taken into account. For example, even the above-described image sensor when put into practice gives rise to many problems. A most serious one, for example, arises from the fact that the dynamic range to the radiation incident thereon is very narrow. That is, as far as the commonly available image sensors are concerned, their dynamic ranges are of at most two steps of thereabout in terms of increments of the exposure of the camera. When the incident radiation is of high illumination, therefore, the output is soon saturated, while conversely when the illumination is lowered, the output level is lowered to an extremely small value. Thus, in either case, it becomes no longer possible to obtain a scanning output of appropriate level. This situation is fatal to, for example, photographic cameras and other like instruments which are made to be responsible to a very wide range of brightness. In application of such kind of image sensors to instruments which are required to operate over a relatively wide range of brightness, therefore, a provision for adjusting the integration period, that is, time during which the incident radiation is being accumulated is the indispensable requisite to remarkably extend the apparent dynamic range of the image sensor. That is, the higher the illumination of incident radiation, the shorter the integration period is made to prevent the output from being saturated, and the lower the illumination of incident radiation, the longer the integration period is so that the output level is maintained adequate.

It will now be evident that with the image sensor when used in the camera or instrument of requiring an ability to be responsible over a very wide range of brightness, a great advantage can be expected from the adjustment of the integration period, and we have thus reached the conclusion that sufficiently wide an apparent dynamic range can be assured. On the other hand, however, we have found that alternative problems such as those described in the following become felt unavoidable. One of them will be encountered when the above-described integration period is set to an extremely long value. That is, as is well known, the output from the image sensor is necessarily included with a background noise such as dark current. Therefore, as the integration period becomes longer, the proportion of the noise signal is rapidly increased with rapid lowering of the S/N of the output obtained. Another problem is that, as the instrument is subjected to vibratory motions, for example, the camera is usually hand-held, when the integration period is long, the so-called "hand-shake" takes on an appreciable role in deteriorating the image scanning signal from the image sensor to a large extent, and in an extreme case it becomes impossible to obtain the signal accurately corresponding to the imaging pattern. In case where the requirement for accuracy of detection is very rigorous as in the above-described focus detecting device, therefore, when in such situations, the satisfactory detecting operation can no longer be carried out. (It is said that when the ordinary photographic camera is shot with setting of the exposure time to a longer value than 1/30 second while being hand held, the influence of "hand-shake" becomes prominent, thus leading to take blurred pictures.) Therefore, the range of variation of the integration period which is to be set in the image sensor cannot, under consideration particularly of the problem described just above, be extended up to excessively longer values however necessary it is. Thus, it is practically unavoidable to set forth a considerably large limit on the dynamic range for the incident light of low brightness.

Also as to the control of the integration period of the image sensor, it would appear to be advantageous at a glance that, for example, the level of video signal is compared with the prescribed reference level with the result that the integration period is either elongated, or shortened. But, this control method has been proven not to be so much efficient as to sufficiently eliminate a drawback that the video signal level fluctuates as there are variations in the electrical characteristic of the image sensor and/or the readout channel for the photo-signal thereof, or as the ambient temperature fluctuates. Even in this regard, therefore, a more advantageous way in which the integration period of the image sensor is controlled is eagerly looked for.

Another problem arising from the application to, for example, a camera is that as many photographic situations may be encountered where the field of view of the focus detector includes in addition to a subject of principal focus detecting interest, a minor subject which though lying at a relatively small angle with the sight to the principal subject is located in so long or so short a distance from the latter that a de-focused image of the minor subject is formed despite the formation of a sharp image of the subject of principal interest, there is a high possibility of the de-focused image of the minor subject to affect the in-focus condition of the image of the principal subject, thereby it being made difficult to perform accurate detection of sharp focus. This possibility will not be reduced to an acceptable level even by limiting the effective area of the imaging region of the optical-electronic transducer element array in the image sensor to a relatively small value.

Still another problem arises from, for example, the fact that, as it usual in the conventional type of focus detecting system or device, the electrical signal representing a focus condition of the image (that is, in the case of the above-described focus detecting system or device, the signal representing an image sharpness, i.e. focus detecting signal) is produced in analogue form. Particularly with consideration of requirements for improvement of the detecting ability and fabricating the circuit system in the integrating or digitalizing form, it is strongly desired that the detection signal which would be otherwise obtained in such analogue form is taken out in a digital form with high accuracy by a very easy way and using a very simple structure of circuits.

SUMMARY OF THE INVENTION

With the foregoing in mind, the present invention has been worked out, and its main subject to be solved is to provide a novel image sharpness detecting system which can sufficiently fulfill all the above-described requirements and has overcome the all the above-mentioned conventional drawbacks.

That is, a first object of the present invention is to provide an image sharpness detecting system in which an image formed by an objective optical system is received by an array of a plurality of optical-electronic transducer elements, and the concurrently obtained output signal from said optical-electronic transducer elements is processed to detect an illumination difference in each individual minute compartment of said image, while all the illumination difference are summed up over the entire area of the detecting region for the above-described image, thus producing a signal representing the degree of sharpness of said image on the above-described optical-electronic transducer element array, whereby a signal representing the illumination differences in the individual minute compartments of the above-described image is non-linearly transformed, and to accomplish this non-linear transformation, preferably, non-linear and absolute value transformation by providing circuit means of very simple structure, at an extremely low price, and, preferably, more suited for fabrication in integrating form.

To this end, according to the present invention, it is proposed that at least the non-linear transformation of the above-described illumination difference dependent signal is carried out by utilizing the non-linearity of output versus input response of a semi-conductor element such as a transistor. That is, for example, field effect transistors (FET) have second-power characteristics for output versus input response. By utilizing this second-power response characteristic of FET, therefore it is made possible to easily accomplish the non-linear transformation of the above-described illumination difference dependent signal. In this case, an additional advantage can be expected that the construction of the transforming circuit becomes simpler and can take a very inexpensive form, and particularly when this FET is selected from those of MOS structure, as the resulting circuit is made more suitable for integration, the fabrication of circuits in the integrating form can be further facilitated. It is also possible to utilize this second-power response characteristic of FET with so high efficiency that not only the non-linear transformation but also absolute value transformation of the illumination difference dependent signal can be easily accomplished by a circuit of very simple construction, as will be seen from embodiments to be described later.

In a preferred embodiment of the present invention to be more fully described later, it is further proposed that the above-described semi-conductor element is arranged to operate in such a manner that its output is maintained almost zero until the input reaches a prescribed level, and, speaking in connection with the above-mentioned example of use of an FET, that its source potential is adjusted so that its output remains almost zero until its input reaches a prescribed level. This arrangement is very advantageous in facilitating a further improvement of the detection accuracy as the noise signal generated in the optical-electronic transducer elements and the following stage of illumination difference detecting circuit is suppressed.

A second object of the present invention has, particularly despite the fact that when an image formed by an objective optical system is scanned by an image sensor having an array of a plurality of optical-electronic transducer elements to obtain a time-sequential scanning signal for that image, the dynamic range of the image sensor is extended by adjusting the integration period thereof, to eliminate the otherwise resulted drawbacks, that is, the above-mentioned drawbacks resulting particularly from the elongation of the integration period, and to provide a novel and more advantageous image scanning system in which even when the illumination of the image on the image sensor is very low, it is possible to obtain a scanning signal of necessary and sufficient level without causing the integration period to be so much elongated.

To this end, according to the present invention, an advantageous form of image scanning system is proposed in which, since the above-described array comprises a great number of optical-electronic transducer elements, the outputs from the transducer elements are integrated for every desired number of consecutive elements to obtain a signal which leads to vary the level of the above-described scanning signal.

That is, according to such image scanning system of the present invention, for example, in the above-described array of optical-electronic transducer elements, every two, or, three, or four, . . . , consecutive optical-electronic transducer elements are combined to obtain an added signal of the outputs from the transducer elements, thus increasing the level of the scanning output, in simple calculation, two, three, or four, . . . , times as large. Therefore, even when the illumination of the image is very low, it is possible to obtain a scanning signal of necessary and sufficient level without causing the integration period to be so much elongated, thus effectively eliminating the drawback which would be otherwise resulted from the extension of the dynamic range of the image sensor by adjusting the integration period, that is, the drawback that the S/N of the scanning signal is deteriorated by increasing the integration period, or the scanning signal itself is deteriorated by introducing "hand-shake", and giving a great advantage that a good scanning signal of always high S/N and accurately commensulate with the imaging pattern can be obtained.

The feature of such image scanning system which is considered to be characteristic of the present invention is that, according to a preferred embodiment of the present invention to be more fully described later, the above-described image sensor is provided with adding means for adding the outputs from the image sensor, and sample and hold means for sampling and holding the output of the adding means, whereby the level of the scanning signal obtained through the sample and hold means is varied by varying the resetting period of the adding means and the sampling period T of the sample and hold means based on the formula: $T = nt$ (where t is the period of output of each signal of the above-described optical-electronic transducer elements and $n = 1, 2, \ldots$). According to another embodiment, as the image sensor, use is made of a voltage output type charge transfer image sensor, and this image sensor is provided with sample and hold means for sampling and holding the output of the image sensor, whereby the level of the scanning signal obtained through the sample and hold means is varied by varying the period of charge resetting signal fed to the image sensor and the sampling period T of the sampling and holding signal based on the formula $T = nt$ (where t is the period of the charge transfer signal fed to the image sensor, and $n = 1, 2, \ldots$). According to still another embodiment, as the image sensor use is made of a voltage output type charge transfer image sensor having incorporated therein a charge-to-voltage converter and sample and hold means for sampling and holding the output of the converter, whereby the level of the scanning signal produced from the image sensor is varied by varying the period T of a charge reset signal fed to the converter and a latch signal fed to the sample and hold means based on the formula: $T = nt$ (where t is the period of a charge transfer signal fed to said image sensor at a charge transfer portion thereof, and $n = 1, 2, \ldots$). Any of these embodiments is very advantageous in that the conventionally known image sensor can be utilized without any further modification, and the addition of a circuit of simple construction is sufficient in putting it into practice.

In the illustrated embodiments, the above-described number of selected optical-electronic transducer elements for addition of their outputs together is automatically controlled in accordance with the level of obtained scanning signal. Besides this, it is advised that a light-measuring element is provided in separation from the image sensor, and the control is made on the basis of the output thereof.

It should be pointed out that such image scanning system of the invention may be used in combination with a conventionally known means for adjusting the integration period, thereby it being made possible to remarkably extend the dynamic range of the image sensor than was possible in the prior art, and to achieve a very high utility thereof.

A third object of the present invention has, despite the control of the video signal level by varying the integration period of the above-described image sensor, to eliminate all the drawbacks resulting, for example, from the variations of the electrical characteristics of the image sensor itself and/or the photosignal readout channels, and the fluctuation of the video signal level due to the variation of the ambient temperature, and to provide a more advantageous control method.

To this end, according to the present invention, it is proposed that as the video signal level it compared with a prescribed reference level with the result that the integration period of the image sensor is adjusted to control the video signal level, the reference level is established thorugh an intermediary of the readout channel for the output signal from the optical-electronic transducer elements in the image sensor, or an equivalent electrical means thereto.

Such arrangement assures that even when there are the variations in the electrical characteristics of the image sensor itself and/or thereabout channel means for the output signal therefrom, the reference level is made of itself in the form of taking into account the variations, and, therefore, a high stability of the control of the video signal level becomes possible. In addition thereto, it is also possible to cancel the change in the level which is caused by the fluctuation of the ambient temperature. These features have achieved a technical advance so that the interval of reading out the video signal can be controlled in accordance with the comparison of the video signal level with the reference level and particularly with the use of a solid-state image pick-up device such as CCD, BBD, or CID, as the time during which the radiation induced charge is being accumulated can be properly controlled, the level of the video signal can be etabilized throughout the wide range of variation of the brightness.

It is to be noted that this method is applicable not only to the image sharpness detecting system but also to a wide variety of optical instruments employing image sensors, for example, image-pick-up devices, light measuring devices and the like.

Particularly in connection with the above-described problem of temperature compensation, it should be pointed out that there are other methods to solve this problem, and that, according to embodiments to be more fully described later, the output of a temperature sensitive element is utilized in controlling the level of the video signal in a direct relation to the temperature, or the non-linear response characteristic of the above-described non-linear transforming means is adjusted in accordance with the temperature. These methods have been proven to be very advantageous in the system of the present invention.

A fourth object of the present invention has, since the system for detecting a sharp focus of the objective optical system by an area-imaging array of a plurality of optical-electronic transducer elements and by processing the output signal from the optical-electronic transducer elements to obtain a signal representing all the focus conditions each in a corresponding one of the minute compartments of the image formed by the optical system may encounter a photographic situation where the subject of principal interest and the minor subject though both lying in the field of focus detection are separated by a great distance from each other, to satisfactorily eliminate the already mentioned drawback that the entrance of a portion of the defocused image of the minor subject into the effective area of the image receiving region of the optical-electronic transducer element array leads to generate a noise signal which complicates the detection of in-focus condition of the principal subject, whereby a sharp focus of the principal subject can be detected always with high accuracy regardless of the presence of such minor subject.

To this end, according to the present invention, it is proposed that the outputs from the above-described optical-electronic transducer elements in the effective area of the image-receiving region each representing the focus condition of a corresponding one of the minute compartments of the image are weighted to different values depending upon the different locations of the image compartments. That is, according to such improvement of the present invention, with the consideration in mind of, for example, the fact that the possibility of the bad influence due to the de-focused image of the minor subject to take place in a marginal portion of the effective area of the image-receiving region of the optical-electronic transducer element array, the outputs from those of the optical-electronic transducer elements which occupy a central area of the image-receiving region are more highly weighted than the other outputs representing the focus conditions of the margin of the focus detecting field, so that the above-described bad effect of the de-focused image of the minor subject can be suppressed to a minimum by a suitable later electrical treatment thereof. Therefore, since the noise signal produced by the de-focused image of the minor subject with a portion thereof entering the effective area of the image-receiving region is made negligible with high reliability, it is made possible to achieve the assurance of an always improved accuracy of detection of the focus condition of the subject of principal interest regardless of the fact that such minor subject lies within the field of focus detection.

In putting such feature of the invention into practice, it is preferred that whilst the outputs from the above-described optical-electronic transducer elements are processed to detect limitation shifts between the consecutive two compartments of the above-described image which then provide a signal representing the focus condition of each image compartment, as this signal is non-linearly transformed by a circuit, the operative input level of the non-linear transformation circuit is caused to vary with variation of the location of the readout one of the image compartments in the effective area of the image-receiving region of the optical-electronic transducer element array so that the signal representative of the focus conditions of the individual image compartments is differentiated in weight with the different locations of the image compartments in the effective area of the image-receiving region. In this case, it is made possible that, as will be also shown in the embodiments to be more fully described later, the above-described non-linear transforming circuit takes a form of, for example, a circuit utilizing the square output-versus-input response characteristic of the field effect transistor (FET) and arranged so that the operative input level is varied to suit differing weights by correspondingly adjusting the source potential of that FET, thereby giving an advantage that the construction and arrangement of the circuit becomes very simple and of low price, while nevertheless more suited for fabrication in the integrating form, to accomplish the above-described object with ease.

It is also to be noted that another drawback akin to the above-described drawback resulting from the entrance of the de-focused image of the minor subject into the effective area of the image-receiving region will be probably resulted from, for example, a fact that as the circuit means for detecting the illumination difference in the individual minute compartments of the above-described image, use is made of condenser(s) and register(s) constituting CR differentiation circuits. If the differentiation time constant of the circuit is relatively large, its history phenomenon affects the signal so that, for example, as the above-described non-linear transformation circuit produces a signal, when to integrate only the part of the signal which corresponds to a predetermined effective field portion within the image format by the integration circuit or the like, the other signal part corresponding to the outside of this effective field area and which is to serve as a noise signal is caused to migrate into that signal part to be integrated. Therefore, this leads but to produce a drawback that when we limit ourselves to the subject of principal interest, it becomes difficult to detect the sharp focus of its image with improved accuracy and reliability.

With regard to this point, according to a preferred embodiment of the invention to be more fully described later, an advantageous arrangement of the above-described differentiation circuit is proposed in which it is reset, or rendered inoperative except for the interval during which the part of the signal which corresponds to the above-described effective field portion is being readout, thereby such drawback is satisfactorily eliminated.

A fifth object of the present invention is, since the systems for detecting a sharp image such as those described above require a signal processing, to provide a more advantageous and novel signal processing which enables the detection signal which would be otherwise obtained in analogue form to be produced in digital form by a very simple way and by circuits of simple construction suited for the integrating form of fabrication.

To this end, according to the present invention, one form of the signal processing is proposed where the electrical signal representing the focus condition of the above-described image is caused to damp at a prescribed time dependent damping factor to a predetermined level during an interval which is used to specify the focus condition of the image. That is, according to such signal processing of the present invention, for example, pulses of predetermined frequency are being counted during the time interval from the moment at which a damping of the electrical signal has been initiated to the moment at which the magnitude of that electrical signal reaches the above-described predetermined level, whereby the number of pulses thus counted is possible to provide a digital value by which the degree of focus of the image can be accurately defined.

In connection with a practical example of application of such signal processing of the invention it should be explained that, when in the system for detecting the focus of the image formed by the objective optical system on the array of a plurality of optical-electronic transducer elements (for example, image sensor) by detecting the illumination differences in the individual minute compartments of that image on the basis of the outputs from the optical-electronic transducer elements followed by integrating the illumination differences over the entire area of the detecting region for the image, as the integration circuit produces an output which is taken as an electrical signal representing the focus condition of the image, it is proposed that as the above-defined integration circuit employment is made of a dual-slope integrating type analogue-to-digital converter with a capacitor arranged to be charged and discharged. When in the first slope, charging of the capacitor is utilized in obtaining the total sum of the illumination difference in the form of an analogue signal, that is, the electrical signal representative of the focus condition of the image. Then, the second slope (discharging of the capacitor) is utilized in damping that analogue signal at the prescribed time dependent damping factor, whereby the time interval from the moment at which the damping is initiated to the moment at which the prescribed level is reached is found to determine the number of pulses of constant frequency counted, thus converting the analogue signal to a digital signal. This enhances the usefulness of the so-called dual-slope integrating type converter, and gives a great advantage to the signal processing in this kind of system for detecting the degree of focus of image.

These and other objects, features and advantages of the present invention will become apparent from the following detailed description of embodiments thereof when reference is made to the accompanying drawings.

BRIEF DESCRIPTION OF THE DRAWINGS

In the following, preferred embodiments of the present invention will be explained by reference to the drawings in which:

FIG. 40 is a circuit diagram of an example of variation of the differentiation circuit of FIG. 11.

FIGS. 41 and 42 are circuit diagrams of two other different examples of variation of the differentiation circuit of FIG. 11.

FIG. 43 is a circuit diagram of an example of a device for use in adjusting the differentiation time constant of the differentiation circuit of FIGS. 41 and 42.

DETAILED DESCRIPTION OF THE PREFERRED EMBODIMENTS

Figure 1:
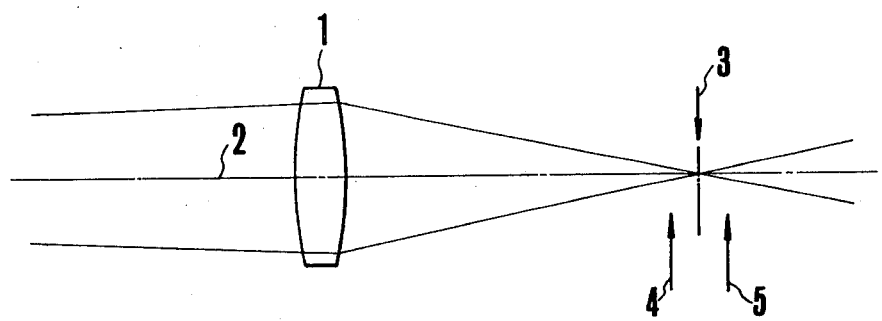
FIG. 1 is a schematic view of an objective optical system considered to explain focus conditions of an image formed thereby.

Referring first to FIG. 1, there is shown a diagram of geometry considered to define three different focus conditions of an image formed by an objective optical system 1 along an optical axis 2 thereof. A real image of an object (not shown) is intended to be focused at a plane 3 by the lens 1. Now suppose two additional focal planes 4 and 5 lie forwardly and rearwardly of the point of position 3 in equal distances to each other respectively, when the sharp focus of the image is attained at the position 3, the focus conditions of the image, particularly the degrees of focus of the image at the planes 4 and 5 will be found to be almost identical or equal to each other (not exactly equal because the actual lens has some spherical aberration, chromatic aberration and the like). If the plane of sharp focus is shifted toward the plane 4, the sharpness of the image at the plane 4 becomes higher than that at the plane 5. Conversely when the sharp image is formed at a plane nearer to the plane 5, the image sharpness at the plane 5 becomes higher than that at the plane 4. On the basis of this fact, it is possible to measure the degree of focus of the image at the plane 3 as the standard one provided that whatever device is used to compare the sharpness of the image at the planes 4 and 5 with each other. Further, when to put such measuring arrangement into practice, as the plane 3 is made equivalent to a prescribed focal plane which the surface of film in a photographic camera, or the image-receiving surface of a pick-up tube is intended to occupy, the conjugate positioning of the planes 4 and 5 makes it possible for the comparison of the image sharpnesses at these planes to indicate the direction in which an adjustment must be made to bring the image into focus, and therefore to detect when a condition of sharpest image at the prescribed focal plane is reached, as focusing of the lens 1 on the object is being performed.

Figure 2:
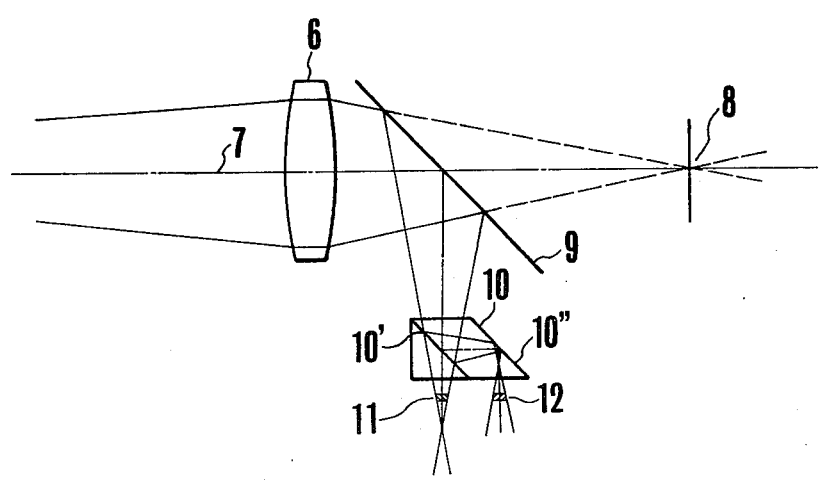
FIG. 2 is a schematic view showing an example of construction and arrangement of an optical system with optical-electronic targets for detecting the degree of focus of the image formed by the objective of FIG. 1.

In FIG. 2, on the basis of the concept described in connection with FIG. 1 there is shown an example of construction and arrangement of an optical system which deflects a portion of the light from an image forming lens 6 to a pair of image sensing means 11 and 12. 8 is a prescribed focal plane of the lens 6 at which, for example, in the case of a camera or the like, the film surface or image-receiving surface is arranged. A half-mirror 9 is positioned in a space between the lens 6 and the prescribed focal plane 8 and disposed to split a portion of an image forming light beam from the lens 6 by reflection to a split prism 10 where it is further split into two parts by a half-mirror 10' provided therein. 10" is a total reflection surface. The image sensing means 11 and 12 are positioned behind the split prism 10 at such locations that their image-receiving surfaces are spaced from the conjugate plane to the prescribed focal plane 8 forwardly and rearwardly respectively by equal distances to each other. Though the image sensing surfaces 11 and 12 appear to occupy one and the same plane, as the light beam portion split off by the half-mirror after having been further split into two parts when in passing through the prism 10 are caused to take respective optical paths whose lengths are adequately differentiated from each other, this light arrangement establishes an equivalent relationship as if the above-described two image sensing means 11 and 12 were arranged at the positions 4 and 5 of FIG. 1. Hence, when focusing of the image forming lens 6 is being performed, the image sensing means 11 and 12 produce signals each representing the focus condition, particularly the sharpness of a corresponding one of the images formed thereon. Upon electrical reading out of these signals in comparison, therefore, whether the sharp focus lies at the prescribed focal plane 8, or to either of the front and the rear thereof can be discriminated.

Figure 3:
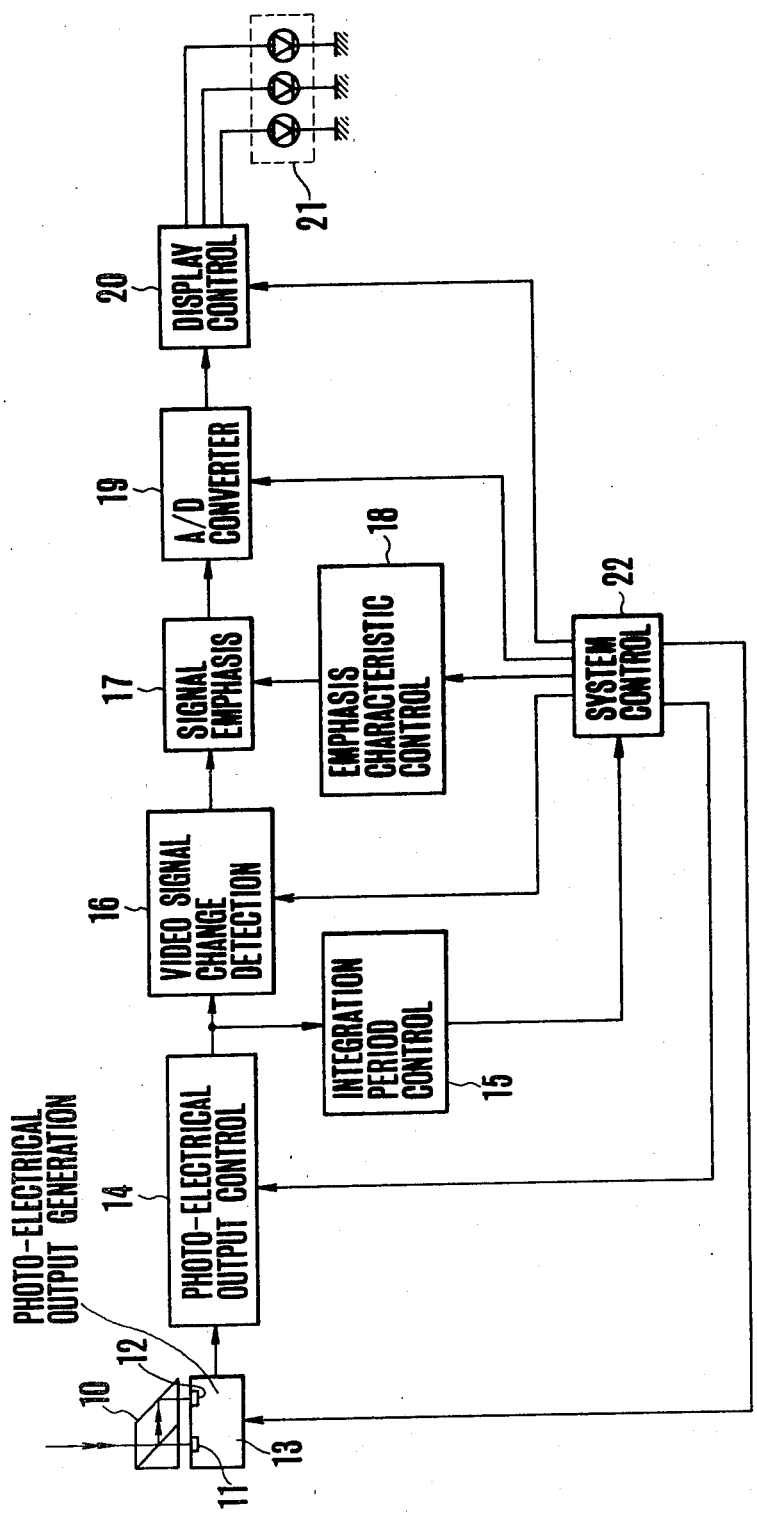
FIG. 3 is a block diagram showing an outline of one embodiment of a circuit system according to the present invention as adapted to detect the image focus by utilizing the optical system of FIG. 2.

FIG. 3 shows a general embodiment of the present invention as adapted to process the photo-signals from the image-sensing means 11 and 12 in detecting the degree of focus of an image formed on the prescribed focal plane 8 by the lens 6. In the figure, 10, 11 and 12 respectively denote the above-described light beam splitter or prism and image-sensing means. These image sensing means 11 and 12 are here assumed each to be constructed in the form of a charge transfer device such as CCD, BBD, or photo-diode array (MOS image sensor) having, for example, a plurality of optical-electronic transducer elements in an array and having a function of reading out the photo-signals from the individual elements in time-sequential manner. These are generally indicated at 13 for a photo-signal generation block. The output of the photo-signal generator 13, that is, a signal of time sequence of the photo-signals from the individual optical-electronic transducer elements is fed to a photo-electric output control block 14 for level control and sampling and holding of the signal. The term "level control" herein used means that, as will be more fully described later, responsive to a control command from a system controller 22, it forms an added output of a number of optical-electronic transducer elements, thus enabling the production of outputs of different level selectively for the image of one and the same illumination. Such function of the photo-electrical output control block 14 provides a time-seriated an output signal representing an illumination distribution of the image. This signal is hereinafter referred to as "video signal". The level of the video signal is controlled by the above-described photo-electrical output control block 14, but it is also controlled by adjusting the time during which the image illumination induced charge is being stored (hereinafter referred to as "integration period") in each individual optical-electronic transducer element. In general, the above-described MOS image sensor and charge-coupled-device, as is well known in the art, are characterized by having a function of storing the photo-signals, that is, radiation produced charges in the individual sites of the optical-electronic transducer elements for a predetermined time, and then stepping out them. In the present invention, it is preferred to use such semi-conductor device as the image sensing means. This integration period is required to be controlled in accordance with the brightness of an object (not shown) so that the video signal always takes a proper level. Therefore, in this embodiment, the output of the photo-electrical output control block 14 is routed to an integration period control block 15, thereby the above-described requirement is fulfilled. On the other hand, the output of the photo-electrical output control block 14, that is, the video signal, is directed to a video signal change detection block 16 where information of the sharpness of the image is extracted therefrom. This detection block 16 in practice, as will be described more fully later, comprises a differentiation circuit, or a combination of a delay circuit and a difference amplifier circuit. The output of the video signal change detection block 16 represents an alternating-current component of the video signal with exclusion of a direct-current component thereof. The higher the image sharpness, the larger the amplitude of the alternating-current becomes. In order to emphasize the larger amplitudes to the further more, while suppressing the smaller ones to the further less, there is provided a signal emphasis block 17. The output of the signal emphasis block 17 is, therefore, extremely susceptible to the degree of image sharpness. That is, as the image sharpness is increased with increase in the level difference between the illuminations in the light and dark areas of the image, the amplitude of the alternating-current is increased acceleratedly by the signal emphasis block 17. Conversely when the image sharpness is lowered with decrease in the amplitude of the alternating-current component, the alternating current component is suppressed. As a result, the higher the image sharpness, the more steeply the output of the signal emphasis block 17 is increased. 18 is an emphasis characteristic control block for controlling the parameters of the signal emphasis block 17 so that the input level of the signal to be emphasized is varied, or the order of emphasis effect is varied depending upon the position of a corresponding one of the optical-electronic transducer elements in the image-receiving region of the image sensing means 11 and 12. 19 is a dual integration block for integrating and reverse-integrating the output of the signal emphasis block 17 over the entire area of a predetermined image-receiving region. The principal function of this integration block 19 is that the video signal corresponding to the image receiving region (hereinafter referred to as "field") of each of the image sensing means 11 and 12 after having been processed until the signal emphasis block 17 is integrated, and then the integrated value is converted to, for example, a corresponding digital value by carrying out the reverse-integration from that value at a predetermined time dependent damping rate. This function is performed for every one of the image-sensing means 11 and 12 in sequence with the signals obtained by processing the video signals each corresponding to one of the images on the two image-sensing means 11 and 12 until the signal emphasis block 17. The output of block 17 is fed to a display control block 20.

Since the above-described integration value is, as will be understandable from the foregoing explanation, dependent on the degree of focus of a corresponding one of the images in the fields of the image-sensing means 11 and 12, the outputs of the dual integration block 19 for the fields of the image-sensing means 11 and 12 are compared with each other in the display control block 20 to produce an output which is then applied to indicator means 21 having three indicators such as LED's (light emitting diodes), whereby it is made possible not only to see when the image is in sharpest focus on the prescribed focal plane 8, but also to see when the image is not in focus along with the indication of the direction in which an adjustment must be made to bring the image into focus. The video signal generating and processing blocks have special coordinating controls in a block 22. The construction and arrangements of the various blocks and their operation will next be explained in detail by reference to the drawings.

Figure 4:
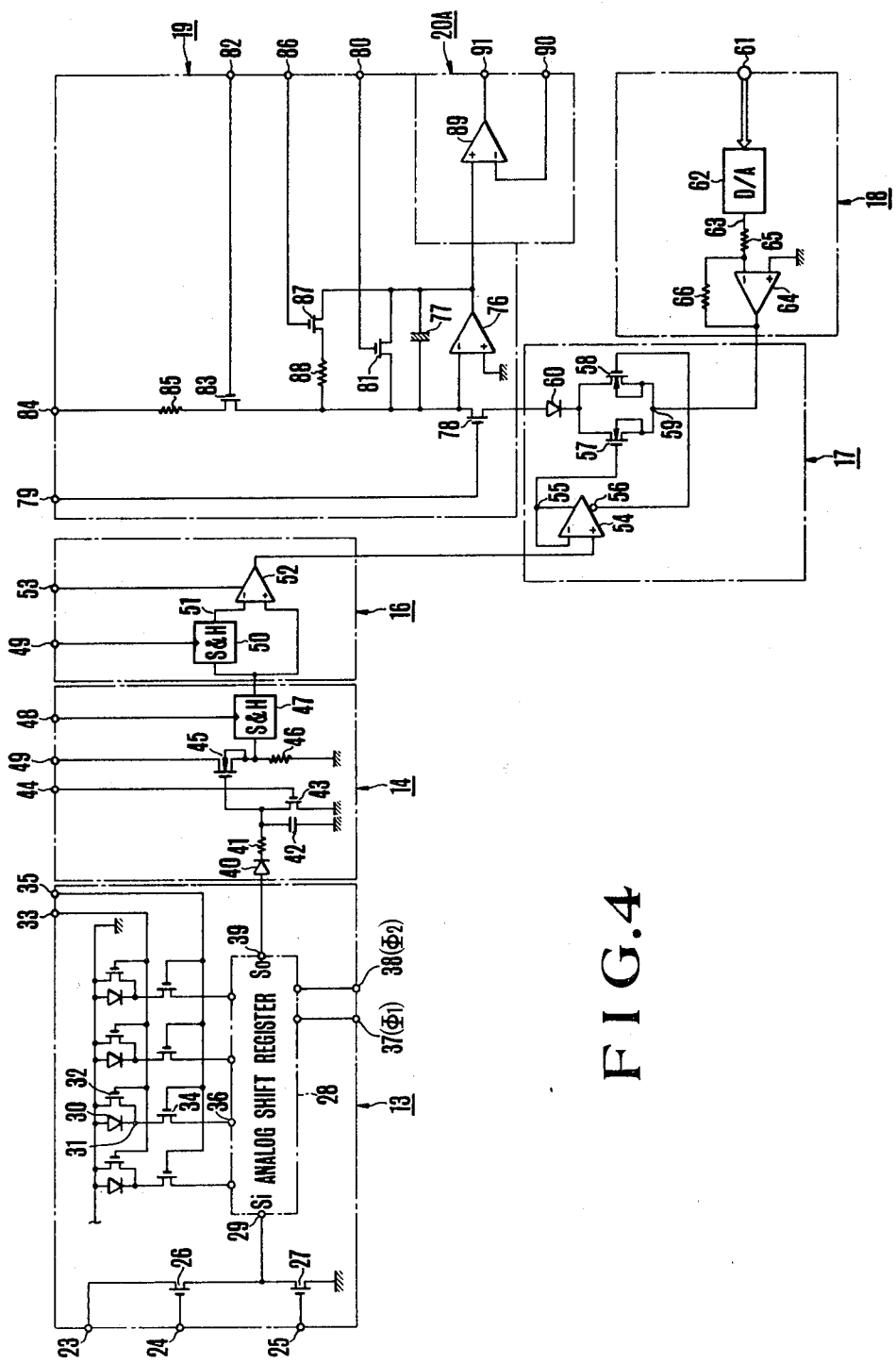
FIG. 4 is an electrical circuit diagram, partly in block form, of the system of FIG. 3 mainly with the analogue circuits being shown in detail.

First reference is made to FIG. 4 where out of the various portions of the system of FIG. 3 there are shown the photo-electrical output generation 13, photo-electrical output control 14, video signal change detection 16, signal emphasis 17, emphasis characteristic control 18 and dual integration 19, and further a portion of the display control 20 in detail within respective individual dot-and-dash line blocks denoted by the same reference numerals as those in FIG. 3. Beginning with the photo-electrical output generation block 13, its control terminals 23, 24 and 25 and FET (Field Effect Transistor) switches 26 and 27 have a function of giving a controlled input to an analogue shift register 28, or CCD, or BBD of identical function thereto at a series input terminal 29 thereof. In more detail, the terminal 23 is receptive of a predetermined reference voltage, the terminal 25 of zero setting, and the terminal 24 of full setting. Upon appearance of a high voltage at the zero setting terminal 25, the FET switch 27 is turned on, thereby the above-described series input terminal 29 is grounded to the circuit earth, thus giving a minimum reference level for the output of the photo-electrical transducer elements to be described later. Also upon appearance of a high voltage at the full setting terminal 24, the FET switch 26 is turned on, thereby the reference voltage input terminal 23 to which a reference voltage set in correspondence with the maximum output voltage of the optical-electronic transducer elements, and the series input terminal 29 are short-circuited to give the analogue shift register 28 a reference corresponding to the maximum level of output of the optical-electronic transducer element. A plurality of independent optical-electronic transducer elements included in the image sensing means 11 and 12 are indicated at 30, each of which has such structure that responsive to light incident thereon, produces a charge or voltage at a respective site between a point 31 and ground GND by its photo-electric conversion function, and then holds or stores it by its junction capacity or wiring capacity. On the other hand, each of all the optical-electronic transducer elements is provided with a FET switch 32 for making releasable the holding or storage of the charge or voltage thereon. The above-described holding and storage can be released by setting a common control terminal 33 (hereinafter called "anti-blooming gate terminal") to HIGH to turn all the FET switches 32. In more detail, with the optical-electronic transducer elements 30 connected at their anodes to ground GND as shown in the figure, it is at the points 31, namely, the cathode thereof, that the brighter the illuminance, the higher the voltage is produced. The optical-electronic transducer elements 30 are further provided with respective FET switches 34 each between the cathode of a corresponding one of the elements 30 and a corresponding one of parallel input terminals 36 of the analogue shift register 28, while all the gating control inputs of the FET switches 34 are connected to a common terminal 35 (hereinafter called "shift gate terminal"). When this terminal 35 is rendered HIGH, the photo-electrical outputs from the individual optical-electronic transducer elements 30 are taken through the parallel input terminals 36 in the analogue shift register 28.

The analogue shift register 28 is a one-way transfer device having the above-described series input terminal 29 and parallel input terminals 36 and responsive to two-phase clock pulses or input clock pulses ($\Phi_1$) and output clock pulses ($\Phi_2$) applied through terminals 37 and 38 respectively for producing an analogue signal at a series output terminal 39. This is equivalent to a solid state image sensing device such as CCD or BBD, and in some cases includes the above-described parts 30, 32 and 34 to call it CCD.

Next 14 is the above-described photo-electrical output control circuit receptive of the time-sequential video signals from the analogue shift register 28 for controlling the level of these signals and having such construction that the time-sequencial outputs from the series output terminal 39, that is, the output charges or voltages from the individual optical-electronic transducer elements 30 are converted by a diode and a resistor 41 to charges or currents which are added on a condenser 42 in the form of a voltage. It is noted that if the charges only can be correctly transferred, the diode 40 and resistor 41 may be omitted. The condenser 42 is arranged to be reset for each cycle of addition when a FET 43 is turned on by rendering of HIGH at its control input terminal 44. The added result on the condenser 42 is transmitted through a source-follower circuit of a FET 45 and a resistor 46 to a sample and hold circuit 47. The sample and hold circuit 47 serves to prevent the output of the resistor 46 in the form of a potential from being lowered to zero volt at the time of transit of the above-described addition, that is, when the terminal 44 of the FET switch 43 is at HIGH, therefore, the FET switch 43 is ON. The above-described sample and hold circuit 47 responsive to LOW at its control terminal 48 produces a hold value, and responsive to HIGH at the terminal 48 samples the next new signal. 49 is an electrical power source terminal for the FET 45.

It should be pointed out that the foregoing discussion of the photo-electrical output generator 13 and the photo-electrical output control circuit 14 has been conducted as if they were separate devices in the present embodiment, but the provision of the latter in the form independent of the photo-electrical output generator 13, that is, as an external circuit is made in the case of the MOS image sensor, or the floating gate type charge transfer device. In the case of the so-called voltage output type charge transfer device, however, the photo-electrical output control circuit may be fabricated in unison with the photo-electrical output generator 13, or the other part of the photo-electrical output control circuit than the sample and hold circuit 47 may be fabricated along with the latter in the form of unity. In any case, its function, basic construction and arrangement, and connecting relationship are not different from those illustrated here, and in all cases the signal processing method of the present invention can be employed.

Next 16 is the above-mentioned video signal change detector for extracting change with time of the time-sequential signals representative of the illuminances on the above-described individual photo-electric elements 30, that is, illuminance difference with position of the individual optical-electronic transducer elements 30. That is, 50 is a sample and hold circuit having a function of continuing the production of a sample signal which is to be renewed when the terminal indicated at 49 is of HIGH after the terminal 49 has once become LOW until becomes HIGH again from its output terminal 51 so that its output signal is maintained at an equal level to that of the output signal of the above-described sample and hold circuit 47 at the preceding time therefrom.

With this, the output signal from the above-described sample and hold circuit 47 is sampled and held at a certain point in time by the sample and hold circuit 50, and then the subsequent change of the output signal from the sample and hold circuit 47 is caused to produce across the two inputs of a difference amplifier circuit 52 having an output which corresponds to a difference of image illuminance. A terminal indicated by 53 is to control the output of the difference amplifier 52 in such a manner that only when HIGH signal is applied to said terminal 53, production of the output from the difference amplifier 52 is permitted, otherwise that output is suppressed to zero. An advantage is that the bad influence of the transient characteristics of the outputs due to the above-described sample and hold circuits 47 and 50 and other circuits is removed by masking in timed relationship through the terminal 53, thereby a stabilized signal is produced at the output terminal of the difference amplifier 52.

Figure 5:
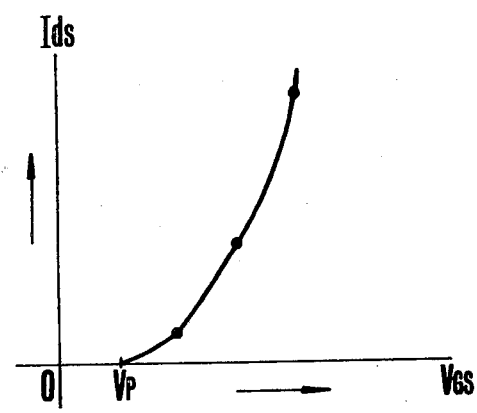
FIG. 5 is a graph showing an output-versus-input response characteristic of the field effect transistor.
Figure 6:
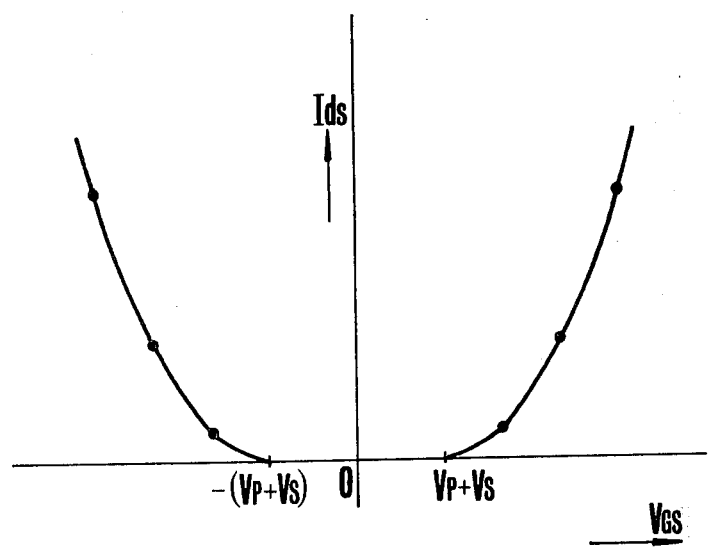
FIG. 6 is a graph showing an output-versus-input response characteristic of a pair of field effect transistors arranged to perform a non-linear and absolute transformation of an input signal.

Next 17 is the above-described signal emphasizer for the output of the video signal change detector 16 or the output signal of the difference amplifier 52 to carry out absolutization, suppression or emphasis of signal, and the like treatment to convert it to a current information suited for the integration portion to be described later. That is, 54 is a difference output type operational amplifier with a positive-going output indicated by 55 connected to the inversion input terminal of the same amplifier 54 so that the positive-going output 55 is equal to the non-inversion input from the difference amplifier 52, and with a negative-going output indicated by 56 producing a positive-negative inverted output to the non-inversion input from the difference amplifier 52. 57 and 58 are FET's of identical characteristics to each other by which the voltage-current conversion and suppression or emphasis of signal is performed. That is, when the gate potential is lower than source potential +Vp (Vp=pinch off voltage), no or little drain current flows. With the gate potential above it, a current of intensity proportional to the square of the excess of potential difference flows. Such characteristic of FET is utilized here. That is, as shown in FIG. 5, where the abscissa is in the gate potential $V_{GS}$, and the ordinate is in drain current Ids, when the gate voltage exceeds the pinch off voltage $V_p$, a drain current of amount proportional to the square of the voltage difference between the gate voltage and the pinch off voltage. And, with the voltage given to the point 59, that is the source control voltage (hereinafter described as Vs) supplied to the sources of the two FET's 57 and 58, when either of the gate potentials of FET's 57 and 58 exceeds Vs+VP, a drain current proportional to the square of the excess potential difference is sucked from the drain of the FET 57, 58. As has described above, since the voltage of the positive-going output of the difference amplifier 54 is equal to the output voltage (hereinafter called Vin) of the difference amplifier 52, and the voltage of the negative-going output 56 is equal to the inverted Vin, that is, −Vin, so that the FET 57 flows current when the Vin exceeds Vs+Vp, and the FET 58 flows current when −Vin lowers Vs+Vp. This phenomena are shown in FIG. 6, where the abscissa is in the above-defined Vin, and the ordinate is in the sum of the drain currents of the both FET's 57 and 58 with the right-hand side curve for the FET 57 and with the left-hand side curve for the FET 58.

In such a manner, this signal emphasis portion 17 operates to carry out the voltage-current convertion, absolutization, suppression of noise or the like by suppressing the minor signal below Vp+Vs, and emphasis of illuminance difference for focus detection. It is noted that a diode 60 is provided for preventing faulty operation of the integration portion to be described later due to the reverse-directed current due to the reverse bias of the FET 57, 58 or the like, but since, in general, the drain voltage of FET 57, 58 can be obtained by lowering the middle potential of this circuit compared with the GND of the integration portion, this diode 60 is often omitted. It is also noted that instead of the FET 57, 58, transistors or the like may be used to obtain an equivalent elongation characteristics.

Next 18 is the emphasis characteristic control portion having such function that the control voltage for the signal emphasis portion 17, or the voltage Vs at the point 59 is controlled to control the emphasis start level, that is, the suppression level with the result that the characteristic of emphasis is made variable. That is, a digital signal to be described later is fed to an input terminal indicated by 61, and is analogized by the D/A converter 62 to produce an output at a point 63 which is then passed through an inversion buffer circuit comprising an operational amplifier 64 and resistors 65 and 66 to the point 59. The D/A converter 62 not always necessitates a resolution power of a great number of bits, and may be a known ladder type D/A converter, or else, for example, a D/A converter shown in FIG. 7 even holds good.

Figure 7:
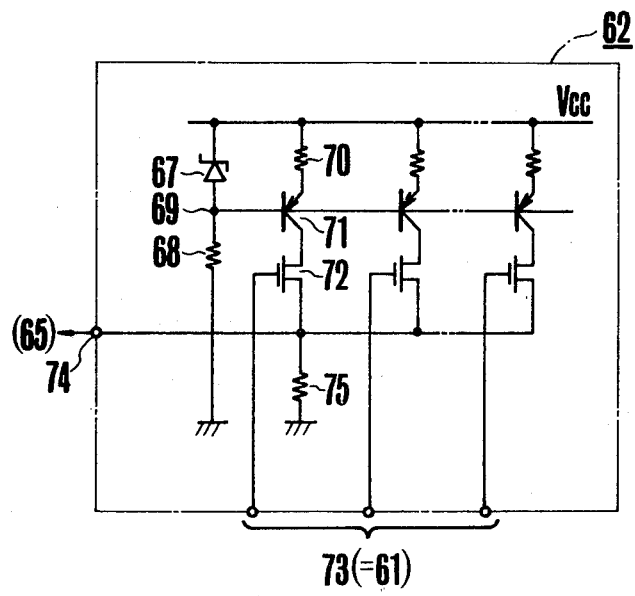
FIG. 7 is an electrical circuit diagram of an example of the D/A converter in the emphasis characteristic control block of FIG. 4.

That is, the D/A converter of FIG. 7 has such basic construction that a constant voltage is caused to appear across a point 69 and Vcc by a constant voltage diode 67 and a resistor 68, and then a constant current is made up by a resistor 70 and transistor 71. Such constant current is set in a plurality with its value differentiated by using similar arrangements of parts, and also in order to select one of these at a time, there are provided a plurality FET switches 72 corresponding to them respectively. Each FET switch 72 is turned ON and OFF by a binary-digital signal applied to a control terminal indicated by 73, and each constant current obtained through each FET switch 72 is connected to a single common output terminal indicated by 74, and those currents are converted to voltages by a resistor 75. And, by setting the current values of the individual constant currents in a discrete manner, for example, 1 mA, 2 mA, 4 mA, . . . , the current obtained by the combination of ON, OFF control of the individual FET switches 72 in response to the input binary-digital signal applied on the control terminal indicated by 73, thus by varying the output voltage of the output terminal 74 it is made possible to D/A-convert the input digital signal to a signal in the form of a voltage.

Of course, it is also possible to achieve such D/A convertion by an easier method, for example, by utilizing the constant current characteristic of FET, use is made of a FET of the same characteristic as that of the FET switch 72, or by turning on a different number of constant current sources suitably by a single control terminal.

Next 19 is the above-described dual integration portion, what is shown here is an example of A/D conversible one of the integrated result and an operational amplifier 76 and a condenser 77 form the basic part thereof.

That is, when an input control FET switch 78 is turned on by rendering the terminal 79 of HIGH, the integration input is made possible. The integration is performed by turning on the input control FET 78 with the control terminal 79 set HIGH and by sink out a current corresponding to the output of the signal emphasis portion 17 through the diode 60, and that current is given by the voltage increase at the output terminal of the operational amplifier 76, that is, by the integration output through the condenser 77, thereby the addition-integration is effected as a voltage across that condenser 77. The above mode is called the first slope mode (or integration mode). Thus, here, because of the current form of the signal from the preceding stage, the correct integration is assured over a wide dynamic range.

Here, explanation is given about that integrating type A/D conversion. First by rendering a terminal indicated by 80 of HIGH, a FET switch 81 is turned on to discharge a condenser 77, so that using an operational amplifier 76 as a buffer amplifier, the output voltage of that operational amplifier 76 is made zero. This state is called the integration reset. Next the terminal 80 is rendered LOW to turn off the FET switch 81, thereby the condenser 77 is made chargeable. Then a terminal 79 is rendered HIGH to turn on an input control FET switch 78. A current sink out through a diode 60 to charge the condenser 77 as has been mentioned above, thus increasing the output voltage (called Vo) of the operational amplifier 76.

The above-defined output voltage Vo at this time is:

$$Vo = \int (i_1/C)dt$$

where $i_1$ is the above-described sink out current, and C is the capacitance of the condenser 77. This mode corresponds to the above-described first slope mode. Then, when the terminal 79 is rendered LOW, the inut control FET switch 78 is turned off to complete the first slope mode.

Then, when HIGH signal is given to a terminal indicated by 82, a second slope control FET switch 83 is turned on, thereby a constant voltage given through a terminal indicated by 84 and a resistor 85, or a constant current from the terminal 84 is used to cause a current pouring as reversed in the above-described first slope mode, thus performing a reverse integration. This mode is called the second slope mode (or integrating type A/D conversion mode). Let $i_2$ denote the pouring current. And, by measuring a time $t_2$ during which the output voltage of the operational amplifier 76 is dropped to zero (the output voltage at the time of reset), the A/D conversion is achieved. That is, when the first slope mode is terminated, $Vo = \int (i_1/C)dt$, and when the second slope mode is completed with the output voltage of the operational amplifier 76 reaching zero, $$\int_0^t (i_2/C)dt, \quad t \cdot i_2 = Vo \cdot C = \int i_1 dt.$$

Thus, by using a counter in measuring the time interval t it is made possible to convert the amount of sink out current during the first slope mode period to a digital value.

Next explanation is given to the case of a logarithmic compression type A/D conversion. A different point in this case is that unlike the general dual integration (dual slope A/D conversion), the second slope mode differs. That is, in general, the second slope mode is performed with reverse integration of a constant current. Unlike this, the current pouring from the terminal 84 is varied exponentially in magnitude with reverse-integration time, thus the reverse-integration time is logarithmically compressed. This method is however, difficult to correctly make up the current of exponentially increasing intensity. In this example, therefore, a current of which the intensity is proportional to the terminal voltage of the condenser 77 is used to carry out the second slope mode, thus completing the compressed from of A/D conversion. That is, the second slope mode is realized by rendering a terminal indicated by 86 of HIGH to turn on a FET switch 87 which is followed by flowing of current proportional to the voltage across the poles of the condenser 77 through a resistor 88.

And by measuring a time necessary for the output voltage of the operational amplifier 76 to lower below a certain prescribed voltage, the log-compression type A/D conversion is realized.

But, the above-mentioned prescribed voltage must be considerably accurately set. In this embodiment, taking the log-compression type A/D as a basis, the reverse integration due to a minute current due to a constant current which is used in the general dual slope A/D conversion is added to approximate the log-compression type A/D conversion. That is, the reverse integration due to the current through the resistor 88 under the control of the terminal 86, and the reverse integration due to the minute current from the terminal 84 under the control of the terminal 82 go together so that the judgement of completion of the reverse integration, or the judgement of output voltage of the operational amplifier 76 is simplified to a form as compared with the zero potential, thereby the absolute accuracy is restricted to the necessity of treatment, and the circuit construction is simplified to easily realize an extended range of dynamic by the digital value of approximated log.

Figure 8:
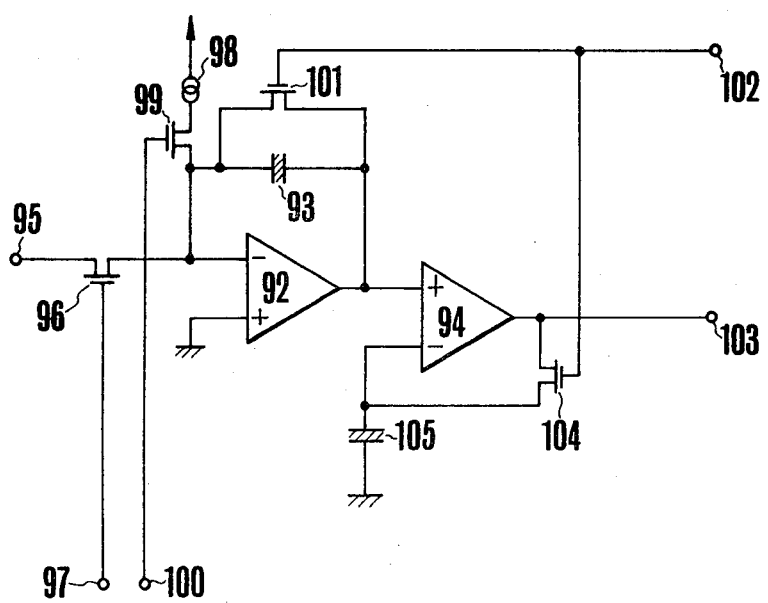
FIGS. 8 and 9 are electrical circuit diagrams of other two different examples of the combination of the dual-slope integrating type converter and the comparator of FIG. 4.
Figure 9:
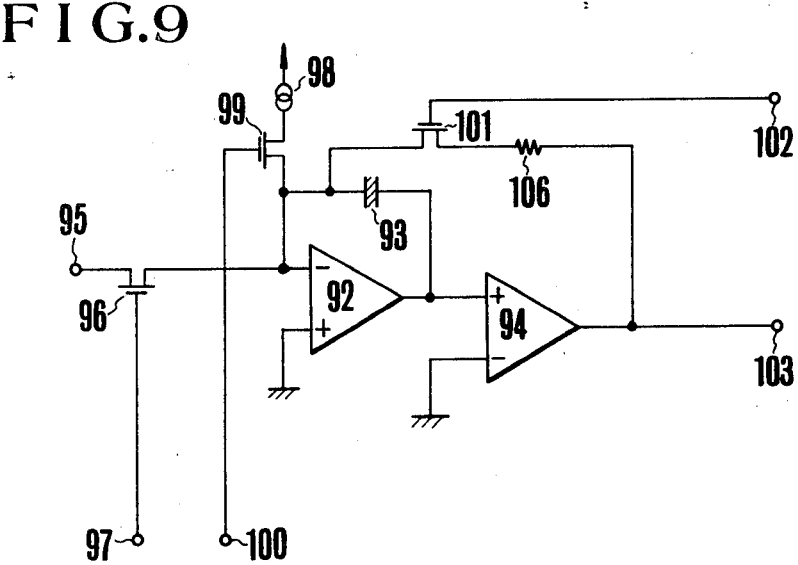

At final, 20A is a comparison circuit portion for A/D conversion of the above-described integration portion 19 constituting part of the display control portion 20 of FIG. 3. That is, by a comparator 89, the termination of the second slope mode of the dual integration portion 19, that is, in the case of the general dual slope, the detection of zero of the output of the operational amplifier 76, accurately speaking, the detection of the fact that it becomes equal to the output of the integrator at the above-described integration reset time. For this purpose, as the comparison reference potential, a reference potential is given to a terminal indicated by 90. When the integrator output is higher than that reference potential, a HIGH signal is obtained at the comparison output terminal indicated by 91. It is noted that as to the combination of this integrator and comparator, there are, for example, methods of cancelling the input off-set voltages of the operational amplifier and the comparator by the circuit constructions as shown in FIGS. 8 and 9. That is, in FIGS. 8 and 9, 92 is an operational amplifier for integration; 93 is a condenser for integration; 94 is a comparator; 95 is an input terminal; 96 is an input control FET switch; 97 is an input control terminal; 98 is a constant current source for reverse integration; 99 is a second slope control FET switch; 100 is a second slope control terminal; 101 is a reset control FET switch; 102 is a reset control terminal; 103 is a comparison output terminal.

In the example of FIG. 8, an off-set memory control FET switch 104 is connected to the reset control terminal 102 so as to work at the time of reset, whereby the comparator 94 is used as a buffer. The result of off-set of the operational amplifier 92 and comparator 94 resulting therefrom is transmitted through the off-set memory control FET switch 104 to the condenser 105 and stored therein. This is used as the comparison reference in carrying out the dual integration operation as has been described above, and is supplied to the comparator 94.

Likewise in the example of FIG. 9, when in reset, the result of the off-set of the amplifier 92 and comparator 94 is transmitted through the reset control FET switch 101 to the condenser 93 for integration and stored therein as an initial value. By making the state of inversion of the comparison output appearing at the output terminal 103 when in the dual integration operation equal to the state at the reset time it is made possible to cancel the off-set of the circuit. It is noted that 106 is a resistor for preventing oscillation due to the increase in the loop gain by the direct connection of the amplifier 92 and comparator 94.

Figure 10:
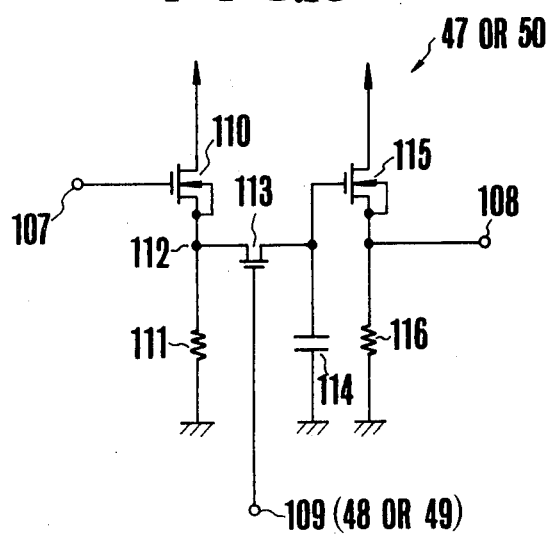
FIG. 10 is an electrical circuit diagram of an example of the sample and hold circuit constructed in FET form and used in the photo-electric output control and video signal change detection blocks of FIG. 4.

Another practical example of each analogue circuit will be explained in succession. Referring first to FIG. 10, the sample and hold circuits 47 and 50 of FIG. 4 are constructed in FET form with an input terminal 107, an output terminal 108 and a control terminal 109. 109 corresponds to the terminal 48 or 49 of FIG. 4. That is, the signal from the input terminal 107 after having been current-amplified by the source-follower of a FET 110 and a resistor 111 is caused to appear at a point 112. When the control terminal 109 is rendered HIGH, a FET switch 113 is turned on so that the potential at the point 112 is stored on a condenser 114 (that is, sampling). When the control terminal 109 is rendered LOW, the FET switch 113 is turned off to hold it. That potential across the poles of the condenser 114 is caused by the source-follower of a FET 115 and a resistor 116 to appear at an output terminal 108 as a sampled and held potential.

Figure 11:
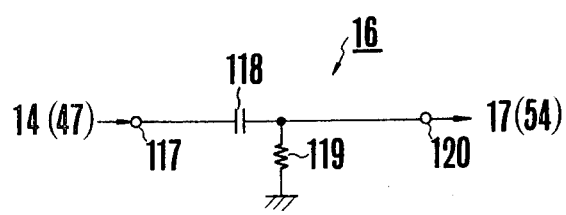
FIG. 11 is an electrical circuit diagram of another example of the video signal difference detector of FIG. 4.

FIG. 11 shows a CR differentiation circuit usuable in place of the difference amplifier 52 and the sample and hold circuit 50 of the video signal change detecting portion 16. The output of the sample and hold circuit 47 of the preceding stage in the photo-electrical output control portion 14 enters through an input terminal 117, and the change of voltage at the input terminal 117 is differentiated by the RC circuit comprising a condenser 118 and a resistor 119 to produce an output at a terminal indicated by 120. The use of such circuit gives an advantage of reducing the number of constituent elements to a large extent.

The analogue circuit of FIG. 4 using a great number of FET's and FET switches as has been described above can be fabricated in the form of a single chip IC by the up-to-date MOS-FET and Bi-MOS techniques, except for some external condensers, and the manufacturing of it is relatively easy.

It is noted that the above-described FET has its aim mainly in the high input impedance thereof, and therefore may be replaced by a Darlington arrangement of transistors, and that the FET switch through being advantageous in the form of CMOS-FET switch from the point of view of its characteristic may be otherwise constructed from a combination of transistors or other suitable semi-conductor switch.

Next, in connection with the construction and arrangement shown in FIG. 2, the use of a pair of optical-electronic transducer element arrays in combination with an example of an analogue circuit system therefor will next be explained on the basis of FIG. 4 by reference to FIG. 12.

That is, a series input control portion 121 for the analogue shift register 28 comprised of the FET switches 26 and 27 of FIG. 4 is placed ahead the analogue input, next a first image sensing block 13a comprising an optical-electronic transducer portion 122a, a charge shift portion 123a and an analogue shift register portion 124a, then next one dummy block 13c comprising a charge shift portion 123c connected to GND and an analogue shift register portion 124c, then next a second image sensing block 13b comprising an optical-electronic transducer portion 122b, charge shift portion 123b and an analogue shift register portion 124b, and then followed by an analogue processing circuit as shown in FIG. 4. The optical-electronic transducer portions 122a and 122b each include optical-electronic transducer elements 30 and anti-blooming gate FET switches 32 as shown in FIG. 4 arranged so that the amount of charge produced depending upon the amount of light received causes the produced voltage to be increased. Therefore, in order to obtain a signal of a constant range, its integration period must be properly controlled. For this purpose, from the analogue shift register series input control portion 121 are given reference voltages corresponding to the minimum and maximum levels of signals to be obtained in the photo-electrical portions 122a and 122b, and said voltages are taken out through analogue shift register portions 124a→124c→124b to be used as the reference levels for comparison of the over and under levels of the signal obtained through the analogue shift register portion 124b of the optical-electronic transducer portions 122a and 122b. Here the charge shift portions 123a to 123c correspond to FET switches 34 for shift gate in FIG. 4, and the analogue shift register portions 124a to 124c correspond to the analogue shift register indicated by 28 in FIG. 4. An operational amplifier 125 has by resistors 126 and 127 to serve as a buffer amplifier for amplifying the video signal sampled and held and appearing at a point 128. Its output represents the signal from the optical-electronic transducer portions 122a and 122b, and the above-described minimum and maximum reference signals in time sequence, so that when a zero memory control terminal indicated by 129 is rendered LOW, the output of the amplifier 125 is sampled and held by a sample and hold circuit 130 which then produces an output for use as the minimum reference level. When a full memory control terminal indicated by 131 is rendered LOW, the output of the amplifier 125 is sampled and held by a sample and hold circuit 132 which then produces an output for use as the maximum reference level.

In order to lay the signal from the optical-electronic transducer portions 122a and 122b within the optimum working region of the circuit, method is employed of suppressing the peak of that signal to a certain value. This is to provide a peak hold circuit 134 responsive to HIGH at a peak hold terminal indicated by 133 for holding the peak value of the signal from the optical-electronic transducer portions 122a and 122b. 135 is a reset terminal for this peak hold circuit 134. When the terminal 135 is rendered HIGH, the memorized peak value is reset.

Figure 13:
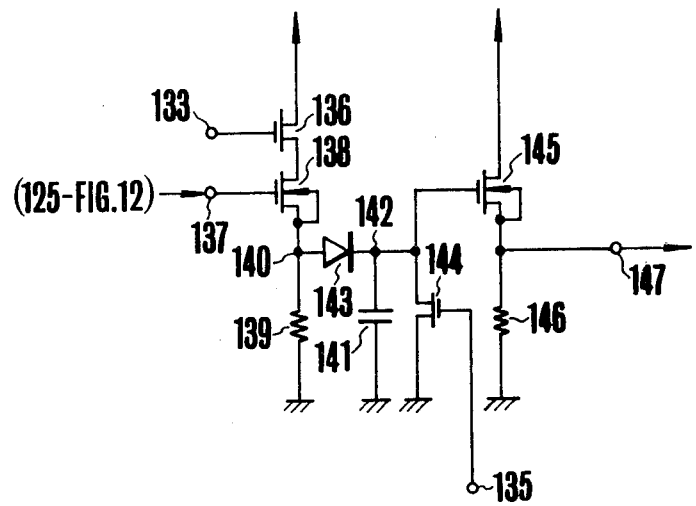
FIG. 13 is a circuit diagram showing an example of the peak hold circuit of FIG. 12 particularly when constructed in FET form.

FIG. 13 shows an example of construction of the peak hold circuit by FET's. When the peak hold terminal 133 is rendered HIGH, a FET switch 136 is turned on so that the signal at an input terminal 137 is caused by the source-follower of a FET 138 and a resistor 139 to produce at a point 140. When the potential at a point 140 is higher than the preceding peak voltage held as the potential at a point 142, that is, when the voltage at present time is peak, a diode 143 sets the voltage at the point 142 to a value equal to the present voltage at the point 140. A FET switch 144 responsive to HIGH of the reset terminal 135 turns on to reset the condenser 141, thereby the potential at the point 142 is made zero. That is, the peak value held in the past is reset. A FET 145 constitutes a source-follower together with a resistor 146 and transmits the voltage at the point 142 that is the up-to-now peak voltage to an output terminal 147.

Figure 14:
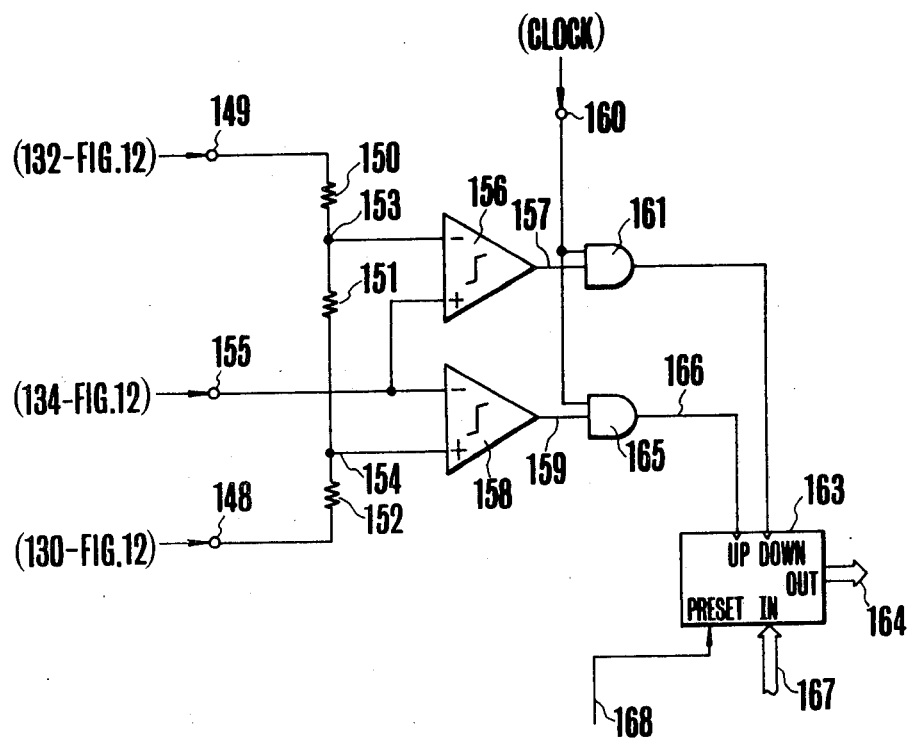
FIG. 14 is a circuit diagram of an example of a control circuit for the charge integration period of the above-described optical-electronic transducer elements used in the analogue circuit system of FIG. 12.

FIG. 14 shows an example of circuit construction of a portion of a main sequence control circuit constituting part of a sequence control portion 22 shown in FIG. 3 to be more fully described later for determining the integration period of the optical-electronic transducer elements by using the reference for comparison given by the operation of the sample and hold circuit 130, peak hold circuit 134 and sample and hold circuit 132 shown in FIG. 12.

Figure 12:
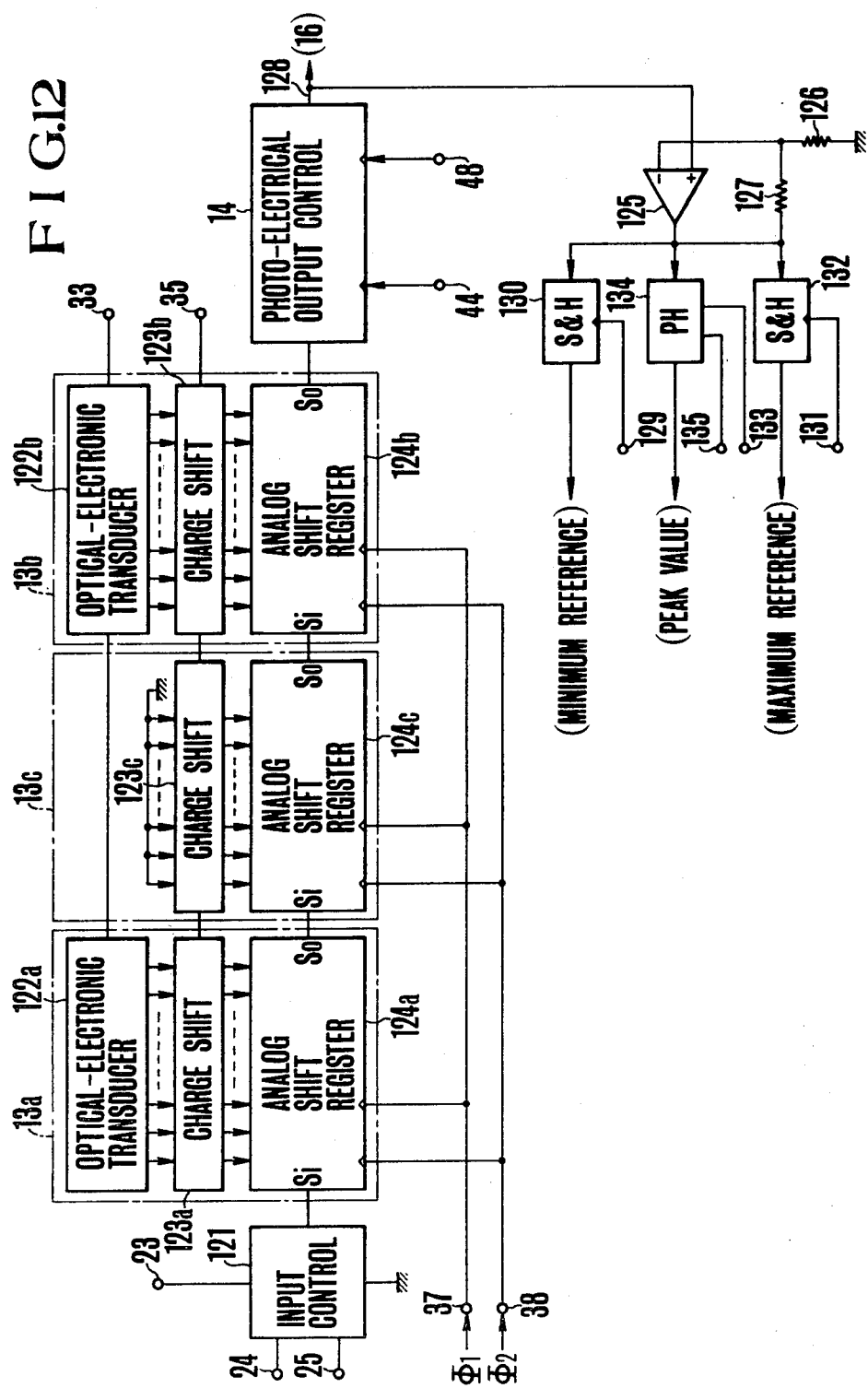
FIG. 12 is a block diagram showing the outline of an analogue circuit system for use with a pair of rows of optical-electronic transducer elements.

That is, the output of the sample and hold circuit 130 for comparison reference of FIG. 12 is given to an input terminal 148 for the minimum reference level, and the output of the sample and hold circuit 132 to a maximum reference level input terminal 149, so that by resistors 150, 151 and 152 there are produced an upper comparison reference potential at a point 153, and a lower comparison reference potential at a point 154. And the output of the peak hold circuit 134 is given to a peak input terminal 155.

With this, when the peak value of the signal exceeds the upper reference potential, a comparator 156 produces a HIGH signal at a point 157, and when the peak value of the signal is lowered below the lower comparison potential, a comparator 158 produces a HIGH signal at a point 159.

And, before the above-described signal is established and the next integration period is to be determined at a timing to be described more fully later, a terminal 160 is supplied with an integration period altering clock.

By this, if the peak value exceeds the upper comparison reference potential as the present integration period is too long, because of the HIGH signal at the point 157, a clock from the terminal 160 is passed through an AND gate 161 to a point 162, entering an UP/DOWN counter 163 at an input terminal DOWN thereof, thereby the required value of integration period indicated by 164 is decreased by one unit, and the integration period in the main sequence circuit is decreased by one step to shorten the integration period.

Again, if the present integration period is too short to lower the peak value of the signal below the lower comparison reference potential, an AND gate 165 is opened by the HIGH signal at the point 159 to pass the clock from the terminal 160 therethrough to a point 166 and therefrom directed to the UP clock input terminal of the UP/DOWN counter 163, thereby the required value of the integration period is increased by one unit, and therefore the integration period is increased by one step to elongate the integration period.

By such feedback for optimum integration period due to the signal peak voltage, the signal voltage is adjusted.

It is noted that at the time when the electrical power source is throw in, the integration period is forced to take a prescribed value. After that, the above-described control operation is carried out. For this purpose, an initial value 167 to be described later is given to a data input terminal of the UP/DOWN counter 163, and at the same time an electrical power source turn on signal 168 to a preset terminal, thereby setting of the initial value is carried out at the time of start of the operation.

The above-described signal processing and control are performed based on a series of sequences. To explain this in greater detail, the construction of a main sequence circuit forming part of the sequence control portion 22 for governing that sequence control, the relationship of the input and output of each circuit block, and the operative relationship of the FIG. 4 analogue circuit system due to the control of said main sequence circuit are respectively shown in FIGS. 15, 16 and 17.

All the clocks are available from a main clock generator 170 based on the output of a main oscillator 169. Said main clock generator 170 produces ten non-overlap clocks $\phi_0, \ldots, \phi_9$ and advances the processing by each round of the clocks (hereinafter called each cycle).

Figure 15:
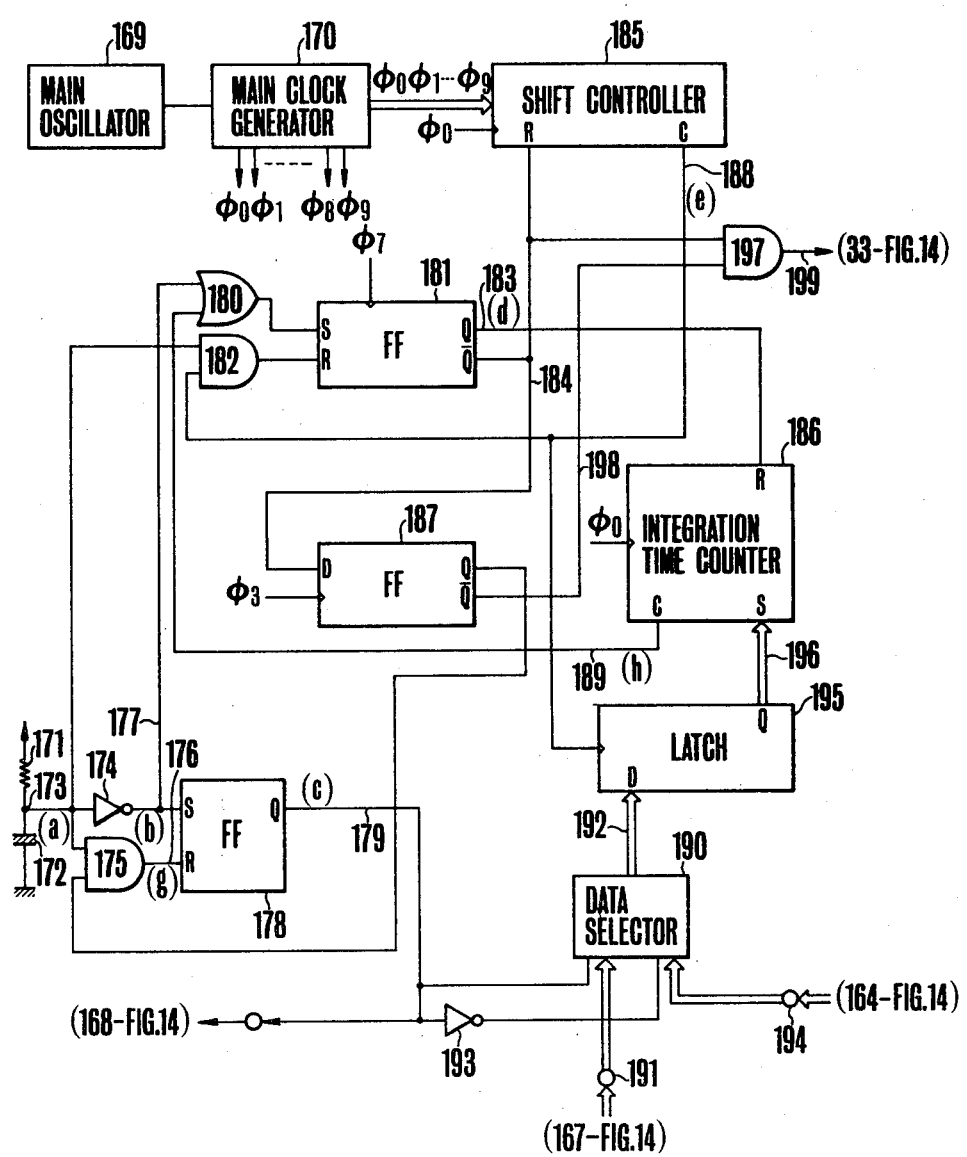
FIG. 15 is a circuit diagram, partly in block form, showing the details of a main sequence circuit constituting part of the sequence control block in the circuit system of FIG. 3.

The operation of the circuit of FIG. 15 is explained from the time of sink out the electrical power source. When the electrical power source is thrown, the main clock generator 170 starts to operate. After the electrical power source has been thrown in, a resistor 171 and a condenser 172 cause the production of a signal of waveform as shown in FIG. 16(a) at a point 173, thereby the detection of power supply is carried out. The numerals on the lateral axis of the downmost rank correspond to the time intervals of occurrence of the above-described $\phi_0, \ldots, \phi_9$, that is, the respective cycles of sequence, and the space between division lines sandwiching each numeral is divided into ten equal parts for which the $\phi_0, \ldots, \phi_9$ appear respectively in respective timings. Therefore, in the following explanation, the time at which a pulse $\phi i$ ($i=0, 1, \ldots, 9$) in the n-th cycle occurs is denoted by $[n-\phi i]$.

Figure 16:
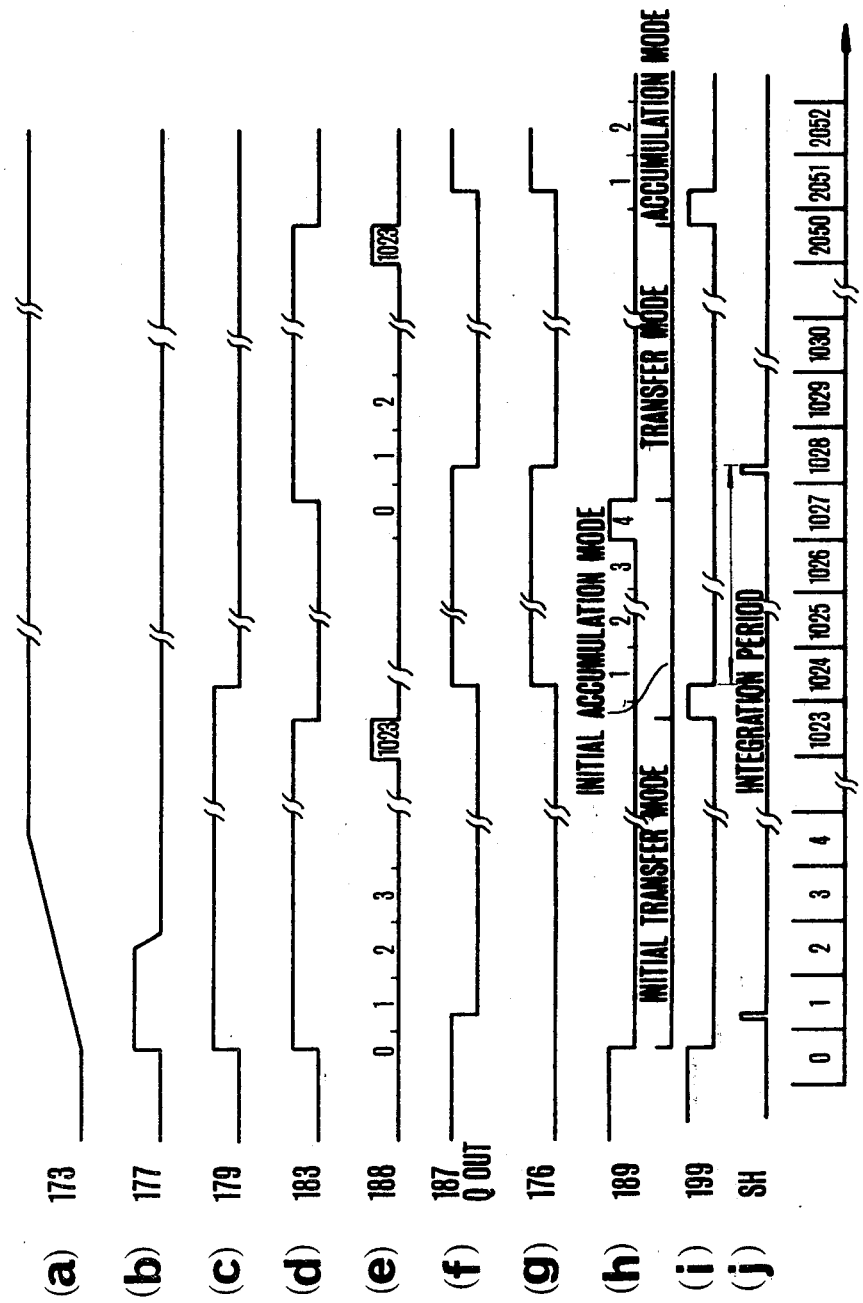
FIG. 16 is a pulse timing chart of the inputs and outputs occurring at the various circuit portions of the main sequence circuit of FIG. 15.

That is, at a point in time before $[0-\phi_7]$, the electrical power source is throw in. Then, the potential at a point 173 gradually increases, exceeding the potential for inversion of an inverter 174 before $[2-\phi_7]$ point as shown in FIG. 16(a), thereby the output of the inverter 174 is changed to LOW. This situation is shown on line (b) in FIG. 16. That is, the inverter 174 changes its output to HIGH at $[0-\phi_7]$ and then to LOW at $[2-\phi_7]$. This causes an AND gate 175 to produce a LOW signal at a point 176 for at least the same period as shown in FIG. 16(g). Responsive to the signals at the points 177 and 176, a RS flip-flop 178 (hereinafter flip-flops are all abbreviated to FF) is to receive the conditions of HIGH for the set input S, and of LOW for the reset input R within at least the period before $[0-\phi_7]$, and produces its Q output 179 which takes HIGH for at least the same period as shown in FIG. 16(c). (It is noted that at this time the Q output 179 of said RS-FF which goes through an output terminal 179'' is applied as the electrical power source throwing signal 168 to the preset terminal of the UP/DOWN counter 163 of FIG. 14, for example). During that period shown in FIG. 16(b), the signal of HIGH is given through an OR gate 180 to the set input S of a synchronizing type RS-FF 181. During that period shown in FIG. 16(a), the signal of LOW is given through an AND gate 182 to the reset input R of the above-described FF 181. Since this RS-FF 181 is synchronized by the clock $\phi_7$ from the main clock generator 170, upon reception of HIGH at the set input S and of LOW at the reset input R after $[0-\phi_7]$ and before $[2-\phi_7]$, its Q output 183 is changed to HIGH, and the $\overline{Q}$ output 184 to LOW at the timing of $[0-\phi_7]$ as shown in FIG. 16(d). Thus, the system is said to operate in the initial transfer mode. A change of the Q output 184 from HIGH to LOW at $[1-\phi_7]$ causes a transfer controller 185 to be released from its reset state. Since it is synchronized by the clock $\phi_0$, a counting (1-1023) starts from $[1-\phi_0]$ as shown in FIG. 16(e). At the same time, an integration period counter 186 is reset at a point in time when the Q output 183 of the RS-FF 181 is changed from LOW to HIGH.

Also the change of the $\overline{Q}$ output 184 of the RS-FF 181 to LOW after $[0-\phi_7]$ leads to change the Q output of a D-FF 187 to LOW after $[1-\phi_3]$, since the D-FF 187 is synchronized with the clock $\phi_3$. The above-described transfer controller 185 is synchronized with the clock $\phi_0$, and receptive of the signals of $\phi_0, \phi_1, \ldots, \phi_9$ from the main clock generator 170 performs the counting and control in a manner to be later described.

Then, at the terminal end of counting (after the count including 1023 out of 1024 count) the look ahead carry signal 188 is changed to HIGH after the 1023th cycle as shown in FIG. 16(e). This signal and the signal at the point 173 with the latter became HIGH before that time are applied to an AND gate 182, and, since its output is of HIGH, after the cycle including 1023th, the reset input R of the RS-FF 181 is changed to HIGH.

The integration period counter 186, because of the Q output 183 of the RS-FF 181 being HIGH after $[0-\phi_7]$, remains reset, so that the carry signal 189 remains of LOW as shown in FIG. 16(h). Also since the signal at a point 177 becomes LOW until this time point (1023th cycle), the output of the OR gate 180 is of LOW. For this reason, the RS-FF 181 with its set input S of LOW and the reset input R of HIGH after $[1023-\phi_0]$ is reset by the clock $\phi_7$ at $[1023 -\phi_7]$ so that the Q output 183 becomes LOW, and the $\overline{Q}$ output 184 becomes HIGH.

This completes the initial transfer mode and the Q output 183 of RS-FF 181 becomes LOW. Then, the integration period counter 186 starts to count in a timing of the clock $\phi_0$. This is called the initial storage mode. At the same time, the $\overline{Q}$ output 184 of RS-FF 181 becomes HIGH, so that the transfer controller 185 is reset, thereby the look ahead carry signal 188 becomes LOW in a timing of $[1023-\phi_7]$. Also since the D-FF 187 is synchronized by the clock $\phi_3$, the $\overline{Q}$ output 184 of RS-FF 181 becomes HIGH after $[1023-\phi_7]$ so that at $[1024-\phi_3]$ its Q output becomes HIGH as shown in FIG. 16(f).

The integration period counter 186 is a counter for performing a frequency division of $2^N$ with N given (for example, a counter specified by MC-14536 sold from Motorola Semi Conductor Project Inc., in U.S.A. is usable). Therefore, when "N" is given to the set input S, the counter 186 produces a clock of frequency obtained by dividing the frequency of the input clock by $2^N$. In this embodiment, for given N, an output of $2^N$ is used as what is called a carry of $2^N$.

The Q output of D-FF 187 after $[1024-\phi_3]$ is HIGH, and the signal at the point 173 has been HIGH before that, so that the AND gate 175 changes the reset input R (176) of RS-FF 178 to HIGH. Since the set input S (177) of the RS-FF 178 has been LOW before that, it is reset to change the Q output 179, that is, the initial suppression signal, to LOW in a timing of $[1024-\phi_3]$.

The initial suppression signal corresponds to 168 of FIG. 14. Since before $[1024-\phi_3]$, the Q output 179 of RS-FF 178 is HIGH, an initial set value 191 is caused to appear at an output 192 through a data selector 190. That initial set value 191 is denoted by 167 in FIG. 14. Or the other hand, after $[1024-\phi_3]$, the Q output 179 of RS-FF 178 is LOW, causing the output of the inverter 193 to become HIGH, so that the required value 194 of the integration period (denoted by 164 in FIG. 14) is caused to appear at an output 192 through the data selector 190. That is, the data selector 190 selectively produces its input or the initial set values 191 or 194 depending upon the HIGH, LOW of the Q output 179 of RS-FF 178.

A latch 195 is clock-synchronized by the look ahead carry signal 188 of the transfer controller 185, so that information of the output 196 is not clock-synchronized before the 1023th cycle and so is unstable, but after the cycle including 1023th, it is equal to the above-described initial set value. By the next carry signal 188 (in FIG. 16, the 2050 cycle), it is equal to the required value 194 of the integration period just before the clock of that carry signal 188. As has been mentioned above, after $[1023-\phi_7]$, the integration period counter 186 is made countable as its reset input R is rendered LOW, and is given at its set input S by the initial set value which is latched by the latch 195 at the 1023th cycle (until the 2050th cycle) so that its set value, for example, 2, starts to be counted until $2^2$, that is, 4, by the clocks in the timing of $\phi_0$, in such a manner that 1 for $[1024-\phi_0]$, 2 for $[1025-\phi_0]$, and so on as shown in FIG. 16(h).

And, it is in FIG. 16 that when counting has advanced 4, that is, at $[1027-\phi_0]$, its carry signal 189 is caused to change to HIGH. And, at $[1027-\phi_0]$, the carry signal 189 becomes HIGH, causing the set input S of RS-FF 181 to change to HIGH through the OR gate 180.

At this time, as has been mentioned above, the transfer controller 185 has been reset by the $\overline{Q}$ output 184 of RS-FF 181 after $[1023-\phi_7$, so that the carry signal 188 is LOW, that is, the output of the AND gate 182 is LOW, and therefore, the reset input R of RS-FF 181 becomes LOW. For this reason, since the RS-FF 181 is clock-synchronized with the clock $\phi_7$, it is set at $[1027-\phi_7]$ with the Q output 183 and the $\overline{Q}$ output 184 rendered HIGH and LOW respectively. The foregoing process completes the initial storage mode.

Now, when the $\overline{Q}$ output 184 of RS-FF 181 is changed to LOW by $[1027-\phi_7]$, the transfer controller 185 becomes countable, and receptive of clock $\phi_0$ counts 1 for the 1028th cycle, 2 for the 1029th cycle, and so on. This mode is called "transfer mode". At the same time, since the Q output 183 of RS-FF 181 is HIGH, the integration period counter 186 is reset. Also since the D-FF 187 receives at the clock $\phi_3$ LOW of the Q output 184 of RS-FF 181, whose Q output becomes LOW at $[1028-\phi_3]$. During the transfer mode, the transfer controller 185 continues to count. As has been mentioned above, when counting 1023, that is, at the 2050th cycle, a carry signal 188 is produced. Responsive to the HIGH signal of the 2050th cycle of the carry signal 188, as has been mentioned above, the RS-FF 181 is reset at $[2050-\phi_7]$, thus terminating the transfer mode. Then, transit to a storage mode occurs, and the following proceeds with a transfer mode similar to the initial storage mode, these modes alternating each other. The difference from the preceding is that since the RS-FF 178 is already reset, its Q output 179 defines the value of integration period 194. That is, before the transfer controller clock-synchronized by the latch 195 has counted 1023 cycles (before the 2050th cycle in FIG. 16), the signal 164 from the integration period control circuit of FIG. 14 is given to the input 194. By this information, the next time count value of the integration period counter 186, that is, the storage mode time is determined. In such a manner, the storage mode changes its time based on the value determined just before the termination of the transfer mode. So the transfer mode and the storage mode alternate with each other.

It is noted that when the $\overline{Q}$ output 184 of RS-FF 181 and the $\overline{Q}$ output 198 of the D-FF 187 both are rendered HIGH (that is, the Q output 183 of RS-FF 181 and the Q output of D-FF 187 are both of LOW) by the AND gate 197 during the above-described sequence, that is at the initiation of the storage mode (in FIG. 16, at $[1023 - \phi_7] - [1024 - \phi_3]$, $[2050 - \phi_7] - [2051 - \phi_3]$), a storage clear signal 199 is produced as shown in FIG. 16(i). This storage clear signal 199 is applied to the anti-blooming gate terminal 33 of FIG. 4, FIG. 12, thereby the anti-blooming gate FET switch 32 is turned on to clear the individual optical-electronic transducer elements 30.

It is noted that FIG. 16(j) shows shift pulses SH to be applied to the shift gate terminal 35 of the shift gate FET switch 34 (charge shift portions 123a, 123b and 123c) in order that the signal from the individual optical-electronic transducer elements 30 (photo-electrical portions 122a, 122b) is taken in the analogue shift register 28 (124a, 124b and 124c). But these are produced by the other circuit portion. Therefore, this will be described later. It is noted here that the time interval from the falling of the storage clear signal 199 to the falling of this shift pulse is equal to the integration period of the individual optical-electronic transducer elements 30.

Next, the various pulses and signals necessary to adapt the analogue circuit of FIG. 4 to the example of modification in FIG. 12 will be explained by reference to the timing chart of FIG. 17.

These sequences are controlled by the transfer controller of FIG. 15, and, therefore, the explanation is given in combination with its counting operation. This transfer controller 185, as shown in FIG. 15, receptive of the clocks $\phi_0, \phi_1, \ldots, \phi_9$ from the main clock generator 170 carries out counting of the clock $\phi_0$, and responsive to a particular pulse in a particular cycle produces outputs of certain state at output terminals.

Transfer pulses ($\Phi_1$) to be applied to the input clock terminal 37 of FIG. 12 have, regardless of the above-described counting, to be rendered HIGH in a timing of the clock $\phi_2$, and LOW in a timing of the clock $\phi_3$. This situation is shown in FIG. 17(a). Likewise, transfer pulses ($\Phi_2$) to be applied to the output clock terminals 38 have, regardless of the counting, to be rendered HIGH in a timing of the clock $\phi_3$, and LOW in a timing of the clock $\phi_4$. Thus, the analogue shift register (in the following explanation, assumed to be of 256-bit construction) indicated by 28 in FIG. 4, by 124a-124c in FIG. 12 is shifted to the right.

During the time interval from $[1 - \phi_1]$ just after the start of the transfer mode to $[1 - \phi_3]$, the shift pulse SH at the shift gate terminal 35 is maintained at HIGH, causing the signals generated in the photo-electric conversion portion 122a, 122b of FIG. 12 to be applied in parallel to the analogue shift registers 124a, 124b. The shift pulse of this time is shown in FIG. 17(c). Responsive to this, the analogue shift registers 124a, 124b shift the outputs of the individual optical-electronic transducer elements indicated by 30 in FIG. 4 successively to the right as viewed in the figure by the switching or addition of its series-parallel inputs. And the latest series output of the analogue shift register 124b is transmitted to the photo-electrical output control portion 14 successively from the right-hand side optical-electronic transducer element in a time sequencial manner in a timing of the transfer pulses $\Phi_1$ and $\Phi_2$.

The photo-electrical output control portion 14 receives this signal, obtains a reset pulse from the reset control terminal 44 in order to clear the past signal in a timing of the clock $\phi_1$ as the signal shown in FIG. 17(d), and obtains an output proportional to the amount of light of each optical-electronic transducer element 30 at the input terminal of the sample and hold circuit 47 during the time interval from the clock $\phi_3$ in each cycle to the clock $\phi_0$ in the next cycle as shown in FIG. 17(e). The above-described output is applied to the sample and hold circuit 47, and upon giving of the clock (FIG. 17(f)) in a timing of $\phi_4$ to the control terminal 48, causes a rectified signal as shown in FIG. 17(g) to produce at the output terminal of said sample and hold circuit 47, that is, the output terminal 128 of the photo-electrical output control portion 14 during the time interval from the clock $\phi_4$ in each cycle to the clock $\phi_4$ in the next cycle.

Thus, the photo-electrical outputs 1–256 counting from the right of the analogue shift registers 124a, 124c, 124b, that is, the signal within the analogue shift register 124b starts to transfer, and are caused to step out in each cycle of $[1 - \phi_4] - [256 - \phi_4]$. Likewise, the photo-electrical information lying at 513–768, that is, the signal within the analogue shift register 124a of FIG. 12, is caused to step out in each cycle from $[513 - \phi_4] - [768 - \phi_4]$. This is given to the input of the sample and hold circuit 50 within the video signal change detecting portion 16 of FIG. 4, and to its control terminal 49 is given such clock as shown in FIG. 17(h) which becomes HIGH each time the clock $\phi_0$ in each cycle after the start of transfer from $[2 - \phi_0]$ occurs, thus producing the photo-electrical outputs of 1–256 during each cycle of $[2 - \phi_0] - [257 - \phi_0]$, and likewise the photo-electrical outputs of 513–768 during each cycle of $[514 - \phi_0] - [769 - \phi_0]$ at the point 51 of FIG. 4 as shown in FIG. 17(i). Therefore, the two inputs of the difference amplifier 52 are fed with the n-th signal and (n−1)th signal (n is the arbitrary natural number) during the clocks $\phi_4-\phi_9$ in each cycle. And, to the control terminal 53 are given clocks which become HIGH in a timing of the clock $\phi_6$ in each cycle of 2–256 and 514–768 as shown in FIG. 17(k), causing the difference amplifier 52 to work, so that as shown in FIG. 17(l), the signal of illuminance difference of each optical-electronic transducer element 30 is obtained as the output of the difference amplifier 52. And it is processed through the signal emphasis portion 17 within FIG. 4, and at this time a first slope mode signal as shown in FIG. 17(m) which becomes HIGH during $[2 - \phi_3] - [257 - \phi_2]$, $[514 - \phi_3] - [769 - \phi_2]$ after the start of transfer is applied to the terminal 79 of the dual integration portion 19 in FIG. 4, thereby the integration operation is made possible, thus integrating the illuminance difference signal from the signal emphasis portion 17 in said dual integration portion 19. Its integration result, or the output of the operational amplifier 76 is shown in FIG.

17(n). It is noted that the reset signal given to the terminal 80 of this dual integration portion 19 is rendered HIGH at zero-1st cycle, 511-513th cycles, and over the 1023th cycle just after the start of transfer, as shown in FIG. 17(p). And, during this time, the integrator is reset.

In such a manner as described above, the illuminance signal of the photo-electrical output generating portion 13b in FIG. 12 is converted based on its position to a time sequential signal by the analogue shift register 124b, and its illuminance difference, that is, the illuminance difference depending upon the position is absolutized and emphasized, and then integrated during the time interval of $[2-\phi_3]-[257-\phi_2]$ by the integrator which has been reset in the less than 2nd cycle after the start of transfer. Again, the output of the photo-electrical output generating portion 13a is in delay of 512 cycles therefrom to be integrated. The thus obtained analogue integrated value, that is, the emphasized and added value of the illuminance differences of all the elements, that is, a signal representing the degree of sharpness of the image, is subjected to a linear or exponential reverse integration as shown in FIG. 17(o) by applying a second slope mode signal which takes HIGH for the time interval $[257-\phi_5]-[510-\phi_9]$, $[769-\phi_5]-[1022-\phi_9]$ after the start of transfer to the terminal 82 or 86 of FIG. 4. As has been mentioned in connection with the A/D conversion principle, each integrated value is being converted during a linear or log-dependent time from the start of the second slope mode of FIG. 17(o) until its integration output exceeds below a prescribed comparison value, that is, the signal 91 produced from the comparator 89 in the circuit block 20A in FIG. 4 becomes LOW as shown in FIG. 17(q) (the time is shown by the hatch lines in FIG. 17(q)).

By providing such clocks and signals while the transfer controller 185 of FIG. 15 is performing the counting, it is made possible to carry out the signal processing.

Figure 18:
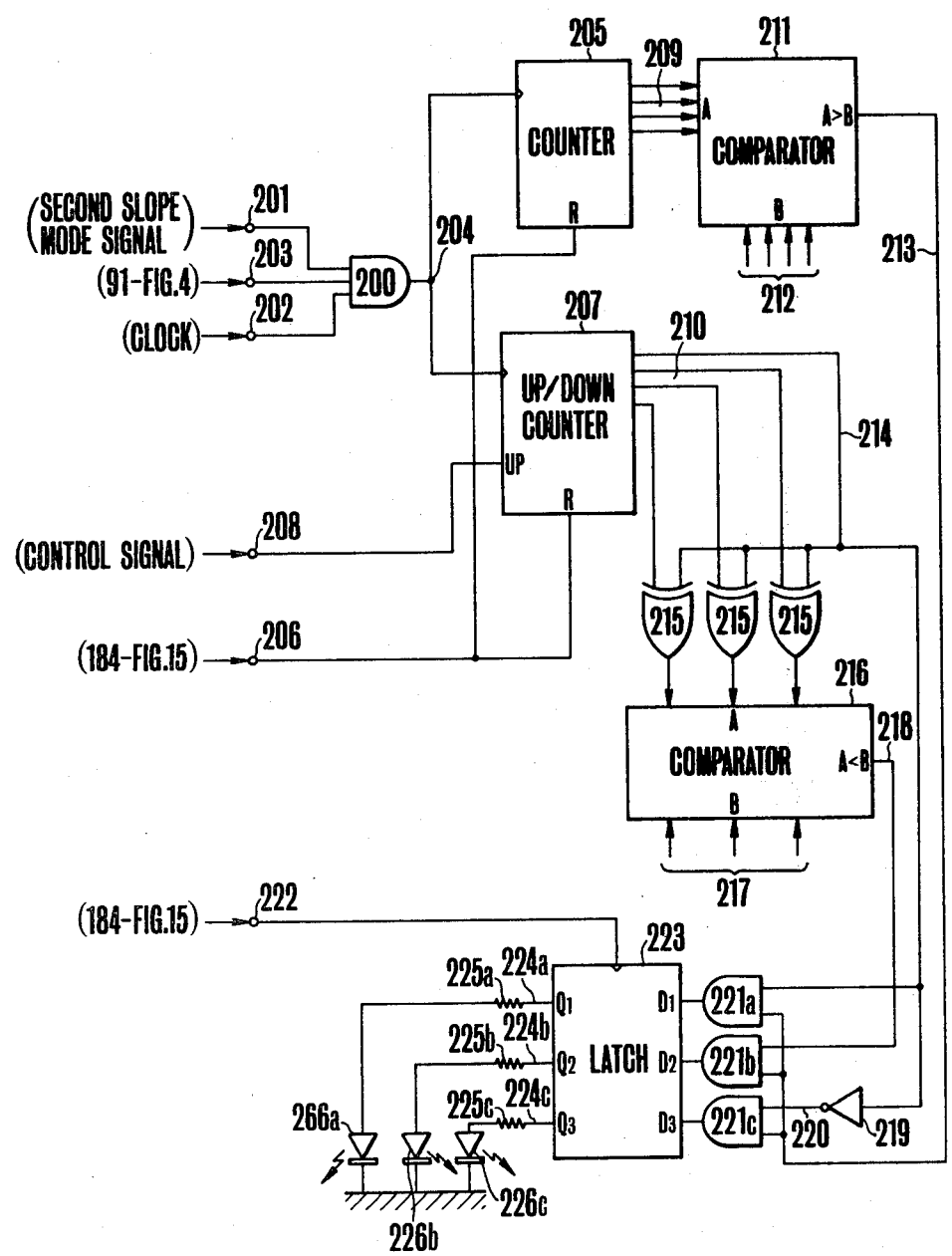
FIG. 18 is a circuit diagram, partly in block form, showing the details of the display control block in the circuit system of FIG. 3.

Next, as the two image-sensing portions arranged in the front and rear of the prescribed focal plane, that is, the optical-electronic transducer elements constituting the two photo-electrical output generating portions provide the integrated values, in order to detect what spatial relationship is taken by the focal plane of the lens with reference to the prescribed focal plane, that is, the focus adjusting condition of the lens on the object after the integrated values have been assessed, there is provided a display control portion 20 which will next be explained by reference to FIG. 18.

As has been mentioned above, since the dual slope A/D conversion is being performed from the start of reverse integration to the attainment of the integrator output to the reference potential, that is, during the time indicated by the hatched line portion in FIG. 17(q), thereby the integrated value is converted to a digital value, in order to obtain such time, the integrated output in the form of a number of clock pulses is produced at the output 204 of the AND gate 200 by giving the second slope mode signal as shown in FIG. 17(o) from the above described transfer controller 185 to its first input terminal 201, the output 91 (FIG. 17(q)) from the comparator 89 in the circuit block 20A of FIG. 4 to its second input terminal 202, and further clock pulses of a constant frequency to its third input terminal 203.

In the following, it is assumed that the dual slope A/D conversion operates in log mode.

205 is a binary counter for counting the output pulses from the AND gate 200 to obtain the sum of the logarithms of the integrated values (the image sharpnesses) of the signals from the two photo-electrical output generating portions, that is, the products of the integrated values. When the $\bar{Q}$ output 184 of RS-FF 181 of FIG. 15 is applied to a terminal 206, the counter 205 is reset for all time except the transfer mode. 207 is an UP/DOWN counter receptive of the output pulses from the AND gate 200 for obtaining the difference of the logarithms of the integrated values (that is, the image sharpnesses) of the signal produced from the two photo-electrical output generating portions, that is, the ratio thereof. The counter 207 is reset by the reset signal applied to the above-described terminal 206. During the time when the counted number of the transfer controller 185 is not larger than 514 (cycles), the counter 207 operates in UP mode as the HIGH signal is applied. During the time when the counted number of the controller 185 is 514 or more (cycles), as the LOW signal is applied to the terminal 208, the counter 207 operates in DOWN mode. Thus the difference between the two integrated values is obtained. These counters 205 and 207 receive the output pulses from the AND gate 200 through the point 204 to count. In order that neighter of these counters 205 and 207 sinks out or underflows, a suitable clock is selected to be applied to the second input terminal 202 of the AND gate 200, or an automatic adjustment of the brightness control is made at the time of the sink out or underflow. Therefore, at the output 209 of the counter 205 there appears a production signal of the image sharpness in the form of a 4-bit signal. Also at the output 210 of the counter 207 there appears a ratio signal of the image sharpness. In this case, the output of the counter 207 is a 4-bit signal. Of these bits, one bit is used to represent a sign. In case where the production signal 209 of the image sharpness from the counter 205 is below a certain value, it means that the ability of the system to detect the in-focus condition is exceeded, or that a much defocused image is formed. Therefore, there is provided a magnitude comparator 211 arranged upon lowering below a minimum set value 212 to render the output signal 213 LOW, thereby the system is inhibited from producing output. On the other hand, the ratio signal of the image sharpness from the counter 207 represents the degree of defocus of the image under normalization of the illumination of the object, the contract and the like. And, since, of these, the most significant bit signal 214 takes LOW for the positive balue thereof, and HIGH for the negative value thereof, when it is negative, the ratio signal is complemented by an exclusive OR gate 215 to an absolute value and then given to a magnitude comparator 216. The magnitude comparator 216 compares it with a set value 217. If the degree of image focus lies in an acceptable range of deviation forward and rearward to the correct in-focus point, the absolute value of the ratio signal output from the counter 207 is smaller than the set value 217 so that a HIGH signal is produced at an output terminal 218 of the comparator 216. On the other hand, the most significant bit signal 214 of the output 210 of the counter 207, that is, the positive-negative signal of the ratio, that is, the near-focus and far-focus signal is inverted by an inverter 219 having an output which appears at a point 220. Thus, for example, as the most significant signal 214, when in the near-focus, a HIGH signal is obtained. These near-focus, in-focus and far-focus signals are obtained separately from each other through respective AND gates 221a, 221b and 221c having one input connected to the output 213 of the above-described counter 205, provided that the ability of the present system is satisfied. And, the $\overline{Q}$ output 184 of RS-FF 181 of FIG. 15 is applied to a terminal 222 along with the terminal 206 so that when the rising of its signal resets the counters 205 and 207, that is, when the processing is established, the above-described three signals, that is, the individual outputs of the AND gates 221a–221c are latched by a D-latch 223 having outputs 224a, 224b and 224c at which these three signals appear and which are supplied through respective resistors 225a, 225b and 225c to LED's 226a, 226b, 226c. As these LED's are positioned, for example, in the case of the camera, within the field of view of the finder, or at a suitable site on the camera housing, the operator can see the focus condition of the lens and detect when a condition of sharp focus is attained. It is noted that the LED's 226a–226c corresponds to the display elements 21 of FIG. 3. It is further noted that this signal can be used to actuate a servo-focus system without difficulty.

Figure 19:
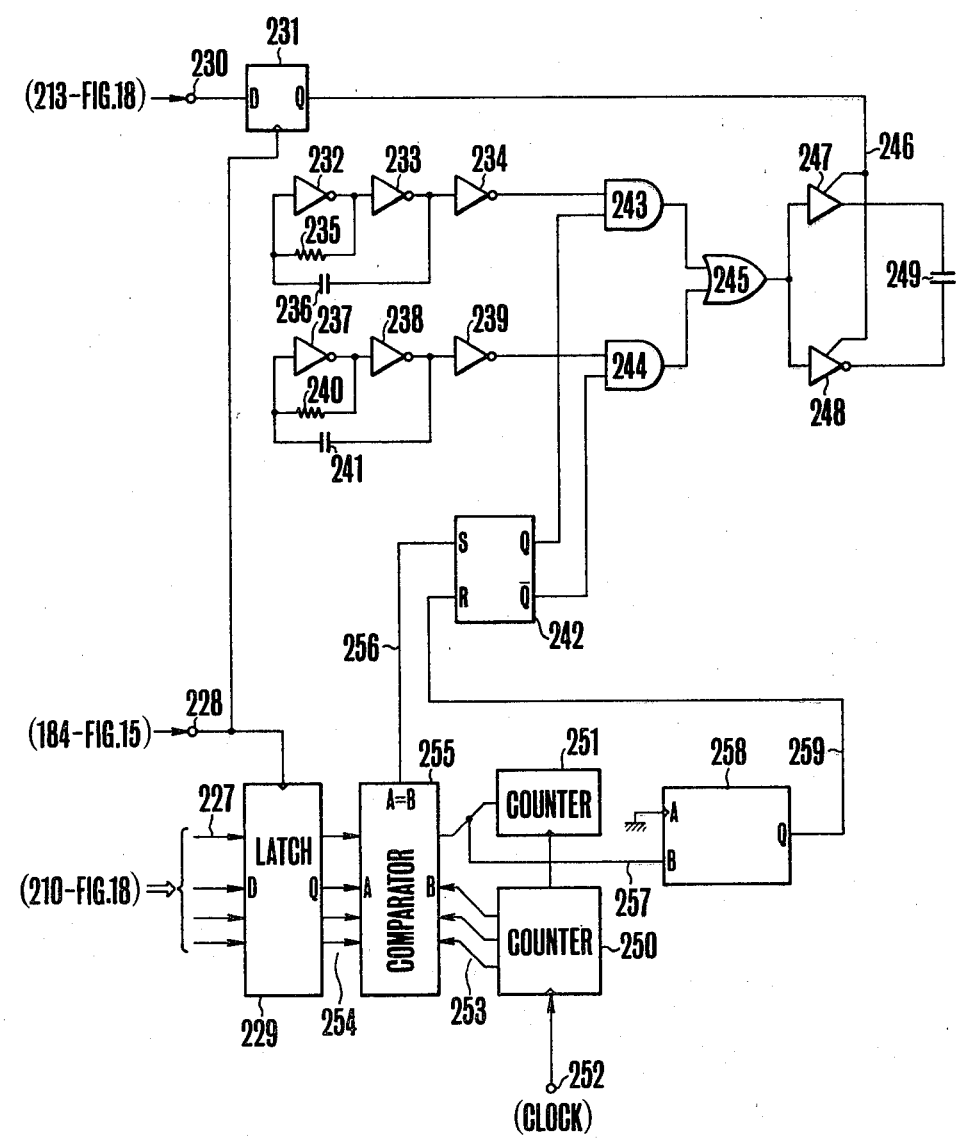
FIG. 19 is a circuit diagram, partly in block form, of another example of the display control circuit of FIG. 18 when adapted for use with a buzzer as the display means.

Next another example of this display or indication method is shown in FIG. 19 where a sound generator is used.

The output signal 210 of the counter 207 of FIG. 18 is given to the input 227 of the D-latch 229, and the $\overline{Q}$ output 184 of RS-FF 181 of FIG. 15 is given to a terminal 228, whereby the signal 210 of the input established at its rising is latched by the D-latch 229, and the output signal 213 of the comparator 211 of FIG. 18 given to the terminal 230 is latched by a D-latch 231.

Sounds of different tone are selectively produced from a first oscillator comprising inverters 232, 233 and 234, a resistor 235 and a condenser 236, and a second oscillator comprising inverters 237, 238, and 239, a resistor 240 and a condenser 241, because these oscillators produce oscillation outputs of different frequency, depending upon the Q and $\overline{Q}$ outputs of RS-FF 242 which are selected by a selector gate comprising AND gates 243 and 244 and an OR gate 245. The selected oscillation output after having been amplified by a tri-state buffer gate 247 and a likewise tri-state inverter 248 which are inhibited from producing outputs when the output signal 246 of the latch 231 becomes LOW is given to a sound forming device 249 (for example, piezo-electric speaker), thereby the degree of image focus is indicated as the duty of different sounds of two frequencies is varied.

The control of the duty is carried out in such a manner that while an UP counter 250 and a counter 251 (T-FF) are caused to be counting clocks from a terminal 252 in UP mode, its counted value 253 and the above-described output signal 254 of the latch 229 are compared by a magnitude comparator 255 upon coincidence to cause the production of a HIGH signal at an output 256 which sets the RS-FF 242. And, when the counter 251 (sign bit counter) rises, that is, when a change from positive to negative sign occurs, its output signal 257 is given to a B input of a mono-stable multivibrator 258, thereby the concurrent Q output 259 is caused to take a form of a high pulse of certain constant width which resets the RS-FF 242.

That is, as the counters 250 and 251 are of 8-scale, a loop counting starts from "00" and proceeds to "07", then reaches "10", and after that reverts from "17" to "00". Therefore, the change from "07" to "10" leads to reset the RS-FF 242, and when the counted value coincides with the output 254 of the latch 229, it is set, so that, depending upon the value of the comparison signal from "07" through "00" to "10", the duty is varied to, for example, 14:2 for considerably one-sidedly blurred image in "06", 8:8 for sharp focus in "00", or 7:9 for slight shift toward the opposite in "17(-1)".

The foregoing description has been made on the principal signal processing techniques for the detection when the image is in sharp focus, as well as on the control of the various sequences therefor in greater detail. Next explanation is given to a method of further enhancing the ability to detect the in-focus condition. As CCD or other image sensor can store video signal for a desired time, it has been mentioned to utilize this property in controlling the integration period in accordance with the object brightness. However, when the object brightness is extremely low, the integration period becomes so long that the occurrence of camera vibrations during the charge storage tands to disturb the image sharpness and therefore to lower the in-focus detecting performance to an unacceptable level. With such consideration in mind, according to the present invention, it is proposed that a certain number of outputs of optical-electronic transducer elements are added together so that the system may operate with a relatively short integration period, thus eliminating the bad influences due to the above-described vibrations. In this case, though the effective area of a single optical-electronic transducer element is apparently widened with some decrease in the resolution, on the whole, the system is made responsible for the in-focus detection even to low object brightnesses.

In practice, a portion of the control block that follows the above-described transfer controller 185 is varied follows the above-described transfer controller 185 is varied so that the photo-signals from the optical-electronic transducer elements are added in groups of several units to effect an increase in the signal level for an equivalent integration period under an equivalent illuminance, thus achieving an easy and quick signal processing with slight sacrifice of the accuracy of image sharpness detection. For example, every n photo-electrical outputs are added to form a single photo-signal which is free from the influence of hand-shake or the like, as the integration period can be made shorter (wherein n is the natural number except unity).

For this purpose, the reset signal given to the reset terminal 44 of the photo-electrical output control portion 14 of FIG. 4 or 12 is made to occur in a timing of the clock $\phi_1$ of n-cycles step beginning with the first cycle of the lower 9 bits of the output of the transfer controller 185. By this, the signal of FIG. 17(e) is established from the clock $\phi_3$ of n-cycles step beginning with the n-th cycle to the clock $\phi_1$ of the next cycle.

Next, the signal given to the control terminal 48 of FIG. 4 or 12, that is the signal shown in FIG. 17(f) is made to occur in a timing of the clock $\phi_4$ of n-cycles step beginning with the n-th cycle, thereby the output signal of the photoelectrical output portion 14, that is, the signal shown in FIG. 17(g) is established in the interval from the clock $\phi_4$ of n-cycles step beginning with the n-th cycle to the next clock $\phi_3$.

Next the signal shown in FIG. 17(b) given to the control terminal 49 of the video signal change detecting portion 16 of FIG. 4 is made to occur in a timing of the clock $\phi_0$ of n-cycles step beginning with the (n+1)th cycle.

Figure 17:
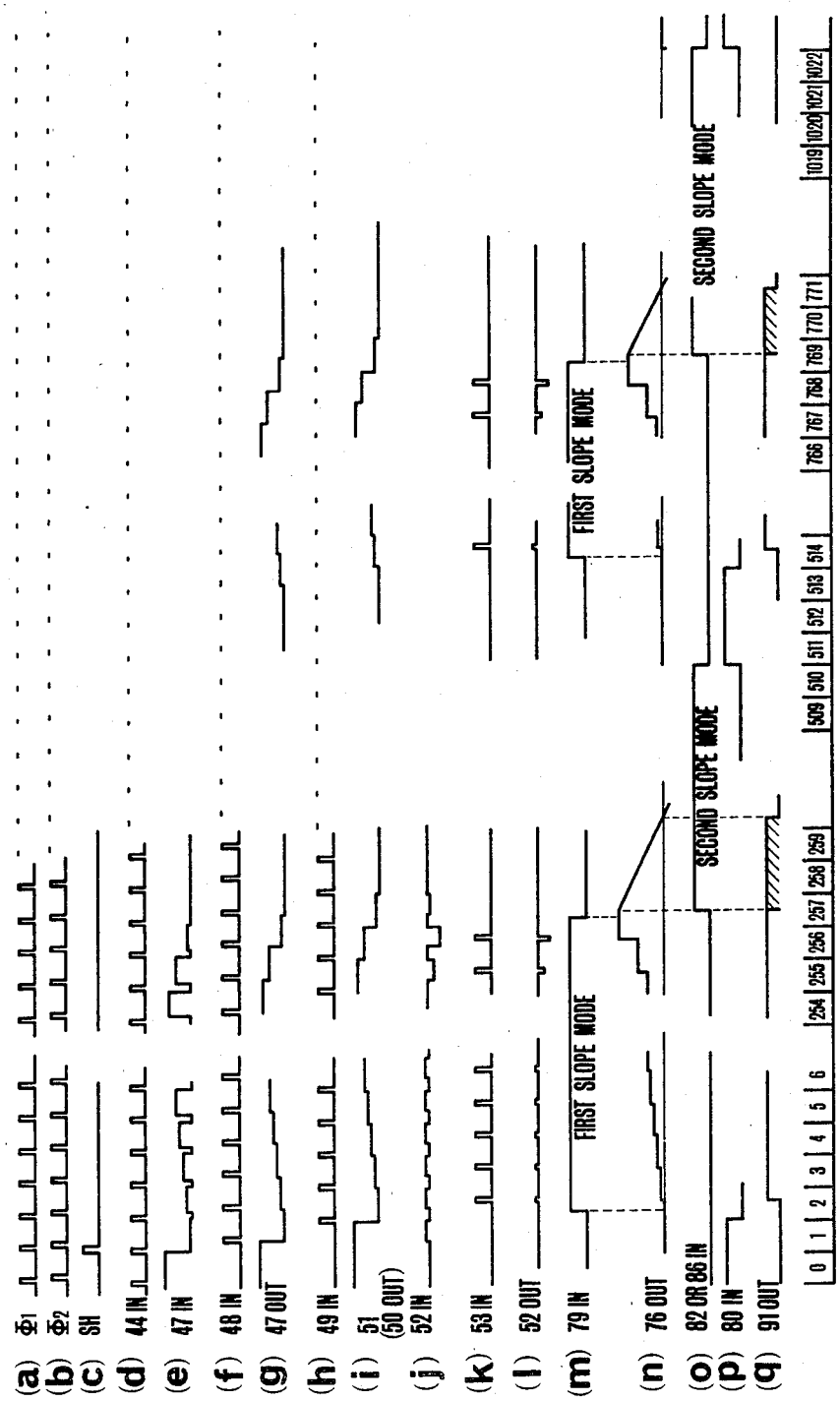
FIG. 17 is a pulse timing chart showing a manner in which the analogue circuit system of FIG. 4 operates as is controlled by the main sequence circuit of FIG. 15.

Next the signal shown in FIG. 17(k) given to the terminal 53 of FIG. 4 is made to occur in a timing of the clock $\phi_6$ of n-cycles step beginning with the n-th or 2n-th cycle. By this, the effective portion of the signal shown in FIG. 17(*l*) is made to occur in a timing the clock φ6 of n-cycles step beginning with the 2n-th cycle.

It is noted that the effective portion in the differentiated form as in FIG. 11 is produced when the signal of FIG. 17(g) changes, that is, in a timing of the clock φ3 of n-cycles step beginning with the 2n-th cycle. For this reason, the first slope mode signal of FIG. 17(*m*), that is, the field signal has to occur from [2n−φ3] to [257−φ2].

Since the addition of each n photo-electrical outputs, though suffering from some loss in the resolution, makes it possible to carry out the processing under the condition of a shorter integration period particularly for a darker object, there is brought forth an advantage that the influence due to the integration period in the hand shake or the like can be minimized.

Next explanation is given to the reference signal for use in changing over the integration period. This is introduced through a terminal 29 of the analogue shift register 28 of FIG. 4 in between the 50th and 100th cycles after the start of transfer of the transfer controller 185. That is, during the time [50−φo]−[99−φ9], the terminal 24 of FIG. 4 is rendered HIGH, and the terminal 25 of FIG. 4 is rendered LOW, so that a terminal voltage almost equal to the terminal 25 of FIG. 4 is applied to the analogue shift register 28 to obtain a reference for the maximum value. That is, this signal is produced from the analogue shift register 28 in delay of 768 cycles (256×3), and, therefore, appears at the point 39 of FIG. 4 in a timing of [818−φ3][868−φ2]. Therefore, in FIG. 12, to the terminal 129 is applied a clock which becomes HIGH at the 800th cycle and is addition-latched in correspondence to a certain voltage when the terminal 29 of FIG. 4 is LOW. Also to the terminal 131 of the FIG. 12 is applied a clock which becomes HIGH at the 850th cycle and is addition-latched in correspondence to a certain voltage when the above-described terminal 29 is HIGH. Thus, the reference voltages for the maximum and minimum are caused to latch. Likewise, the terminal 135 of FIG. 12 is reset in clock-synchronism with the clock which becomes HIGH at the 1st cycle after the start of transfer, and the terminal 133 of FIG. 12 is given by a signal which becomes HIGH during the time from [n−0/4] to [256−φ9] of the lower 9 bits of the transfer controller 185 corresponding to the addition-rectified signal of each optical-electronic transducer element.

Figure 20:
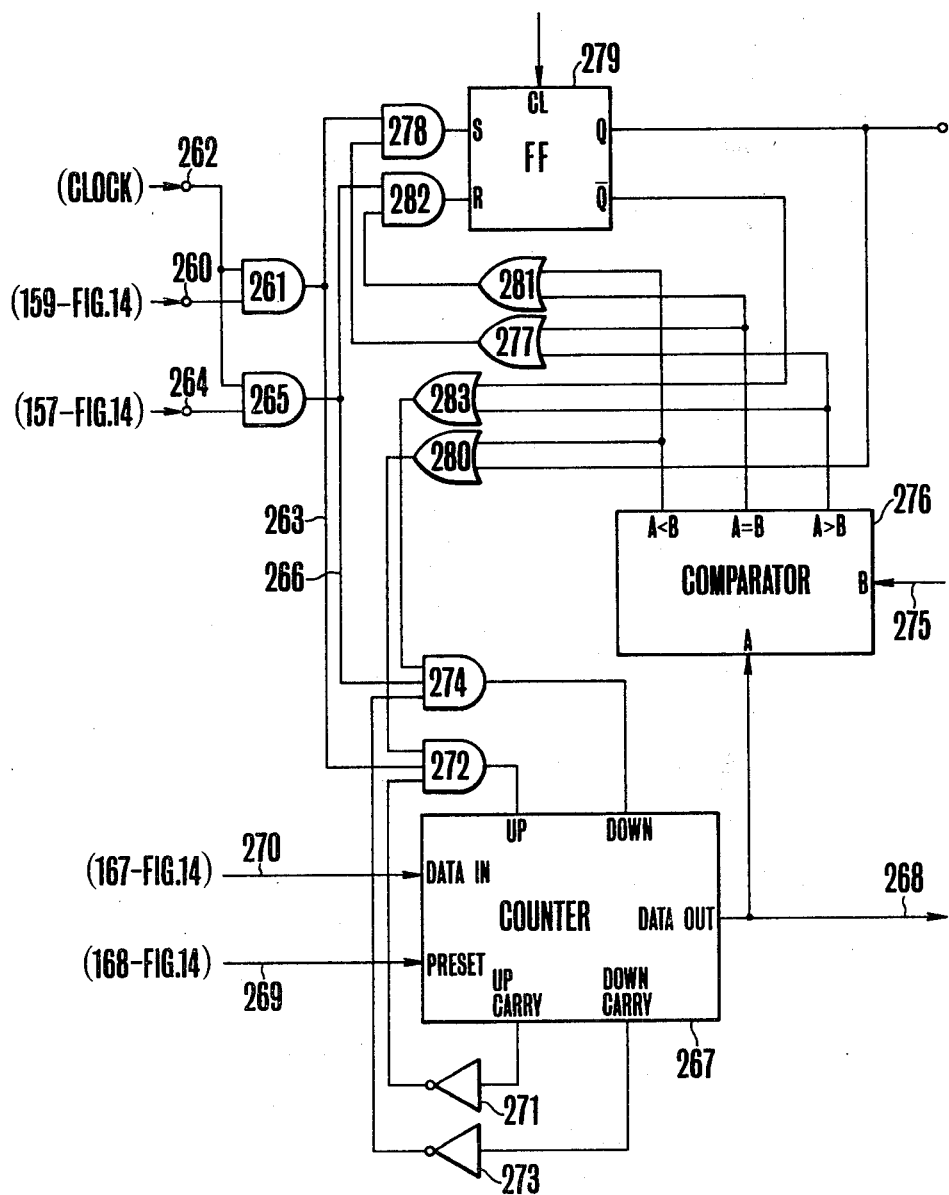
FIG. 20 is a circuit diagram of an example of a charge integration period control circuit usable when the number of added image compartments is made variable.

FIG. 20 shows an example of such addition number change-over type integration period control circuit for obtaining a signal by a shorter integration period due to the addition of optical-electronic transducer elements.

Basically it is identical to that of FIG. 14. When the peak value of the signal is too low, the output 159 of the comparator 158 of FIG. 14 is received to render the terminal 260 HIGH. As a result, an AND gate 261 responsive to the clock which is clock-synchronized with, for example, the 1022th cycle at a terminal 262 produces a clock for increasing the integration period at a point 263.

Again when the signal peak is too high, the output 157 of the comparator 156 of FIG. 14 is received to render the terminal 264 HIGH. As a result, an AND gate 265 produces a clock at a point 266 to reduce the integration period. The integration period in the form of the output 268 of an UP-DOWN counter 267 for the counted value is determined as the required value of integration period indicated by the output 164 of the counter 163 of FIG. 14. When in throwing in the electrical power source, as has been mentioned above, by giving to the preset control input 269 of the above-described counter 267 the electrical power source throwing in signal indicated by the preset control input 168 of the counter 163 in FIG. 14, the initial set value previously given to a data input 270 of said counter 267 indicated by the data input 167 of the counter 163 in FIG. 14 is preset in said counter 267, thus the concurrent output 268 thereof being made as the initial value.

An inverter 271 responsive to the change of the look ahead carry signal from HIGH to LOW just before the sink out of the UP/DOWN counter 267 makes an AND gate 272 unable, thereby the sink out is prevented.

Likewise, an inverter 273 responsive to the change of a look ahead borrow signal from HIGH to LOW just before the underflow of the UP/DOWN counter 267 makes an AND gate 274 unable, thereby the underflow is prevented.

Figure 21:
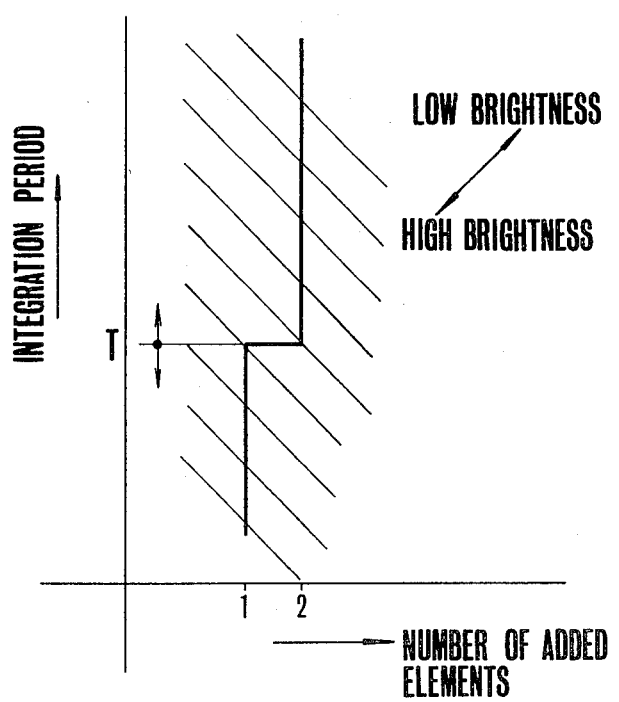
FIG. 21 is a graph showing a relationship between the number of added image compartments set in the circuit of FIG. 20 and the charge integration period.

This actuation causes the number of added elements to be changed over at a certain set value T as shown in FIG. 21, or otherwise causes the integration period to be changed over successively.

That is, in order to sense this turning point, the above-described set value T (indicated by 275 in FIG. 20) and the required value of integration period in the form of an output 268 of the counter 267 are applied to a magnitude comparator 276.

For example, in FIG. 21, when the present integration period is longer than this T value, and when the present signal level is too small, that is, still darker, the output of an OR gate 277 is changed to HIGH by the A>B output of the magnitude comparator 276. Responsive to this, an AND gate 278 passes the signal 263 of the AND gate 261, that is, the signal for requiring an increase of the integration period therethrough to set an RS-FF 279, thus the outputs of the optical-electronic transducer elements 30 are added in every two elements.

In case where even each two-elements addition is still darker, the output of an OR gate 280 is HIGH by the Q output of the RS-FF 279, so that the output from the AND gate 272 causes the counter 267 to count up so as to elongate the integration period.

Similarly, when the present integration period is below this T, that is, a short integration period, and the present signal is too large, that is, too bright, the output of the OR gate 281 is changed to HIGH by an A<B output of the comparator 276, thereby causing an AND gate 282 to pass the output 266 of the AND gate 265, that is, a signal for requiring reduction of the integration period therethrough to reset the RS-FF 279. In case where it is still brighter inspite of this setting, because the output of the OR gate 283 is rendered HIGH by the $\overline{Q}$ output of this RS-FF 279, the output from the AND gate 274 causes the counter 267 to count down so as to shorten the integration period.

Conversely when the present integration period is not longer than T, that is, a shorter integration period, and when the present signal is too small, the output of the OR gate 280 is rendered HIGH by the A<B output of the comparator 276, causing the output of the AND gate 272 to set the counter 267 in countup mode. Again, when the present integration period exceeds T, that is, a longer integration period, and when the present signal is too large, the output of the OR gate 283 is rendered HIGH by the A>B output of the comparator 276, causing the output from the AND gate 274 to set the counter 267 in count-down mode.

Such provision in combination with the means for adding an arbitrary number of outputs of the optical-electronic transducer elements 30 ensures that the system operation can be stabilized over an extended range of brightness, and the accuracy of detection is left little lowered.

It is noted that FIG. 20 shows the use of the UP/DOWN counter in carrying out such addition change. But, the result of addition and the result of the UP/DOWN counter are computed by an adder which then produces an output. This output may be used in controlling the integration period. It is also possible to develop such system to addition of more than two elements. It is further possible that the number of added elements and the upper limit of the integration period range are controlled manually by the user, or automatically in response to, for example, the lens performance, since the resolution-poor lens is insensible in performance to the increase in the number of added elements, and the telephoto type lens is apt to cause the hand-shake, and calls for an increase in the number of added elements with decrease in the integration period. Particularly with the possibility of selection by the user, an advantage can be expected as the necessity of minimizing the influence of the hand-shake and the use of a tri-pod or like in fixedly supporting the camera which requires to put no limit on the integration period are selectively encountered.

Now, as has been mentioned above, since the two image-sensing portions are positioned at the respective locations apart from the prescribed focal plane for the lens to receive portions of the common field, it is not always insured that the images formed on the two image-sensing portions are of exactly the same object, but different only in the sharpness. For example, particularly when a glaring contrast object image lies just outside the area of one of the image-sensing portions, its image appears to be blurred on the other image-sensing portion, thus giving excessive information.

In order to minimize such phenomenon, or so-called boundary stress, according to the present invention, a "window function" is introduced to under-estimate that part of the information which comes from the marginal portion of the field as compared with the other part which depends upon the central part thereof. That is, the lower 9 bits of the count output of the transfer controller 185 of FIG. 15 are used to detect the positions (2–256 cycles) from which the information of the individual optical-electronic transducer elements can be obtained as shown in FIG. 17, and this controls the digital value of the input terminal 61 of FIG. 4, thus making the window function.

Figure 22:
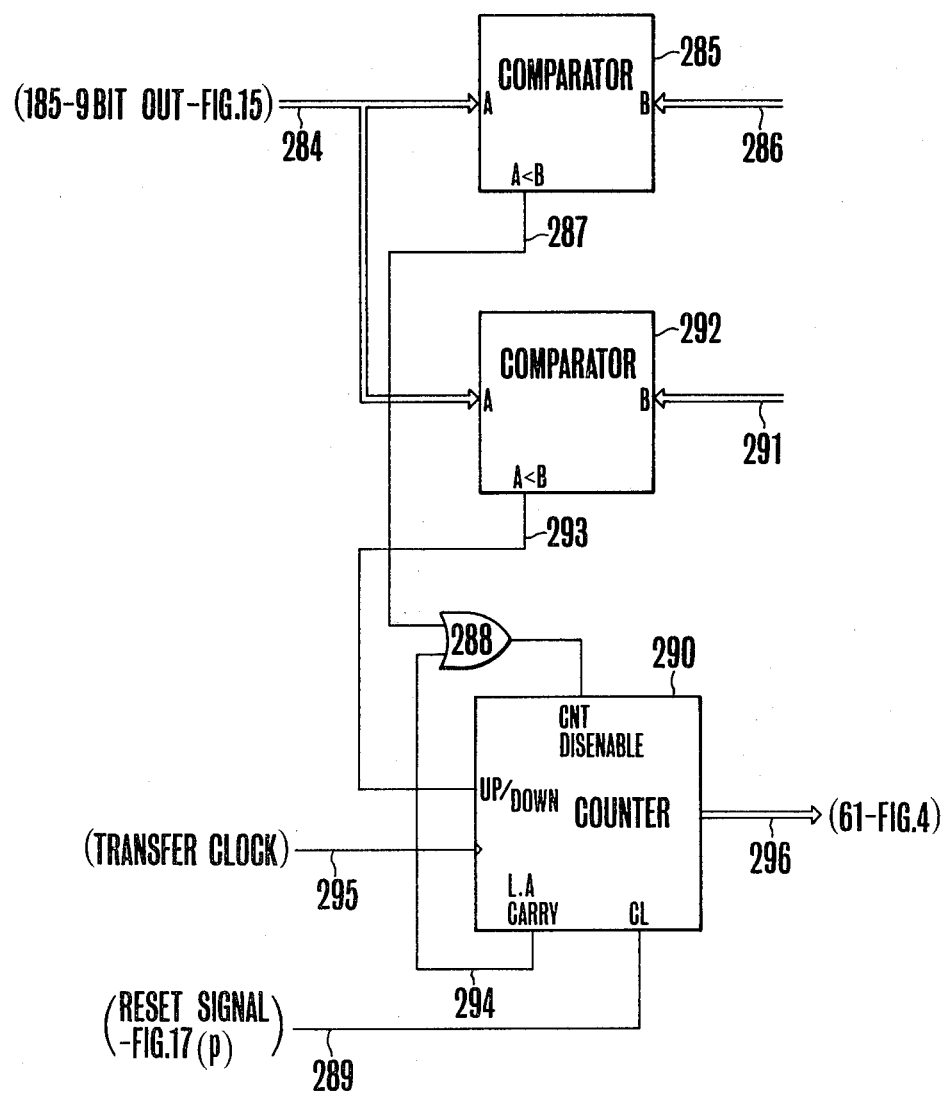
FIG. 22 is a circuit diagram, partly in block form, of an example of a "window function" generation block usable as the emphasis characteristic control block in the circuit system of FIG. 3.

FIG. 22 shows an example of it. An input 284 is given by the lower 9 bits information of the count output of all 10 bits of the above-described transfer controller 185 and is compared by a magnitude comparator 285 with an address-in-field signal indicated by 286 for the start of opening the window. And, before the start, a HIGH signal is obtained at an output line 287, and is applied to an OR gate 288 having an output which inhibits the counting, and a reset signal shown in FIG. 17(p) is given to a terminal 289, thereby the content of an UP/DOWN counter 290 for the window function is maintained zero. At first, the transfer cycle number at the input 284 is fewer than an address-in-field signal for the start of closing of the window, so that the UP/DOWN counter 290 is set in UP-count mode by the HIGH output 293 of the magnitude comparator 292.

Next, as the transfer cycle number given to the input 284 exceeds the set value indicated by 286, the window starts to open. In this case, the comparator 285 produces a LOW signal which is applied through the OR gate 288 to the UP/DOWN counter 290, so that so long as the look ahead carry signal 294 is LOW, that is, until the counter 290 sinks out, the output of the OR gate 288 remains LOW to permit the counting of transfer clock. Thus, the counter 290 advances upward. And this counted value is given as a window control command from a terminal 296 to the above-described terminal 61 of FIG. 4, thereby the reference levels for the emphasis and suppression are changed to control the window function. After that, the counter 290 produces a look ahead carry signal 294 at the maximum value just before the sink out, and stops itself from further counting by the OR gate 288. After that, if the transfer cycle number given to the input 284 exceeds the set value indicated by 291, the output 293 of the magnitude comparator 292 becomes LOW to change the UP-count mode of the UP/DOWN counter 290 to the DOWN-count mode. This mode continues until the look ahead carry signal 294 is produced, that is, an underflow occurs, thereby the window function is being closed. When the counted value of the counter 290 became zero, the counting is stopped by the carry signal 294.

In such a manner, the window function is generated and controlled to reduce the weight of information near the harmful boundary and therefore to suppress the boundary strain.

It is noted that in this embodiment, as has been mentioned above, the analogue shift register is used to carry out the parallel-series conversion of the outputs of the individual optical-electronic transducer elements to obtain a time sequential signal depending upon the arrangement of these elements. But the aim of this embodiment is to simplify the signal circuit by the use of the time-sequential signal. Therefore, instead of using the analogue shift register, it is also possible to use, for example, an analogue multiplexer arranged to operate with the counted value of the above-described transfer controller 185 to effect an equivalent result in obtaining a time sequence of photo-electrical outputs of the individual elements.

Next, the details of the internal structure of the above-described transfer controller 185 are explained.

Figure 23:
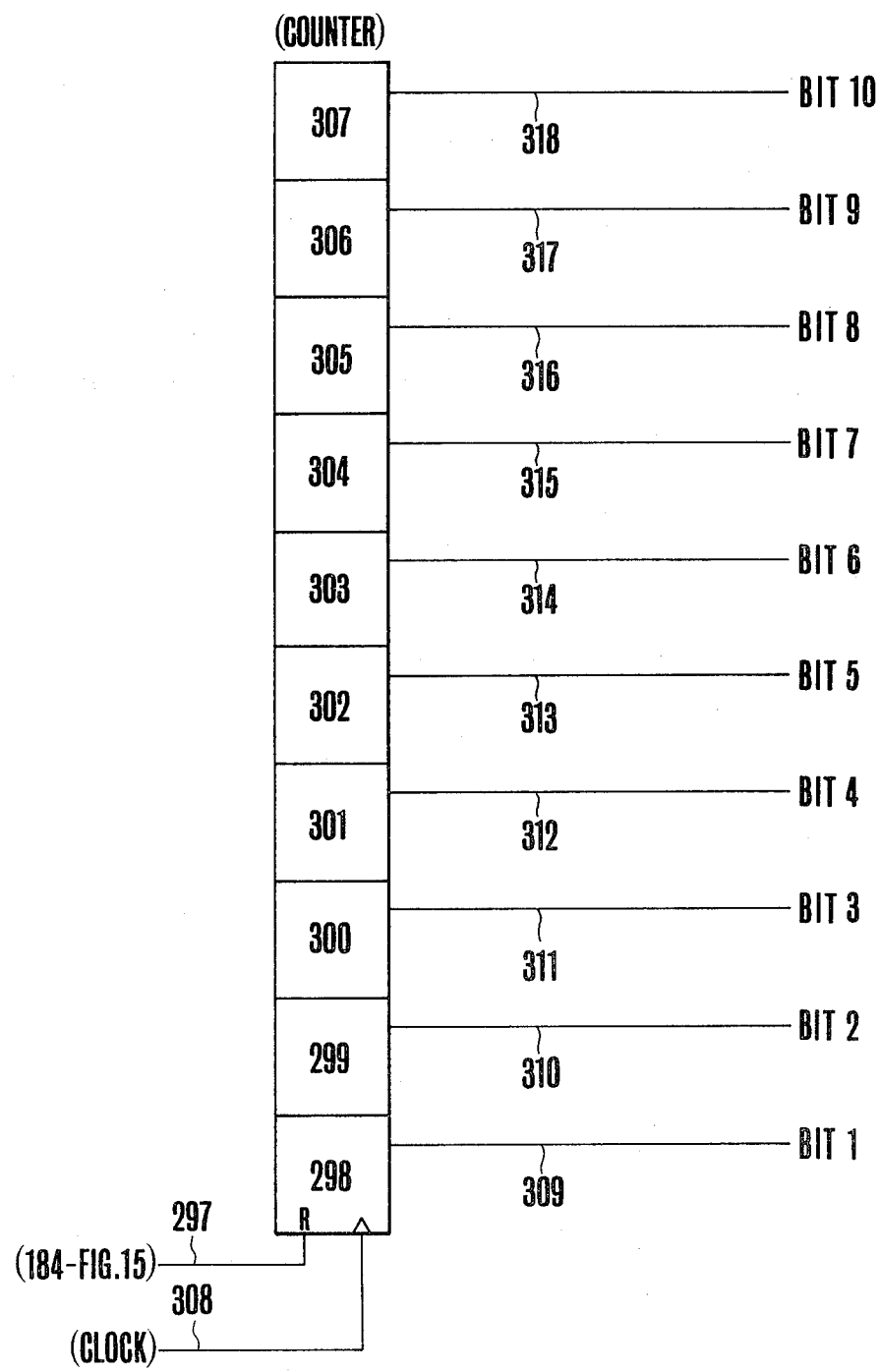
FIG. 23 is a block diagram showing the details of the counter in the transfer control circuit of FIG. 15.

FIG. 23 shows the portion thereof which is a counter having a reset input 297 to which the $\overline{Q}$ output 184 of RS-FF 181 of FIG. 15 is applied. When the reset input 297 is HIGH, the counter is reset. This counter has ten binary counter stages 298 to 307 for counting input clock 308. As the input clock 308, when to give the clock $\phi_9$ from the main clock generator 170 of FIG. 15, the counting advances in a timing with its falling edge, and when to give the clock $\phi_0$, in timing with its rising edge, therefore, as a result, with $\phi_0$.

These counters 298–307 produce outputs of the counted values at 309–318 in the form of two-valued signals (hereinafter there are described as bit 1–bit 10).

FIGS. 24 to 28 are examples of logic circuits for providing the various outputs each of which will be described below successively.

At first, an input clock pulse $\phi_1$ to be applied to the terminal 37 of the analogue shift register 124a–124c of FIG. 12, or the analogue shift register 28 of FIG. 4 is obtained by passing the clock $\phi_2$ through a buffer gate 319 to produce output at its output line 320. Also the output clock pulse $\phi_2$ to be applied to the terminal 38 of the analogue shift register 124a–124c, or the analogue shift register 28 of FIG. 4 is obtained by passing the clock $\phi_3$ through a buffer gate 321 to produce an output at its output line 322. Also the reset signal to be applied to the reset terminal 135 of the peak hold circuit 134 of FIG. 12 for peak hold is obtained by an AND gate 323 having an output which becomes HIGH at only the first cycle of the 1024 cycles of the counter (298–307).

The shift pulse SH to be applied to the shift gate terminal 35 of the charge shift portions 123a–123c of FIG. 12, or the shift gate FET switch 34 of FIG. 4 for the charge shift is obtained by an AND gate 325 having an output 326 which becomes HIGH during the time between the clock $\phi_1$ and $\phi_2$ in the 1st cycle of the 1024 cycles of the counter (298–307). The reset signal to be applied to the reset terminal 44 of the photoelectrical output control portion 14 of FIG. 12 or FIG. 4 for the addition of an arbitrary number of photo-electrical outputs is obtained by an AND gate 327 having an output 328 having an output 330 which becomes HIGH in the odd-numbered cycles when the number of added elements is two, and in each cycle when the number of added elements is one, and further by an AND gate 331 having an output 332 which becomes HIGH at the clock $\phi_1$ of n-cycles step beginning with the 1st cycle. The two-element addition command is given from the input 333. This is the Q output of RS-FF 279 of FIG. 20. The same holds in the following.

The signal to be applied to the terminal 48 of the sample and hold circuit 47 in the photo-electrical output control portion 14 for the addition rectify is obtained by an AND gate 334 having an output 335 which becomes HIGH at the even-numbered cycles when the number of added elements is two, and by an OR gate 336 responsive thereto for producing an output 337 which becomes HIGH in the odd-numbered cycles when the number of added elements is two, or in each cycle when the number of added elements is one, and further by an AND gate 338 responsive thereto for producing an output 339 which is HIGH at the clock $\phi_4$ of n-cycles step beginning with the n-th cycle.

The signal for illuminance difference detection to be applied to the terminal 53 of the difference amplifier 52 in the video signal change detecting portion 16 of FIG. 4 is obtained by an AND gate 340 having an output 341 which becomes HIGH at the time point of the clock $\phi_6$ of n-cycles step from the n-th cycle out of the output 337 of the above-described OR gate 336.

Figure 24:
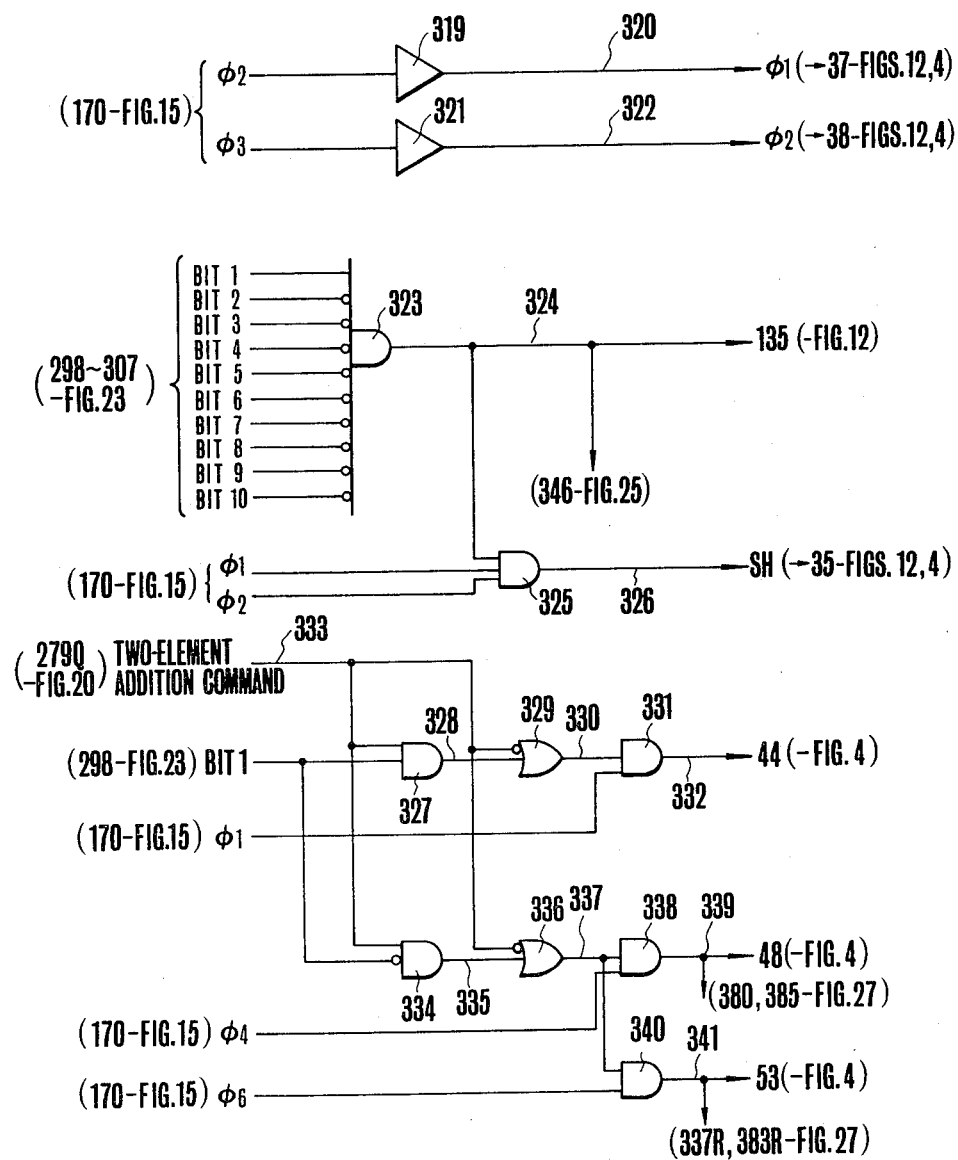
FIGS. 24, 25, 26, 27 and 28 are circuit diagrams showing the details of the respective portions of the transfer control circuit of FIG. 15.
Figure 25:
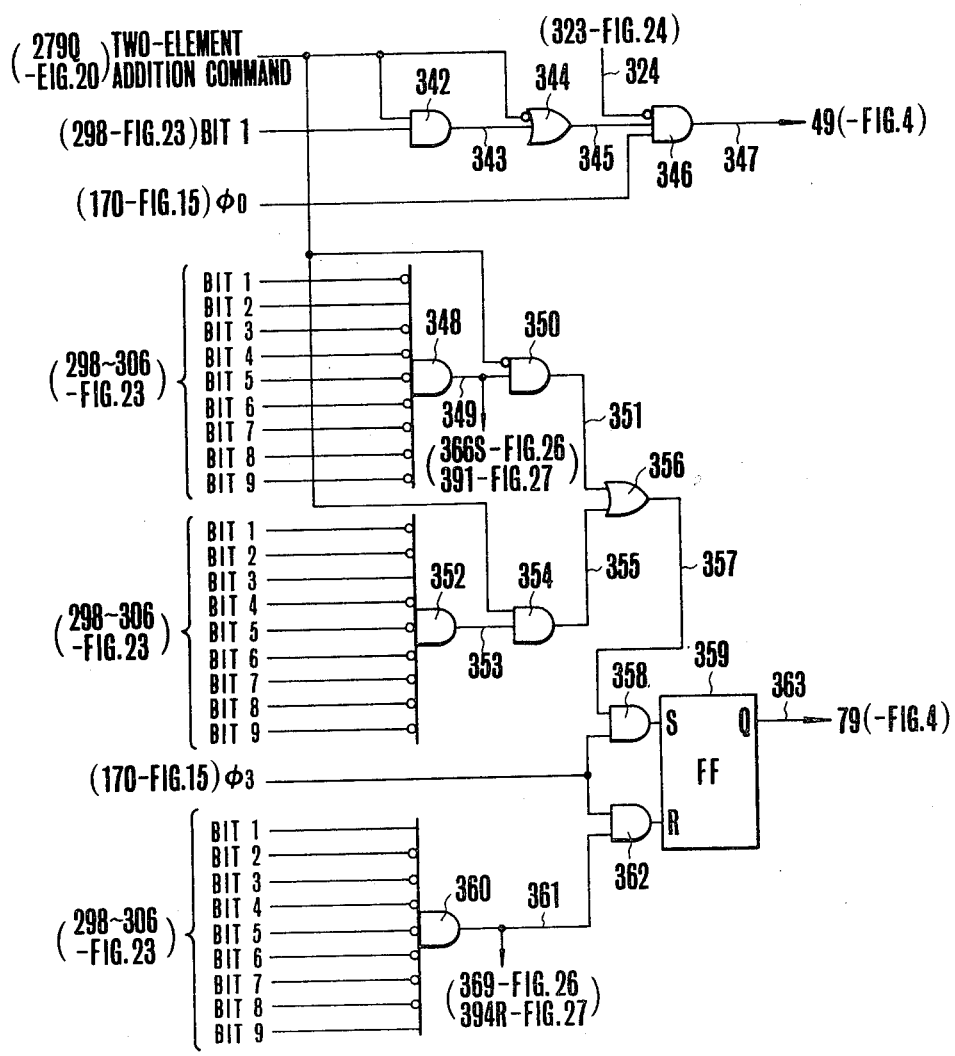

The signal for the similar illuminance difference detection to be applied to the terminal 49 of the sample and hold circuit 50 in the above-described video signal change detecting portion 16 is obtained by an AND gate 342 of FIG. 25 having an output 343 which becomes HIGH in the odd-numbered cycles when the number of added elements is two, by an OR gate 344 responsive thereto for producing an output 345 which is HIGH in the odd-numbered cycles when the number of added elements is two and in each cycle when the number of added element is one, and further by an AND gate 346 responsive thereto and receptive of the output 324 of the AND gate 323 of FIG. 24 at its first input terminal for producing an output 347 which becomes HIGH at the time of the clock $\phi_0$ of n-cycles step from the (n+1)th cycle.

The signal for integration of the illuminance differences within the field to be applied to the terminal 79 of the dual integrating portion 19 of FIG. 4 is obtained first by an AND gate 348 having an output 349 which is HIGH at the only 2nd cycle of every 512 cycles, and by an AND gate 350 responsive thereto for producing an output 351 which becomes HIGH at the 2nd cycle of every 512 cycles when the number of added elements is one. On the other hand, an AND gate 352 produces an output 353 which becomes HIGH until the 4th cycle of every 512 cycles. Responsive to this, an AND gate 354 produces an output 355 which becomes HIGH until the 4th cycle of every 512 cycles when the number of added elements is two. Responsive to this, an OR gate 356 produces an output 357 which becomes HIGH at the 2n-th cycle of every 512 cycles. Further responsive to this, AND gate 358 produces an output which sets the RS-FF 359 in a timing of the clock $\phi_2$ of the 2n-th cycle of every 512 cycles. Similarly, an AND gate 360 produces 361 which becomes HIGH at the 257th cycle of every 512 cycles. Responsive thereto, an AND gate 362 produces an output which resets the RS-FF 359 in a timing of $[257-\phi_3]$ of every 512 cycles. Responsive thereto, the RS-FF 359 produces a Q output 363 which becomes HIGH from $[2n-\phi_3]$ to $[257-\phi_3]$ of every 512 cycles and which is applied to the above-described terminal 79.

Figure 26:
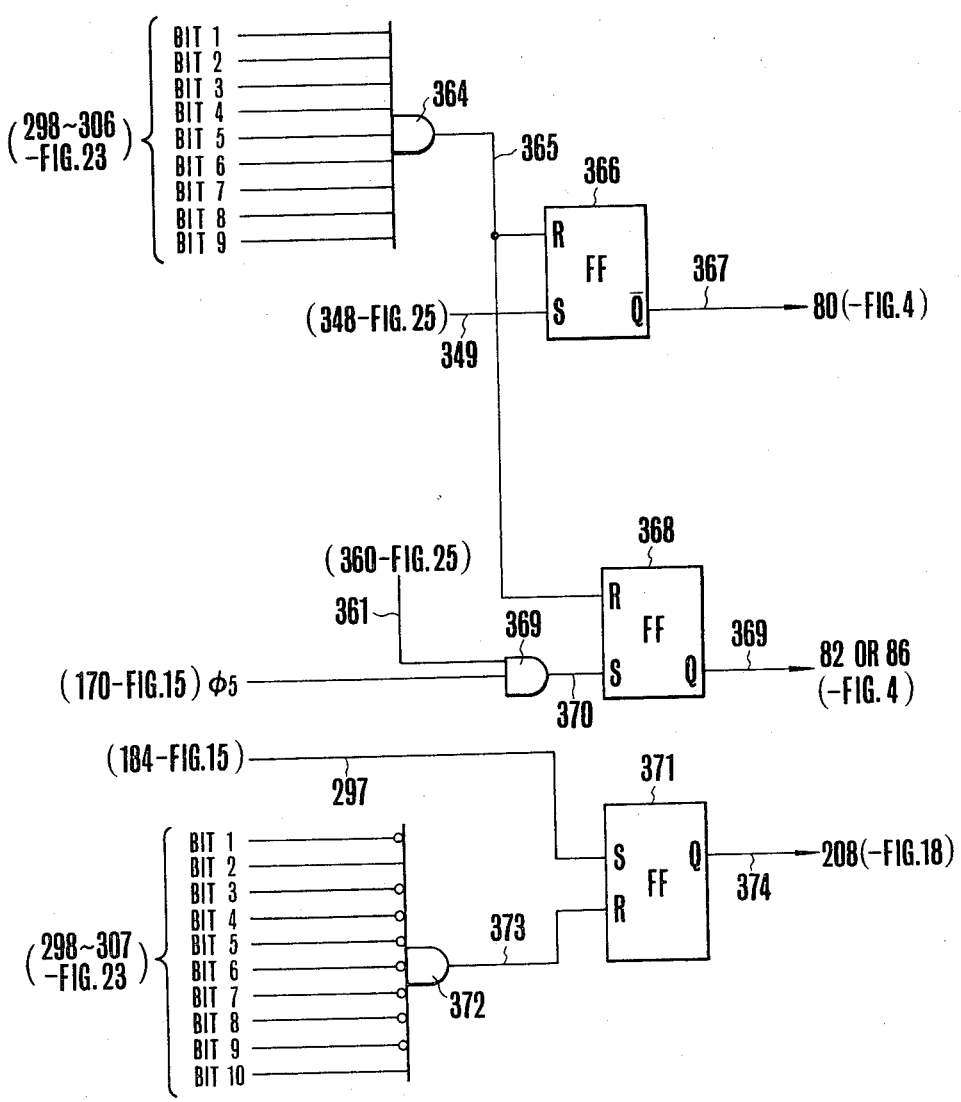

The reset signal for resetting the integration to be applied to the terminal 80 of the above-described dual integrating portion 19 is obtained by an AND gate 364 of FIG. 26 having an output 365 which becomes HIGH until the 511th cycle of every 512 cycles and which is used as a reset signal for the RS-FF 366. This RS-FF 366 is arranged to be set by the signal of the 2nd cycle of every 512, or the output 349 of the AND gate 348 of FIG. 25, and therefore, its Q output is obtained which is LOW from the 2nd cycle to the 511th cycle of every 512 cycles, that is, HIGH from the 511th cycle to the 514th cycle, and from the 1023rd cycle to the next two more cycles. This is applied to the terminal 80.

The second slope mode signal for reverse integration to be applied to the terminal 86 or 82 of the above-described dual integrating portion 19, for example, that shown in FIG. 17(o), is obtained first by the above-described AND gate 364 having the output 365 which becomes HIGH at the 511th cycle of every 512 cycles to reset the RS-FF 368, and by the above-described AND gate 360 of FIG. 25 having the output 361 which is HIGH at the 256th cycle of every 512 cycles and which is applied to the gate 369 of an AND gate 369 having an output 370 which becomes HIGH at $[257-\phi_5]$ of every 512 cycles, and by an RS-FF 368 responsive to said output 370 for producing a Q output 369 which is HIGH at $[257-\phi_5]$ to $[511-\phi_0]$ of every 512 cycles. This is applied to the above-described terminal 82 or 86.

The control signal for in-focus computation and discrimination of the first and second images to be applied to the terminal 208 of the UP/DOWN counter 207 is obtained by giving the $\overline{Q}$ output 184 of the RS-FF 181 of FIG. 15 to the set input of an RS-FF 371 to effect the setting at the start of counting, and by an AND gate 372 having an output 373 which becomes HIGH at the 514th cycle of every 1024 cycles to reset the RS-FF 371 which then produces an output Q 374 which is HIGH until the 514th cycle. This output is given thereto.

Figure 27:
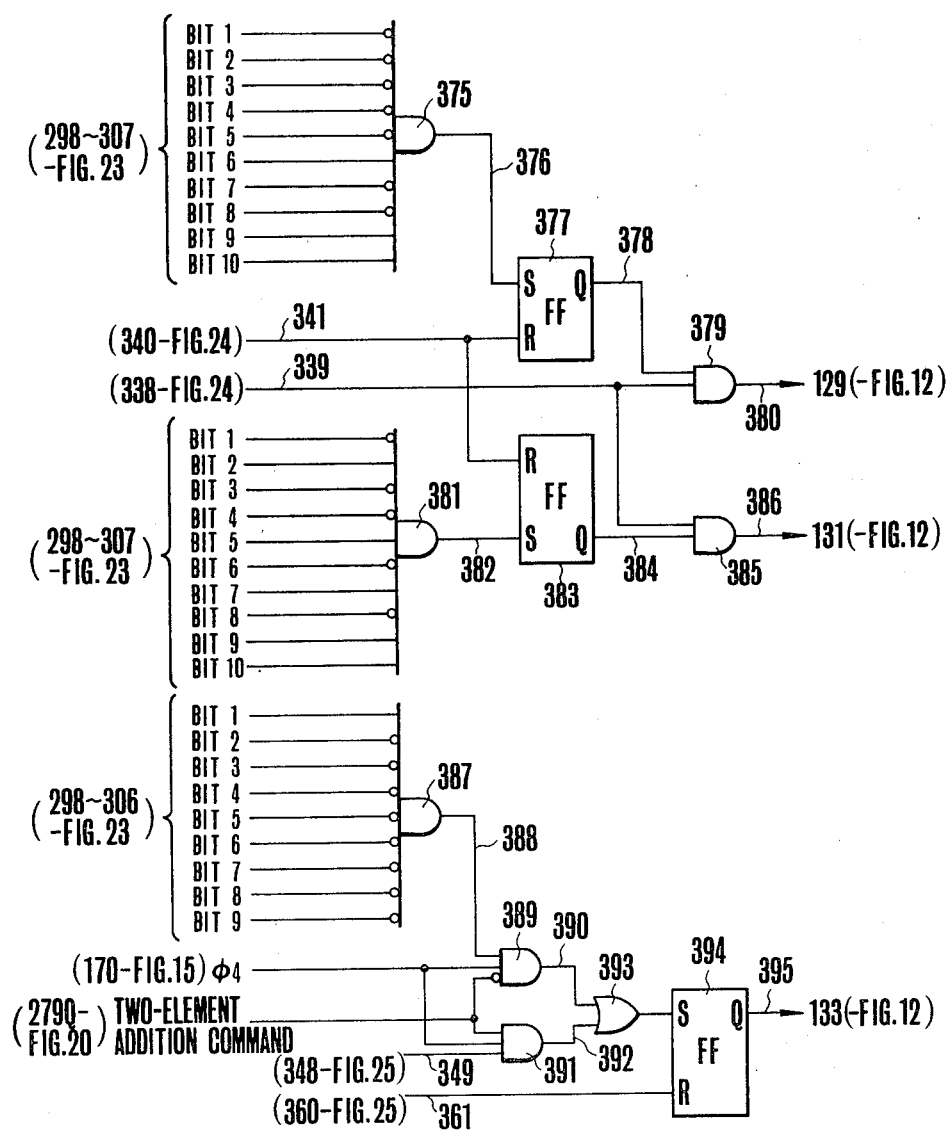

The signal to be applied to the terminal 129 of the sample and hold circuit 130 of FIG. 12 is obtained first by an AND gate 375 of FIG. 27 having an output 376 which becomes HIGH at the 800th cycle of every 1024 cycles to reset an RS-FF 377, then, also this RS-FF 377 is reset by the high output 341 of the AND gate 340 of FIG. 24. For this reason, its Q output 378 becomes HIGH from the 800th cycle until the output 341 of the AND gate 340 becomes HIGH, that is, at least [800−$\phi_6$]. And, by an AND gate 379 there is produced an output signal 380 which becomes high at the output 339 of the AND gate 338 of FIG. 24 between [800−$\phi_0$] and [800−$\phi_6$], for example, at [800−$\phi_4$]. This signal is applied to the above-described terminal 129.

The signal to be applied to the terminal 131 of the sample and hold circuit 132 of FIG. 12 is obtained first by an AND gate 381 having an output 382 which becomes HIGH at the 850th cycle of every 1024 cycles to set an RS-FF 383. Then, this RS-FF 383 is reset by the HIGH of the output 341 of the AND gate 340 of FIG. 24. For this reason its $\overline{Q}$ output 384 serves as a signal which becomes HIGH from the 850th cycle to the change of the output 341 of the AND gate 340 to HIGH, that is, until at least [850−$\phi_6$]. And by an AND gate 385 there is produced an output 386 which becomes HIGH between [850−$\phi_0$] and [850−$\phi_6$] at the output 339 of the AND gate 338 of FIG. 24, that is, for example, [850−$\phi_4$]. This signal is applied to the above-described terminal 131.

The signal for peak hold to be applied to the terminal 133 of the peak hold circuit 134 of FIG. 12 is obtained by an AND gate 387 having an output 388 which is HIGH at the 1st cycle of every 512 cycles, by an AND gate responsive thereto for producing an output 389 which becomes HIGH at [1−$\phi_4$] of every 512 cycles when the number of added elements is one, and by giving the output 349 of the AND gate 348 of FIG. 25, that is, the signal which becomes HIGH at the 2nd cycle of every 512 cycles, to an AND gate 391 which then produces an output 392 which is HIGH at [2−$\phi_4$] of every 512 cycles when the number of added elements is two. Then, responsive thereto, an OR gate 393 produces an output which resets an RS-FF 394 at [n−$\phi_4$] of every 512 cycles. And, the output 361 of the AND gate 360 of FIG. 25, that is, the signal which becomes HIGH at the 257th cycle of every 512 cycles, is applied to the reset input of said RS-FF 394 to produce its Q output 395 which becomes HIGH between [n−$\phi_4$] and [257−$\phi_0$] of every 512 cycles. This output is applied to the above-described terminal 133.

Figure 28:
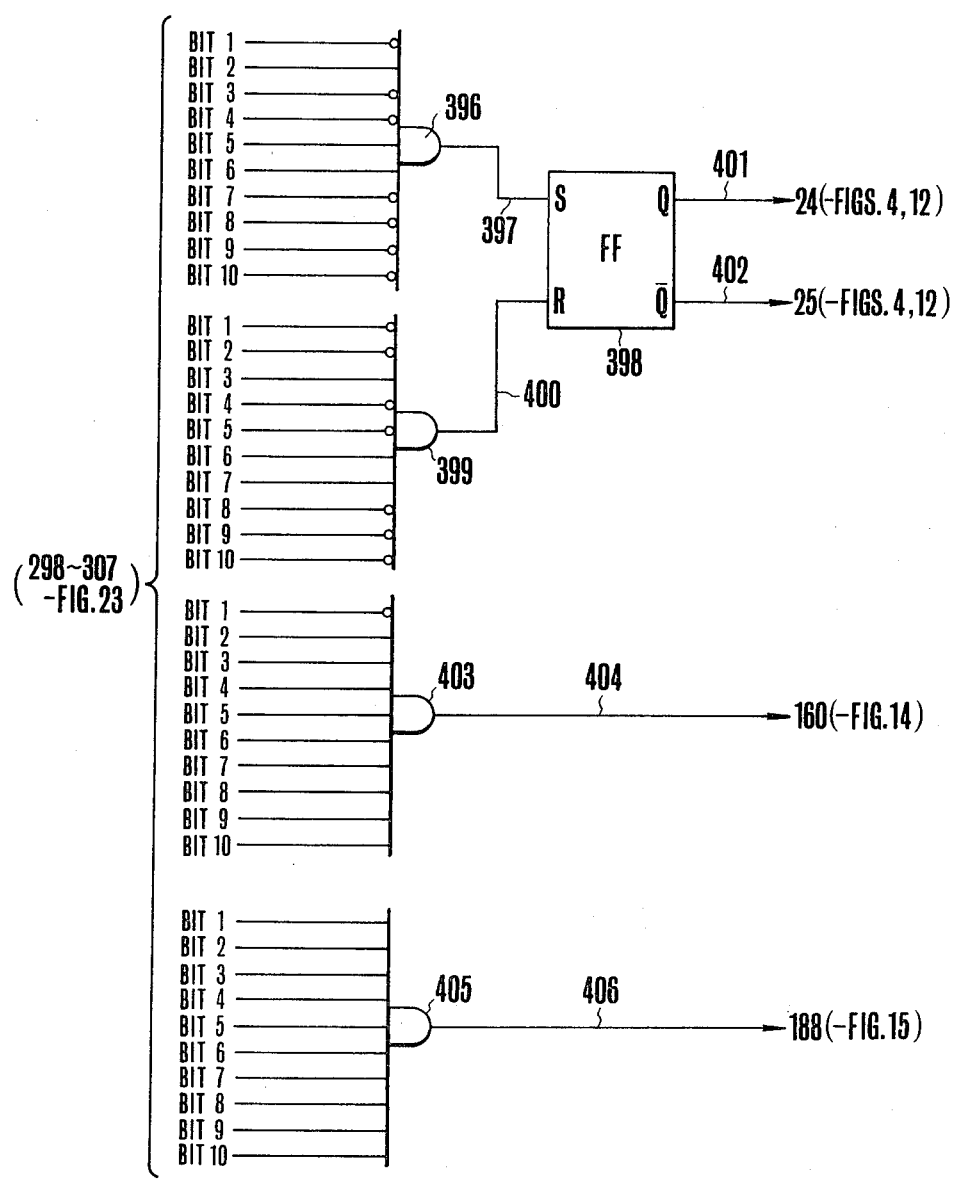

The signal for series input control of the analogue shift register 124a−124c or 28 to be applied to the terminals 24 and 25 of FIG. 12 or 4 is obtained first by an AND gate 396 of FIG. 28 having an output 397 which becomes HIGH at the 50th cycle to thereby set an RS-FF 398. And, by an AND gate 399 is obtained its output 400 which becomes HIGH at the 100th cycle. Responsive to this, an RS-FF 398 is reset to produce its Q output 401 which becomes HIGH until 50–100th cycle. This is given to the above-described terminal 24, and its $\overline{Q}$ output 402 which becomes HIGH at all times except for 50–100 cycles is given to the terminal 25.

Also the integration period alter command signal for integration period control to be applied to the common input terminal 160 of the AND gates 161 and 165 of FIG. 14 is obtained by an AND gate 403 having an output 404 which becomes HIGH at the 1022th cycle. This is given thereto.

In final, the look ahead carry signal 188 for main sequence from the transfer controller 185 of FIG. 15 is obtained by an AND gate 405 with its output 406 which becomes HIGH at the 1023th cycle and is given to.

Next, the importance of the integration period control in the present embodiment is not confined to the focus detecting device, but generally valid in the image processing.

Figure 29:
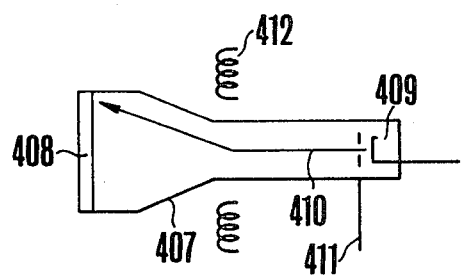
FIG. 29 is a schematic view showing the principles of construction of an image pick-up tube.

FIG. 29 shows a general image pick up tube, where the brightness information of the image is converted to an electrical signal by a photo-electric conversion plate 408, and this is produced as a current to the outside by scanning of electron beam emitted from the cathod 409 of the tube 407.

Figure 30:
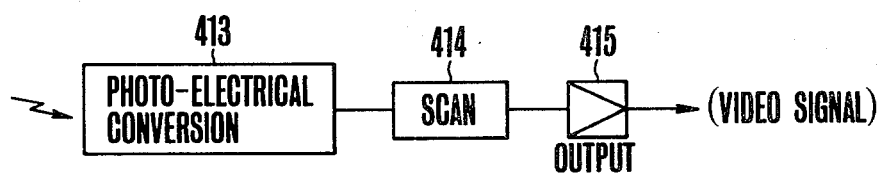
FIG. 30 is a block diagram showing the basic construction of an image pick-up device using the above-described tube.

The beam 410 is converged by a control grid 411 and deflected by the magnetic field of a deflecting coil 412, or the electric field of a deflecting plate to strike the above-described photo-electric conversion plate 408 at an arbitrary site, and the brightness at that site is read-out. That is, the signal, as schematically shown in FIG. 30, is read out through the photo-electric converting portion 413, scanning or selecting portion 414, and an output portion 415. The temperature, illuminance characteristics of its signal depend mainly upon the photo-electric conversion portion 413, particularly the scanning portion 414 has little temperature change because of its negative heater, and because of the high plate potential, it may be said that there is seldom influence by the direct throw in of photons, illuminance, or the like.

Also the dynamic range of the signal is limited by the range of the photo-electric conversion plate 408 so that the removal of the influence of the temperature and the like from the signal can be easily cancelled because the characteristics of the photo-electric conversion plate 408 are well known, and may be said to depend almost only upon the temperature.

Also because of the above reason, it is easy to control the signal to a proper level by detecting whether or not the clip of the signal is present while observing the peak potential of the signal. However, in case where as in the embodiments of the present invention, a semiconductor analogue shift register or CCD is used as the scanning portion, the illuminance-dependent difference and temperature-dependent change of the scanning portion are large, and the dynamic range also is narrow.

For this reason, in the embodiments of the present invention, the same scanning, transfer portion is supplied at the series input by the standard potential in a time-displaced manner, and the signal passed through its series output and output portion is used as the reference signal for the image information signal in carrying out the signal potential control.

For this reason, in the embodiments of the present invention, by taking into account the illuminance characteristic and temperature characteristic of the transfer portion, also the control or the like of the output portion of the two-element addition or the like, or the characteristic change of the output portion, the lower signal and upper signal as the standard signals are obtained to control the image signal.

It is noted that in the embodiment of the present invention, the cancel of the temperature characteristics of the photo-electric conversion elements is not carried out because of the large temperature change of the transfer portion and of the narrow dynamic range. Also in the main treatment for the image processing by the difference or differentiation of the image signal the cancel is automatically effected so that it is omitted. In the case of the use as the image-pick up purpose, the difference from the lower standard potential of the above-described dynamic range is produced, and further it is necessary to use a cancel means of the temperature characteristic of the photo-electric conversion elements known in the art.

Also, the addition of elements corresponds to the sensitizing phenomenon in the general photography, and is practically usable in the image pick-up allowing for an extension of the information picture elements. Since a higher output signal can be obtained under the same integration period, particularly in the case of the TV or the like where the image interval time (for example, 1/30 sec.) is fixed, it is very advantageous, and particularly it is possible to extend its image pick-up brightness range remarkably (particularly toward the darker side). In this case, by controlling the clock of the X-Y directional shift register and the readout reset, for example, the addition of 2×2 (picture element×scanning line) only leads to obtain a signal of 4 times as large with ease.

Figure 31:
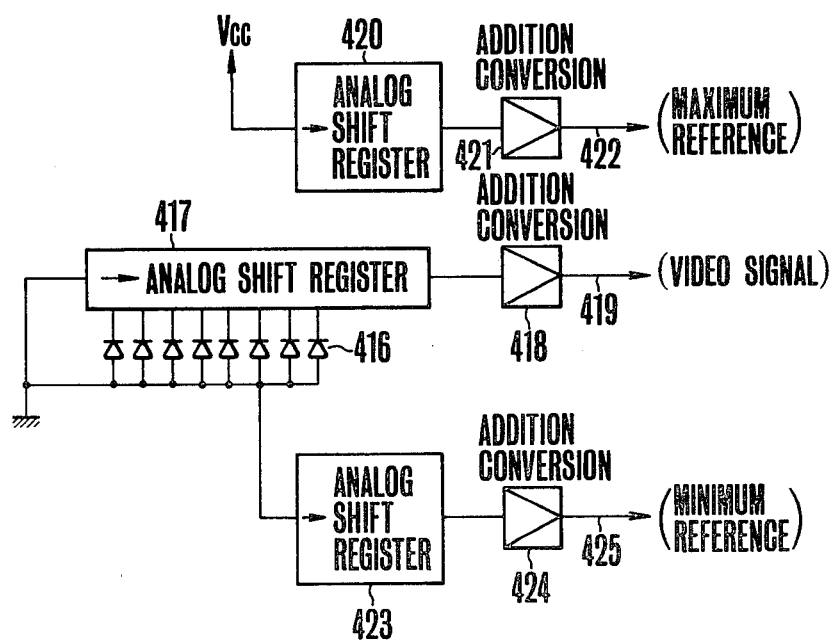
FIG. 31 is a block diagram showing the basic construction of a circuit for producing a reference signal in a parallel manner to control the charge integration period of the optical-electronic transducer elements.

Next explanation is given to a parallel type standard signal output method by reference to FIG. 31.

In the figure, 416 represents a great number of independent photo-electric conversion elements for converting brightness information of an image to an electrical signal; scanned and transferred by an analogue shift register 417; the addition of elements as necessary arises, sample and hold and the like are carried out in an adding and converting portion 418 to produce an image signal at an output line 419. Also, 420 is an analogue shift register similar to the part 417 with its series input at Vcc; 421 is an addition converting portion similar to the part 418 with its output 422 serving as a maximum standard signal.

Also, 423 is an analogue shift register similar to 417, 420 with its series input grounded; 424 is an addition converting portion similar to 418, 421 with its output 425 serving as a minimum standard signal.

Such parallel arrangement of the similar circuits, as compared with the above-described method of producing the standard signals in time-seriated manner, gives an advantage of omitting the sample and hold circuit, and this advantage is particularly enjoyed in the general image-pick up.

Figure 32:
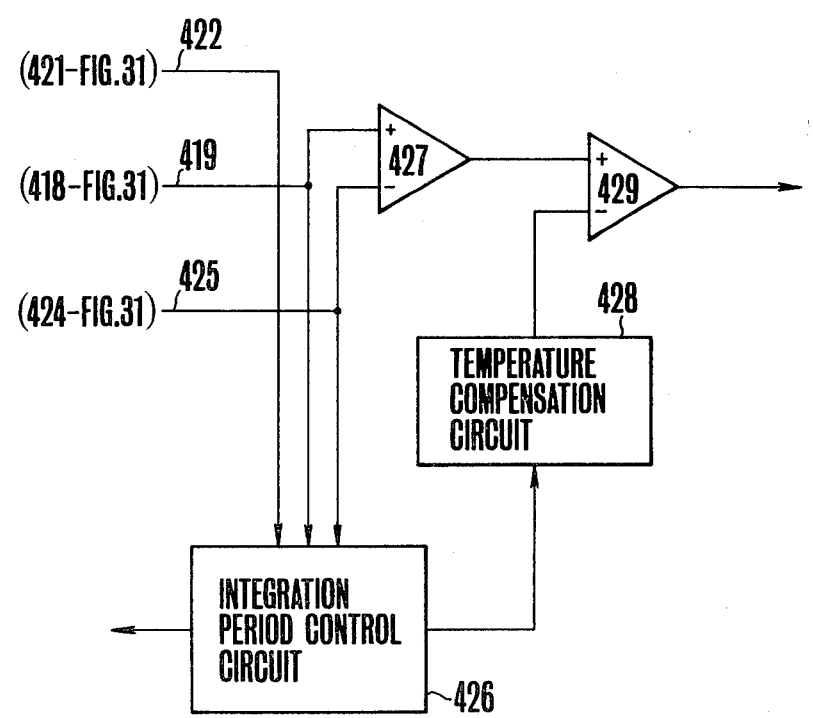
FIG. 32 is a circuit diagram showing an example of a video signal compensating circuit applicable to the circuit of FIG. 31.

FIG. 32 is an example of it, showing a block diagram for obtaining a video signal from the above-described maximum or minimum standard signal 422, 425 and the image signal 419. That is, by comparing the three signals with each other, the integration period control is carried out in an integration period control circuit 426, the above-described influence of the transfer portion is cancelled in a difference amplifier 427, and the temperature compensation of the difference amplifier 429 is carried out by the output of a temperature compensating circuit 428 of the photo-electric conversion elements to obtain a video signal.

It is noted that the temperature compensating circuit 428 of the photo-electric conversion elements depends upon the integration period, so that when the above-described photo-electric conversion element array 416 of FIG. 31 is provided with at least one completely light-shielded photo-electrical conversion element in a portion of the array, the image signal can be read out while the compensation for the temperature or the like of the photo electric conversion elements and transfer portion is made at a time by giving the sampled and held image potential corresponding to the light-shield element to the difference amplifier 427.

Figure 33:
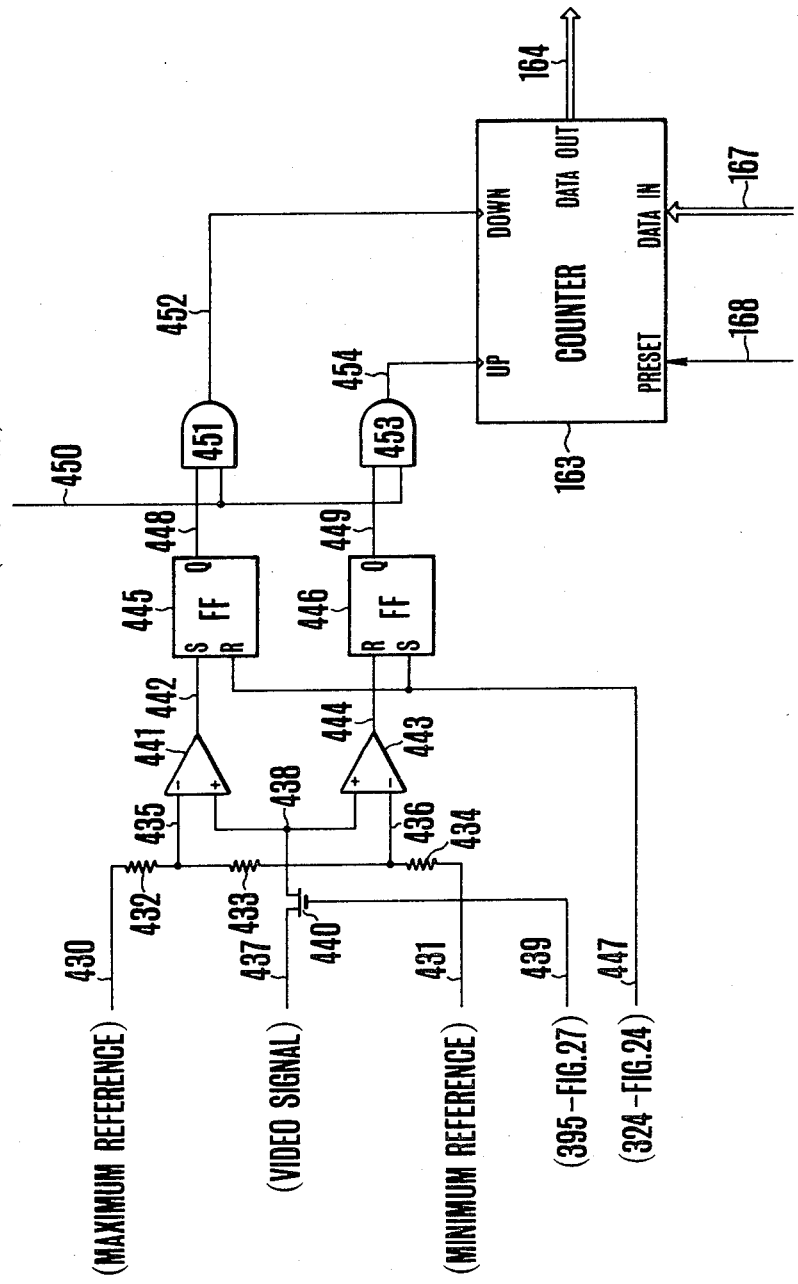
FIG. 33 is a circuit diagram of another example of the charge integration period control circuit.

FIG. 33 shows an example of variation of the integration period control portion 15 shown in FIG. 14 without the necessity of peak hold.

That is, in case where the maximum standard and minimum standard are obtained as determined before the production of the image signal, the maximum standard given to an input 430, and the minimum standard given to an input 431 are divided by resistors 432, 433, 434 to produce comparison standards at junction points 435 and 436.

In order to obtain at a point 538 a signal of time corresponding to an effective signal portion of the image signal given to an input 437, an input 439 is supplied with, for example, a signal corresponding to the Q output 395 of the RS-FF 394 of FIG. 27 to control an FET 440. And, if the image signal from the input 437 exceeds the upper comparison standard value obtained at the junction point 435, a comparator 443 produces a HIGH signal at its output line 444.

An over-state memory RS-FF 445 and an under-state memory RS-FF 446 are reset and set respectively by rendering HIGH a signal corresponding to, for example, the output 324 of the AND gate 323 of FIG. 24, given to an input 447.

Thus, when it happens that the image signal exceeds the upper standard, the RS-FF 445 is set with the production of a HIGH signal at its Q output 448. Also when it does not happen that the lower standard is exceeded, the RS-FF 446 is not caused to be reset with the production of a HIGH signal at its Q output 449.

For this reason, as the clock pulse, for example, corresponding to the output 404 of the AND gate 403 of FIG. 28, is given to an input 450, when the upper standard is exceeded, an AND gate 451 produces a clock pulse at its output line 452, and when the lower standard is not exceeded, an AND gate 453 produces a clock pulse at its output line 454.

With such arrangement excluding the peak hold circuit, in a similar manner to that in FIG. 14, an UP/DOWN counter 163 is made able to operate for count-up, hold, or count-down with the production of an output 164 defining the integration period, thereby the integration period is controlled.

Next, a number of examples of variation of the main circuits of the above-described embodiments of the system are given below.

In the above-described embodiments, to control the integration period of the photo-electric conversion portion was basically to control the image accurately to a level to be reproduced in a possible limited dynamic range.

Unlike this, for example, under the premise that amplification is to be carried out in the later stage of circuit, there is also more advantageous period as possible, that is, a smaller level of the photo-electrical output, and the later stage of amplifier is not saturated in controlling for a constant level of image signal.

Therefore, at first, from such standpoint, for example, the difference amplifier 429 of FIG. 32 is taken with the image signal produced therefrom being controlled to a necessary level.

Figure 34:
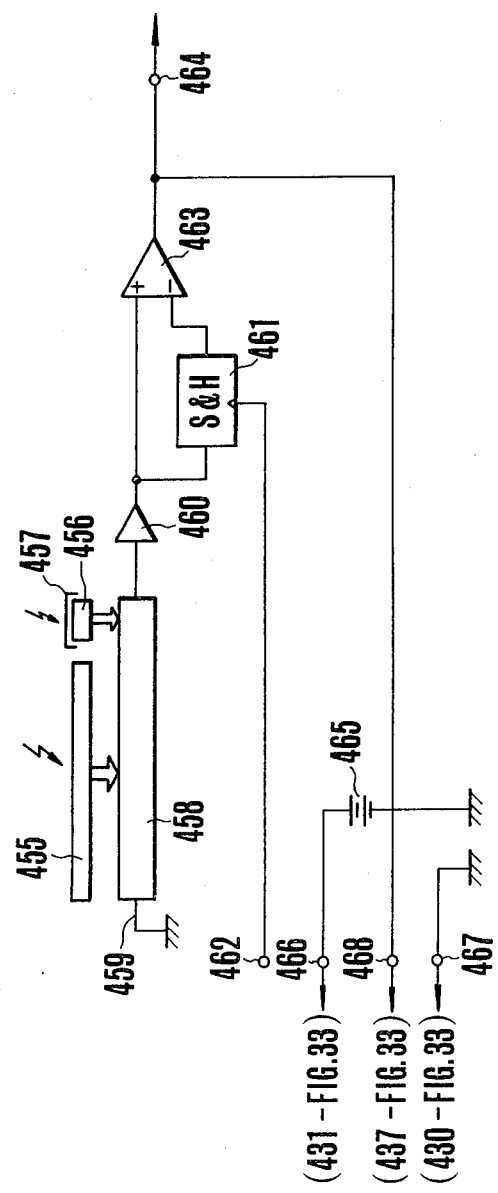
FIGS. 34 and 35 are electrical circuit diagrams, partly in block form, of two different examples of variation of the photo-signal generator in the circuit system of FIG. 3.

FIG. 34 shows an example of the photo-electrical output generating portion 13 as applied to such case. Here, besides the ordinary photo-electric converting portion 455, there is provided another photo-electric converting portion 456 light-shielded by means 457 and similar thereto (but the number of elements is far smaller) whose signal is produced in a time-seriated manner at an output portion 460 by an analogue shift register 458 with its series input terminal 459 grounded. 461 is a sample and hold circuit for sampling and holding that part of the output from the above-described output portion 460 which correspond to the signal from the above-described light-shielded photo-electric converting portion 456, whereby the sampling is effected by HIGH at a terminal 462, and the sampled value is held by LOW thereat. Therefore, it is noted here that the terminal 462 is rendered HIGH in a timing with the production of the output corresponding to the signal from the light-shielded photo-electric converting portion 456 at the output terminal of an output portion 460. 463 is a difference amplifier for obtaining the difference between the output of the sample and hold circuit 461 and the output of the output portion 460. Therefore, the difference amplifier 463 produces an output based on the photo-electrical signal from the photo-electric converting portion 455 with the good removal of the dark current component generated in the said photo-electric converting portion 455 and the analogue shift register 458, that is, the image signal at its output terminal 464, thereby the influence due to the temperature change or the like is also automatically removed.

On the other hand, in this case, the level control, that is, the integration period control can be achieved by the use of, for example, the integration period control circuit of FIG. 33 in combination with the terminal 466 connected to an electrical power source 465 to provide a level which is applied as the maximum standard to the input 431 of FIG. 33, and the terminal 467 grounded to produce a level which is applied as the minimum standard to the input 430 of FIG. 33, and further with the terminal 468 through which the output of the difference amplifier 463 is applied to the input 437 of FIG. 33.

By the way, with such arrangement, because of some reason, for example, when the illumination is rapidly increased under the setting of a very long integration period, it will occur that as the signal of the above-described light-shielded photo-electric converting portion 456 is increased by the light leakage and the like, it nears the saturation level of the signal read out portion, and that the signal of the photo-electric converting portion 455 is saturated. In such case, the output level of the difference amplifier 463 becomes very small, thereby the integration period is altered to a further longer value. Thus, the adjustment of the control advances to an unfavorable direction.

Figure 35:
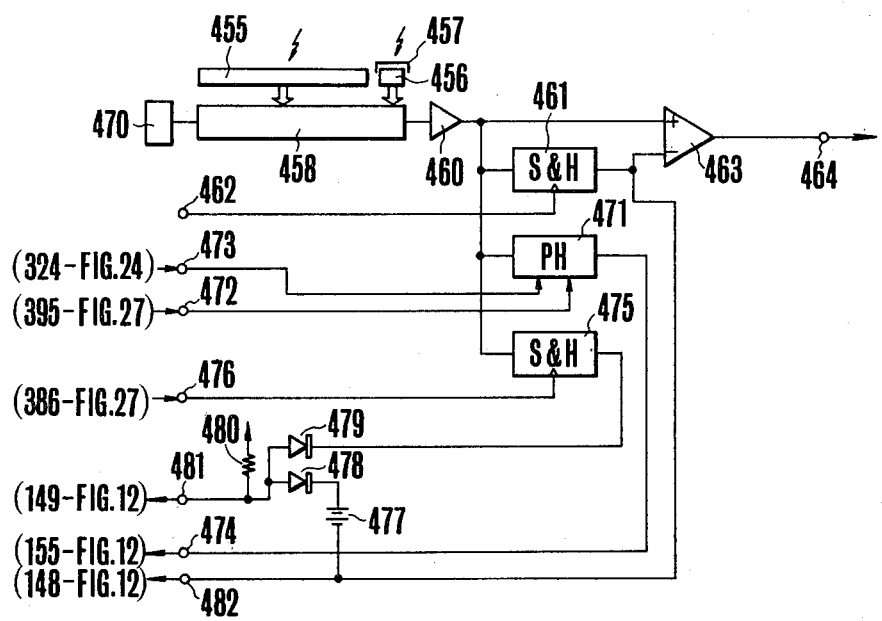

In order to prevent such situation, an example of a circuit therefore is provided as shown in FIG. 35 where the same reference characters have been employed to denote the similar parts to those shown in FIG. 34.

At first, here, the series input of an analogue shift register 458 is provided with a similar input control portion 470 to the input control portion indicated by 121 in FIG. 12, for example. 471 is a peak hold circuit for holding the peak of the output from the output portion 460 similar to, for example, the peak hold circuit 134 in FIG. 12, with its peak hold terminal 472 being supplied by the Q output 395 of the RS-FF 394 of FIG. 27, for example, as the peak hold signal, and with its reset terminal 473 being supplied as the reset signal by the output 324 of the AND gate 323 of FIG. 24, for example. It is noted that the peak hold output of said peak hold circuit 471 appears at an output terminal 474. 475 is a sample and hold circuit for sampling and holding the output from the output portion 460 similar to, for example, the sample and hold circuit indicated by 132 in FIG. 12. Responsive to, for example, the output 386 of the AND gate 385 of FIG. 27 applied to its input terminal 476, it produces an output representing the possible maximum voltage, that is, the saturation level. 477 is an electrical power source for generating the required maximum output voltage. The required maximum output voltage from said electrical power source 477 is added to the output level of the sample and hold circuit 461 to obtain a voltage (it is noted that this voltage if smaller than the saturation voltage, is selected to be such as to obtain the desired image signal of unsaturation) and the output level of the sample and hold circuit 475 are applied to a minimum value selection circuit comprising diodes 478 and 479 and a resistor 480, where a lower level is selected. The selected level is taken as the maximum standard, and a signal representing it appears at an output terminal 481. It is noted that as the minimum standard use is made of the output of the sample and hold circuit 461 appearing at an output terminal 482.

Therefore, the integration period control circuit such as that, for example, shown in FIG. 14, when supplied at the input terminals 155, 149 and 148 of FIG. 14 with the respective outputs representative of the peak value, maximum standard and minimum standard from the above-described terminals 474, 481 and 482, functions in an identical fashion to that described above to achieve the control of the integration period, that is, the automatic adjustment of the image signal level. That is, with such arrangement, when a proper signal level is obtained under unsaturation, the signal level is adjusted in accordance with the required maximum output voltage available from the electrical power source 477. When the saturation or an approximately identical phenomenon thereto takes place in the adjustment of the signal level to the proper one, the minimum value selection circuit (478, 479, 480) is actuated so that the automatic adjustment is effected to produce the signal without saturation. Thus, it is made possible to avoid the drawback that is encountered when the illumination is rapidly increased under the setting of a relatively long integration period, as has been mentioned above.

It should be pointed out that though the foregoing saturation measure is very effective, it is still possible in worst cases that the maximum standard level is saturated, and the minimum standard level is also saturated, and, therefore, the signal is saturated.

To meet with such circumstance, the integration period control circuit is provided with a head circuit, an example of which will next be described by reference to FIG. 36. This example is adapted to deal with the maximum and minimum standard levels obtained through such arrangement as shown, for example, in FIGS. 12, 31, 35 for application of suitable treatment thereto before they are fed to the integration period control circuit of FIG. 14 or 33. In the figure, the maximum standard applied to a maximum standard input terminal 483 is transmitted without further modification to and appears at a maximum standard output terminal 484, and at this time an electrical power source 485 produces a desired minimum standard at its output point 486 by which the signal is controlled to a level at least below the saturation one. On the other hand, the minimum standard applied to a minimum standard input terminal 487 is applied to a minimum value selection circuit comprising diodes 488, 489 and a resistor 490 together with the above-described desired minimum standard at the output point 486, whereby the lower one is selected and stepped out as the minimum standard through a minimum standard output terminal 491.

By the head circuit of such construction it is resulted that when in normal condition, that is, unsaturation, the image signal lies within a range between the maximum standard and the minimum standard at a sufficient level without causing the production of clip, and that since in this case the minimum standard from the minimum standard input terminal 487 is lowered below the desired minimum standard at the output point 486, the minimum standard applied to the minimum standard input terminal 487 is to appear at the minimum standard output terminal 491. In such fashion, the control of the integration period is carried out.

On the other hand, when the signal is saturated, or nearly so, the above-described range of standard will almost disappear, or will be made very narrow so that the minimum standard from the minimum standard input terminal 487 is higher than the desired minimum standard at the output point 486. Therefore, as the minimum standard from the minimum standard output terminal 491 there appears the desired minimum standard, that is, the lower level of minimum standard at the output point 486. This leads to a condition that the present image signal is too high in level, and therefore to actuate the integration period control circuit to shorten the integration period. Thus, the above-described drawback is eliminated.

It is noted that 492 is a comparator for discriminating the saturation. As the minimum standard applied to the minimum standard input terminal 487 and the desired minimum standard at the output point 486 are compared, when the image signal does not fall within the above-described range of voltages, that is, is saturated, a saturation signal is produced at its output terminal 493.

Figures 37, 38:
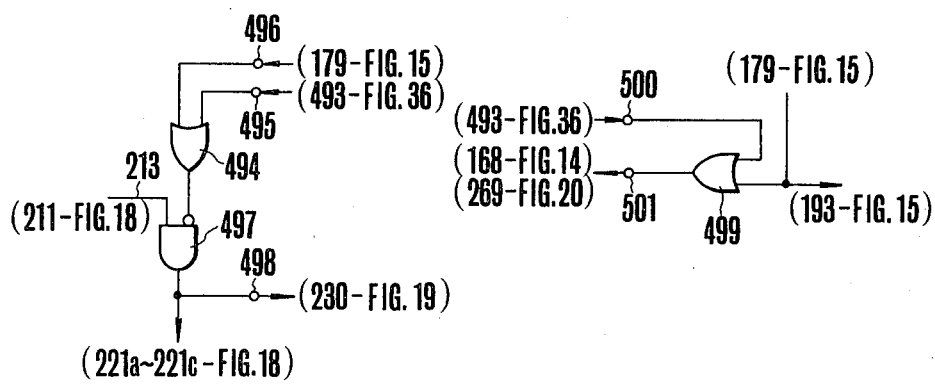
FIG. 37 is a fragmentary circuit diagram showing only the added parts of an example of variation of the display control circuit of FIG. 18.
FIG. 38 is a fragmentary circuit diagram showing only the added parts of an example of variation of the main sequence circuit of FIG. 15.

Next, in order to prevent erroneous display from being resulted from the faulty operation at the time of saturation, an improvement on the display control portion indicated in FIG. 18 may be made as provided with supplementary means, an example of which is shown in FIG. 37.

Figure 36:
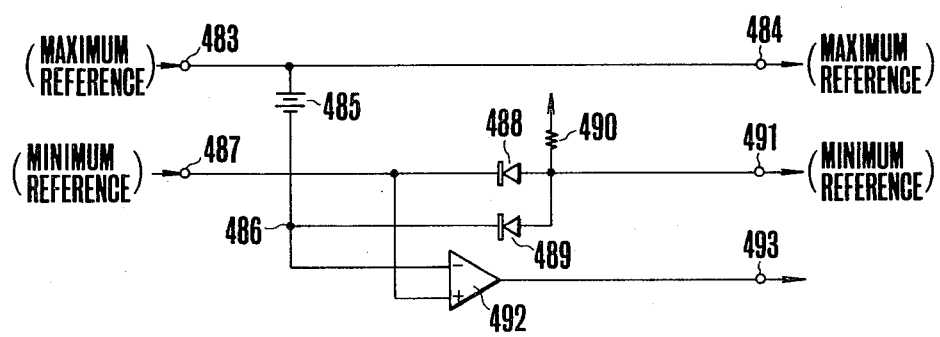
FIG. 36 is a circuit diagram of an example of variation of the reference level setting circuit necessary to control the integration period.

In FIG. 37, 494 is an OR gate receptive of the output from the output terminal 493 of the comparator 492 of FIG. 36 and the Q output 179 of the RS-FF 178 of FIG. 15 at terminals 495 and 496 respectively; 497 is an AND gate receptive of the inverted output of said OR gate 497 and the output 213 for A>B of the magnitude comparator 211 of FIG. 18 and having an output which is applied to the AND gates 221a and 221c of FIG. 18 at one input thereof. That is, according to such arrangement of the supplementary means, when the output 179 of the RS-FF 178 of FIG. 15 (that is, initial inefficient signal) is HIGH, or when the output of the comparator 492 of FIG. 36 (that is, saturation signal) is HIGH, the output of the OR gate 494 takes HIGH. Therefore, in these cases, the output of the AND gate 497 is made LOW to inhibit the display.

It is noted that the output of the AND gate 497 is also applied through the terminal 498 to the input of the D-latch 231 of FIG. 19 at the terminal 230, thereby the control of the loudspeaker 249 is adjusted in a similar manner to that described above.

It is further noted that such erroneous display can be otherwise prevented with ease by the use of, for example, a window comparator such as that included in the integration time control circuit, in detecting the large excess or loss of the image signal level, and of a comparator in detecting the saturation of the integrator to thereby carry out the control of the display in a similar manner to the above.

We see again that all the examples of variation described above are to gradually adjust the integration period to a proper value when in saturation. With this, however, a problem arises that as the control of the integration period is carried out stepwise, when the illuminance is rapidly changed, the attainment of a proper integration period takes too long time.

An improvement with respect to such point may be made in the main sequence of FIG. 15 as provided with supplementary means, an example of which will be described by reference to FIG. 38.

In FIG. 38, 499 is an OR gate receptive of the Q output 179 of the RS-FF of FIG. 15 and the output from the output terminal 493 of the comparator 492 of FIG. 36 applied on a terminal 500 and having an output which is applied through an output terminal 501 to the UP/DOWN counter 163 in the integration period control circuit shown in FIG. 14 as the preset input 168 therefore, or to the UP/DOWN counter 267 in the integration period control circuit of FIG. 20 as the preset input 269 therefore, whereby during the initial inefficient time interval, or at the time of saturation, the integration period is immediately set to the initial value (167 in FIG. 14, 270 in FIG. 20) by rendering HIGH the Q output 179 (that is, initial inefficient signal) of the RS-FF 178 of FIG. 15, or rendering HIGH the output of the comparator 492 of FIG. 36 (that is, saturation signal). Thus, the above-described problem can be solved.

Figure 39:
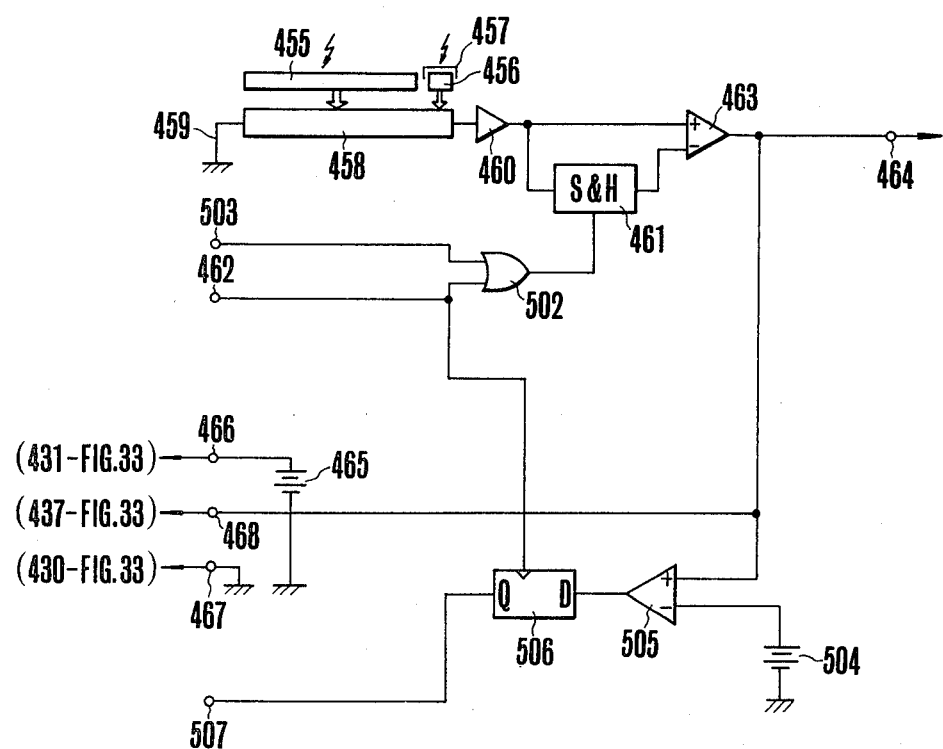
FIG. 39 is a circuit diagram, partly in block form, of a further example of variation of the photo-signal generator in the circuit system of FIG. 3.

By the way, when in practical use, as the employment of longer integration periods will lead to various difficulties, there may be encountered many situations where an advantage can be expected from the limitation of the lower limit of brightness level to a somewhat high level. An example of the photo-electrical output generating portion usable in such case will next be described by reference to FIG. 39 where an example of variation of that portion of FIG. 34 is shown. In FIG. 39 the same reference characters have been employed to denote the similar parts to those shown in FIG. 34.

In FIG. 39, an OR gate 502 is fed at a terminal 503 with the signal which takes HIGH before the photo-electrical conversion signal is read out, that is, at the time of empty reading out (for example, 0th cycle of reading out) along with the signal which is applied on a terminal 462. The output of the OR gate 502 is applied as the sample and hold signal to a sample and hold circuit 461, thereby the sample and hold circuit 461 is caused to sample and hold the signal at the time of empty reading out (this is here used as the maximum standard) and the signal from the light-shielded photo-electric converting portion 456 individually from each other.

On the other hand, even in this example, in a similar manner to that in the case shown in FIG. 34, the image signal, minimum standard and maximum standard from the terminal 468, 466 and 467 are applied to the respective inputs 437, 431 and 430 of FIG. 33 to control the integration period. It is noted here that in general at the time of saturation, that is, for example, as has been described above, when the illumination is rapidly changed under the setting of a relatively long integration period, the occurrence of erroneous control of the integration period as explained in connection with the example of FIG. 34 will often lead to an excessive increase of the signal from the light-shielded photo-electric converting portion 456 as compared with the signal at the time of empty reading out, that is, the minimum standard.

Therefore, in this example, the signal at the time of empty reading out is sampled and held by the sample and hold circuit 461 so that when the signal from the light-shielded photo-electric converting portion 456 is read out, a difference amplifier 463 produces an output representing the difference between the signal from the light-shielded photo-electric converting portion 456 and the output from the above-described sample and hold circuit 461, that is, the minimum standard, and this output is compared by a comparator 505 with a reference voltage for checking the saturation given by an electrical power source 504. When the saturation is in check, the output of the comparator 505 takes HIGH, and is memorized by a D-FF 506 in response to a signal of HIGH from a terminal 462 when the signal from the above-described light-shielded photo-electric converting portion 456 is read out. The D-FF 506 produces a saturation signal at its output terminal 507. And, this saturation signal from the terminal 507 is applied to, for example, the OR gate 499 of FIG. 38 through its terminal 500, thereby as has been mentioned in connection with FIG. 38, the integration period is set to the initial value in response to the output of the OR gate 499, and along with this said saturation signal is applied to, for example, the OR gate 495 of FIG. 37 through its terminal 495, thereby as has been mentioned in connection with FIG. 37, the display can be inhibited. Thus, it is made possible by the analogue circuit of minimum construction that when in comparatively limited general working conditions, very effective measures for preventing faulty operation against the signal saturation or the like can be taken.

Next, a modification of the main circuits will be explained.

For example, with the use of a CR differentiation circuit such as that shown in FIG. 11 as the image signal change detecting portion 16, when its time constant is relatively large, its history phenomenon affects the change signal to be produced from the said differentiation circuit so that there is a high possibility of occurrence of a drawback that, for example, when the signal corresponding to the prescribed effective field portion in the image field is later to be integrated by the dual integrating portion 19, a signal serving as a noise corresponding to the outside of said effective field portion is caused to migrate into the signal to be integrated.

In order to overcome such drawback, for example, as shown in FIG. 40, an FET switch 508 for resetting a condenser 118 is provided in parallel with a resistor 119, and this is controlled by the output of an inverter 509 which inverts the Q output 363 of the RS-FF 359 of FIG. 25, thereby the said FET switch 508 is turned on at all times except for the input period of the dual integrating portion 19 to hold the condenser 118, therefore, the differentiation circuit in the reset state.

It is noted that as the control signal for the FET switch 508 use may be made, besides this, of the combination of the output 349 of the AND gate 348 of FIG. 25 and the clock $\phi_0$ from the main clock generator 170 of FIG. 15 after having passed through an AND gate 511 to a buffer 510. The output of the buffer 510 is applied to the FET switch 508 so that said FET switch 508 is turned on in a timing of the cycle $[2-\phi_2]$ in the lower 9 bits of the output of the transfer controller 185 of FIG. 15.

Also when the system of the present invention is incorporated in a lens interchangeable type single lens reflex camera as a TTL (Through The Lens) type focus detecting system, the image sharpness on the light-receiving portion varies to a large extent depending upon the F-number (relative aperture at full open) of the used lens, giving rise to a problem that, for example, when the F-number of the lens is large, that is, very dark, the image sharpness on the light-receiving portion is extremely lowered with a loss in the detection ability. To cope with such problem, for example, as shown in FIG. 41, a variable condenser 118' and a variable resistor 119' are used in combination to constitute a CR differentiation circuit for detecting the above-described signal change, whereby the capacitance of the said variable condenser 118' and the resistance value of the variable resistor 119' are adjusted in accordance with the F-number of the used lens to properly select a frequency band region of the signal which assures the most effective judgement of the focus condition of the image and the easy processing of it. It is noted that in general, the larger the F-number of the lens (that is the darker, the lens) the smaller the differentiation time constant is made, thereby the detecting performance is maintained at good level.

It is also noted that with the camera of such construction as to carry out the closed-down light metering, it is good to adjust the capacitance of the above-described condenser 118' and/or the value of the resistor 119' in response to the F-number of the lens and the number of diaphragm stops closed down therefrom when it is closed down.

Of course it is also possible in stead of using the circuit of FIG. 41 to use an alternative one as shown in FIG. 42 where a plurality of condensers of difference capacitance 118" with a common switch 512 for selecting one of these condensers at a time, and a plurality of resistors 119" of different resistance with a common switch 513 for selecting one of these resistors at a time are used, and these switches 512 and 513 are arranged to be switched to appropriate positions depending upon the F-number of the used lens and/or the number of diaphragm stops closed down.

The above-described adjustment of the differentiation time constant may be made mechanically by utilizing the amount of projection of the F-number dependent pin provided in the lens mounting, and the amount of movement of the diaphragm value transmitting lever, or may be made by utilizing a device such as that shown in FIG. 43.

In FIG. 43, the device is constructed from an electric motor M in carrying out the above-described adjustment in accordance with the F-number and the number of diaphragm stops closed down of the lens. 514 is an electrical power source; 515 is a variable resistor for setting the F-number of the lens whose resistance value is adjusted in accordance with the F-number of the lens (that is, for example, the above-described amount of projection of the lens F-number pin); 516 is a variable resistor for setting the number of diaphragm stops closed down whose resistance value is adjusted in accordance with the number of diaphragm stops closed down (for example, the movement of the aperture value transmitting lever); 517 is a normally closed type switch arranged to be turned off when, for example, an operating member for closing-down light metering is actuated; 518 is a motor control circuit responsive to the current given to its control input 519 which is connected to the resistor circuit for determining the angle of rotation of the motor 520, whereby the output of the motor 520 is used in adjusting the variable condenser 118' and variable resistor 119' shown in FIG. 41, or in changing over the switches 512 and 513 shown in FIG. 42. That is, since the switch 517 is ON except when the light metering is carried out with the diaphragm closed down, the control input 519 is supplied with the value of the variable resistor 515, that is, a current of intensity depending upon the F-number of the used lens, therefore, in this case, the differentiation time constant of the above-described CR differentiation circuit is varied with the F-number of the lens. On the other hand, when in the diaphragm closed down light metering, the switch 517 is turned off so that at the control input 519 there appears a current corresponding to the value of both resistors 515 and 516, that is, the F-number of the lens and the number of diaphragm stops closed down, therefore, in this case, the differentiation time constant is varied with the F-number of the lens and further with the number of diaphragm stops closed down.

It is noted that the above-described motor control circuit has, for example, in the interior thereof, a variable resistor whose value is adjusted in accordance with the rotation of the motor 520, whereby the current obtained through this variable resistor and the current given to the control input are compared with each other to control the rotation of the motor 520. For example, it may be constructed in the form of a servo circuit such as a servo type automatic exposure control circuit widely accepted in, for example, 8 mm cine cameras.

In final, as the use of a solid state image pick-up device such as CCD, BBD or the like in the photo-electrical output generating portion leads particularly to the necessity of temperature compensation, a few examples of effective means for simply fulfilling this requirement will next be described.

Figure 44:
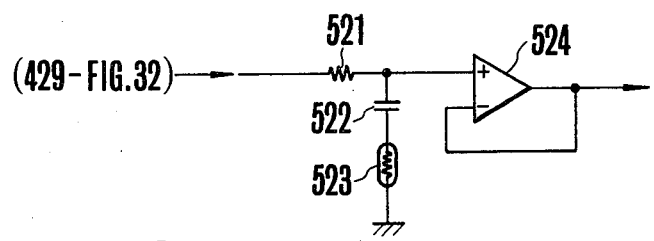
FIGS. 44 and 45 are fragmentary circuit diagrams showing only the added parts of each of two different examples of the video signal compensation circuit of FIG. 32.

FIG. 44 shows an added arrangement according to an example of improvement on, for example, the circuit shown in FIG. 32. Connected to the output terminal of the difference amplifier 429 of FIG. 32 is a temperature dependent high-cut filter comprising a resistor 521, a condenser 522 and a thermistor as the temperature sensing element. The signal after having passed through the filter is produced through a buffer amplifier 524. That is, with such construction and arrangement, as the temperature increases, the resistance value of the thermistor 523 is decreased with decrease in the high-region gain of the high-cut filter, thereby the increase of the high-region noise due to the variations of the output of the photo-electrical output portion at the time of increase of the temperature is suppressed.

It is noted that the above-described thermistor 532 may be replaced by the combination of a temperature-voltage conversion element such as a diode and a voltage-resistance conversion element such as an FET, or by utilizing the temperature dependent characteristic of an FET unit.

Figure 45:
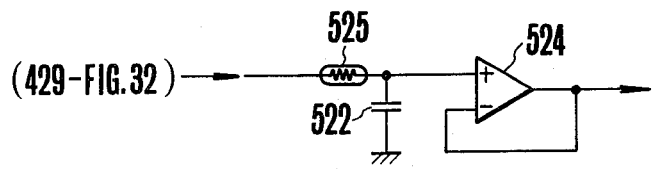

Besides this, it is also possible that as shown in FIG. 45, for example, the combination of an element 525 such as a resistor whose resistance value is increased as the temperature increases, and a condenser 522 is used, constituting the temperature dependent high-cut filter, thereby as the temperature increases, the cut frequency is lowered.

Also, the above-described problem of temperature compensation can be easily solved, for example, by modifying the emphasis characteristic control portion 18 of FIG. 4 so as to have a temperature dependent property.

Figure 46:
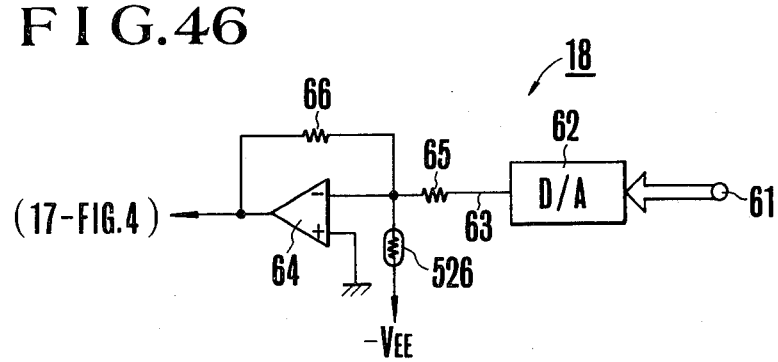
FIG. 46 is a circuit diagram of an example of variation of the emphasis characteristic control circuit in the analogue circuit system of FIG. 4.

That is, FIG. 46 shows an example of such modification. In the arrangement shown in FIG. 46, the inversion input terminal of an operational amplifier constituting an inversion buffer circuit is pulled down through a thermistor as the temperature sensing element to $-V_{EE}$. The other parts are entirely the same as those shown in FIG. 4. With such arrangement, as the temperature increases, the resistance value of the thermistor 526 is decreased with increase of the output of the amplifier 64 in the forward direction, therefore, the suppression level is more increased, so that the noise due to the variations of the signal with increase in the temperature is suppressed, thus overcoming the above-described drawbacks.

What is claimed is:

1. A system for detecting the sharpness of an image formed by an image forming optical means, comprising:
   (A) image sensing means for sensing the image formed by said optical means, said image sensing means having an array of a plurality of radiation sensitive elements, the individual elements producing electrical signals corresponding to the radiations incident thereon, and said image sensing means having as its output to provide the electrical signals of the respective elements in a time-seriated manner;
   (B) illuminance difference detecting means for providing electrical signals representing illuminance difference in the individual minute compartments of said image based on the output of said image sensing means;
   (C) signal transforming means for non-linear transformation and absolute-value transformation of the electrical signals provided by said illuminance difference detecting means, said signal transforming means having at least one semi-conductor element embodying signal non-linear transformation characteristics, whereby said electrical signals are at least non-linearly transformed by utilizing said semi-conductor; and
   (D) image sharpness output means for providing an output representing the sharpness of said image on said image sensing means based on the non-linearly transformed and absolute-value transformed electrical signals by said signal transforming means.

2. A system according to claim 1, wherein said semi-conductor element in said signal transforming means is a transistor.

3. A system according to claim 2, wherein said transistor is a field effect transistor.

4. A system according to claim 3, wherein said field effect transistor is equipped with signal square transformation characteristics, and said signal transforming means utilizes said field effect transistor in non-linear transformation and absolute-value transformation of the electrical signal provided by said illuminance difference detecting means.

5. A system according to claim 4, wherein said field effect transistor has a MOS (Metal Oxide Semi-conductor) structure.

6. A system according to any one of claims 1 to 5, further comprising:
   transformation control means for controlling signal transforming operation of said signal transforming means, said transformation control means controlling the signal transforming operation of said signal transforming means so as to perform different transformation between those of the electrical signals provided by said illuminance difference detecting means which correspond to a predetermined detection region of the area of said image and the other electrical signals which correspond to the outside of said prescribed detection region.

7. A system according to claim 6, wherein said transformation control means controls the signal transforming operation of said signal transforming means so that the output of said signal transforming means for the signals corresponding to the outside of said predetermined detection region becomes substantially zero.

8. A system according to claim 7, wherein said transformation control means controls the signal non-linear transforming operation of said signal transforming means so as to further differ the non-linear transformation of the signals corresponding to the said predetermined detection region with different positions of the individual minute image compartments within said prescribed detection region.

9. A system according to claim 8, wherein said transformation control means controls the signal non-linear transforming operation of said signal transforming means so as to give a higher emphasis to the signals corresponding to a central portion of said predetermined detection region than to the signals corresponding to the marginal portion of said prescribed detection region.

10. A system according to claim 7, wherein said transformation control means has means sensible to the change of ambient temperature, and controls the signal non-linear transforming operation of said signal transforming means for th signals corresponding to at least said predetermined detection region to further accord with the ambient temperature on the basis of the output of said temperature sensitive element.

11. A system according to claim 6, wherein said transformation control means controls the signal non-linear transforming operation of said signal transforming means so as to further differ the non-linear transformation of the signals corresponding to the said predetermined detection region with different positions of the individual minute image compartments within said prescribed detection region.

12. A system according to claim 11, wherein said transformation control means controls the signal non-linear transforming operation of said signal transforming means so as to give a higher emphasis to the signals corresponding to a central portion of said predetermined detection region than to the signals corresponding to the marginal portion of said prescribed detection region.

13. A system according to claim 12, wherein said transformation control means has means sensible to the change of ambient temperature, and controls the signal non-linear transforming operation of said signal transforming means for the signals corresponding to at least said predetermined detection region to further accord with the ambient temperature on the basis of the output of said temperature sensitive element.

14. A system according to claim 11, wherein said transformation control means has means sensible to the change of ambient temperature, and controls the signal non-linear transforming operation of said signal transforming means for the signals corresponding to at least said predetermined detection region to further accord with the ambient temperature on the basis of the output of said temperature sensitive element.

15. A system according to claim 11, wherein said transformation control means has means sensible to the change of ambient temperature, and controls the signal non-linear transforming operation of siad signal transforming means for the signals corresponding to at least said predetermined detection region to further accord with the ambient temperature on the basis of the output of said temperature sensitive element.

16. A system according to any one of claims 1 to 5, further comprising:
transformation control means for controlling the signal transforming operation of said signal transforming means, said transformation control means controlling the signal non-linear transforming operation of said signal transforming means so as to differ non-linear transformation of those of the signals provided by said illuminance difference detecting means which correspond to a predetermined detection region for said image with respect to the different positions of the individual minute image compartments within said predetermined detection region.

17. A system according to claim 16, wherein said transformation control means controls the signal non-linear transforming operation of said signal transforming means so as to give a higher emphasis to the signals corresponding to a central portion of said predetermined detection region than to the signals corresponding to the marginal portion of said prescribed detection region.

18. A system according to claim 17, wherein said transformation control means has means sensible to the change of ambient temperature, and controls the signal non-linear transforming operation of said signal transforming means for the signals corresponding to at least said predetermined detection region to further accord with the ambient temperature on the basis of the output of said temperature sensitive element.

19. A system according to claim 16, wherein said transformation control means has means sensible to the change of ambient temperature, and control the signal non-linear transforming operation of said signal transforming means for the signals corresponding to at least said predetermined detection region to further accord with the ambient temperature on the basis of the output of said temperature sensitive element.

20. A system according to any one of claims 1 to 5, further comprising:
transformation control means for controlling the signal transforming operation of said signal transforming means, said transformation control means having means sensible to the change of ambient temperature and controlling the signal non-linear transforming operation of said signal transforming means for the electrical signal provided by said iluminance difference detecting means to accord with the ambient temperature on the basis of the output of said temperature sensitive means.

21. A system according to claim 1, wherein said illuminance difference detecting means is constructed in the form of a differentiation circuit means comprising, in combination, a condenser and a resistor.

22. A system according to claim 21, further comprising:
differentiating operation control means for controlling the signal differentiating operation of said differentiation circuit means, said differentiating operation control means rendering operative said differentiation circuit means in only a time when those of the outputs from said image sensing means which correspond to a predetermined detection region previously set to said image are applied to said differentiation circuit means, and rendering substantially inoperative said differentiation circuit means except in that time.

23. A system according to claim 20, wherein said differentiation circuit means is arbitrarily adjustable in its differentiation constant, and said system further including:
  differentiation constant adjusting means for adjusting the differentiation constant of said differentiation circuit means in accordance with the various optical factors of said image forming optical means.

24. A system according to claim 23, wherein said differentiation constant adjusting means is operatively related to said optical means so as to adjust the differentiation constant of said differentiation circuit means in accordance with the aperture ratio of said image forming optical means.

25. A system according to claim 24, wherein said image forming optical means is equipped with diaphragm means capable of arbitrarily adjusting the size of opening thereof, and said differentiation constant adjusting means is operatively related to said diaphragm means so as to adjust the differentiation constant of said differentiation circuit means in accordance with the size of opening of said diaphragm means.

26. A system according to claim 23, wherein said image forming optical means is equipped with diaphragm means capable of arbitrarily adjusting the size of opening thereof, and said differentiation constant adjusting means is operatively related to said diaphragm means so as to adjust the differentiation constant of said differentiation circuit means in accordance with the size of opening of said diaphragm means.

27. A system according to claim 1, further comprising:
  image signal level adjusting means provided between said image sensing means and said illuminance difference detecting means to adjust the level of the image signal to be applied to said illuminance difference detecting means, said image signal level adjusting means receptive of the output of said image sensing means for adding its electrical signals for every desired number of consecutive elements in said array of a plurality of radiation sensitive elements to produce signals which are then applied to said illuminance difference detecting means, whereby the level of the image signal to be applied to said illuminance difference detecting means is adjusted.

28. A system according to claim 27, further comprising:
  addition control means responsive to the level of output of said image sensing means for controlling the number of radiation sensitive elements whose electrical signals are added together in said image signal level adjusting means.

29. A system according to claim 1, wherein said radiation sensitive elements in said image sensing means are signal integration and storing type radiation sensitive elements, and said system further comprising:
  integration time control means for controlling the signal integration time of said radiation sensitive elements on the basis of the illuminance of said image on said image-sensing means.

30. A system according to claim 29, wherein said integration time control means is arranged to control said signal integration time on the basis of the level of output of said image-sensing means.

31. A system according to claim 30, wherein said integration time control means is arranged upon comparison of the level of output of said-image sensing means with a predetermined standard level to control said signal integration time based on said comparison result.

32. A system according to claim 31, wherein said image-sensing means further comprises signal output means for putting out the electrical signals of said respective radiation sensitive elements in a time-seriated manner, and said system further comprising:
  standard level setting means for obtaining said predetermined standard level through said signal output means in said image-sensing means, and wherein said integration time control means is arranged upon comparison of the level of output of said image-sensing means with said predetermined standard level obtained through said signal output means in said image sensing means by said standard level setting means to control said integration time based on said comparison result.

33. A system according to claim 31, wherein said integration time control means comprises:
  peak detecting means for detecting the peak level of output of said image sensing means;
  comparing means for comparing the peak level detected by said peak detecting means with a predetermined standard level; and
  integration time adjusting means for adjusting the said signal integration time based on the comparison result of said comparing means.

34. A system according to claim 33, wherein said image sensing means further comprises signal output means for putting out the electrical signals of said respective radiation sensitive elements in a time-seriated manner, and said system further comprising:
  standard level setting means for obtaining said predetermined standard level through said signal output means in said image sensing means, and wherein said comparing means in said integration time control means compares said peak level detected by said peak detecting means with said predetermined standard level obtained through said signal output means in said image sensing means by said standard level setting means.

35. A system according to claim 1, wherein said image sharpness output means comprises signal integrating means for integrating those of the electrical signals non-linearly transformed and absolute-value transformed by said signal transforming means which correspond to a predetermined detection region previously set to said image;
  said image sharpness output means provides said output representing said image sharpness on said image sensing means on the basis of the integration signal of said signal integrating means.

36. A system according to claim 35, wherein said image sharpness detecting means further comprises:
  integration control means for causing the integration signal of said signal integrating means to damp at a rate having a predetermined characteristic; and wherein
  said image sharpness output means provides said output representing the sharpness of said image on said image sensing means on the basis of the time measured from the start of damping of the integration signal of said signal integrating means and necessary for said integration signal to attain a predetermined level.

37. A system for detecting the sharpness of an image formed by an image forming optical means, comprising:
(A) image-sensing means for sensing the image formed by said optical means, said image-sensing means having an array of a plurality of radiation sensitive elements, the individual elements producing electrical signals corresponding to the radiations incident thereon, and said image-sensing means having as its output to provide the electrical signals of the respective elements in a time-seriated manner;
(B) illuminance difference detecting means for providing electrical signals representing illuminance differences in the individual minute compartments of said image based on the output of said image-sensing means;
(C) signal transforming means for non-linear transformation and absolute-value transformation of the electrical signals provided by said illuminance difference detecting means;
(D) transformation control means for controlling the signal transforming operation of said signal transforming means, said transformation control means controlling the signal non-linear transforming operation of said signal transforming means so as to differ non-linear transformation of those of the signals provided by said illuminance difference detecting means which correspond to a predetermined detection region previously set to said image with respect to the different positions of the individual minute image compartments within said predetermined detection region; and
(E) image sharpness output means for providing an output representing the sharpness of said image on said image-sensing means based on the non-linearly transformed and absolute-value transformed electrical signals by said signal transforming means.

38. A system according to claim 37, wherein said transformation control means controls the signal non-linear transforming operation of said signal transforming means so as to give a higher emphasis to the signals corresponding to a central portion of said prescribed detection region than to the signals corresponding to the marginal portion of said prescribed detection region.

39. A system according to claim 37 or 38, wherein said transformation control means has means sensible to the change of ambient temperature, and controls the signal non-linear transforming operation of said signal transforming means for the signals corresponding to at least said prescribed detection region to further accord with the ambient temperature on the basis of the output of said temperature sensitive element.

40. A system for detecting the sharpness of an image formed by an image forming optical means, comprising:
(A) image-sensing means for sensing the image formed by said optical means, said image-sensing means having an array of a plurality of radiation sensitive elements, the individual elements producing electrical signals corresponding to the radiations incident thereon, and said image-sensing means having as its output to provide the electrical signals of the respective elements in a time-seriated manner;
(B) illuminance difference detecting means for providing electrical signals representing illuminance differences in the individual minute compartments of said image based on the output of said image-sensing means;
(C) signal transforming means for non-linear transformation and absolute-value transformation of the electrical signals provided by said illuminance difference detecting means;
(D) transformation control means for controlling the signal transforming operation of said signal transforming means, said transformation control means having means sensible to the change of ambient temperature and controlling the signal non-linear transforming operation of said signal transforming means for the electrical signal provided by said illuminance difference detecting means to accord with the ambient temperature on the basis of the output of said temperature sensitive means; and
(E) image sharpness output means for providing an output representing the sharpness of said image on said image sensing means based on the non-linearly transformed and absolute-value transformed electrical signals by said signal transforming means.

41. A system for detecting the sharpness of an image formed by an image forming optical means, comprising:
(A) image sensing-means for sensing the image formed by said optical means, said image-sensing means having an array of a plurality of radiation sensitive elements, the individual elements producing electrical signals corresponding to the radiations incident thereon, and said image-sensing means having as its output to provide the electrical signals of the respective elements in a time-seriated manner;
(B) differentiating circuit means for providing electrical signals representing illuminance difference in the individual minute compartments of said image based on the output of said image-sensing means;
(C) differentiating operation control means for controlling the signal differentiating operation of said differentiation circuit means, said differentiating operation conrol means rendering operative said differentiation circuit means in only a time when those of the outputs from said image-sensing means which correspond to a predetermined detection region previously set to said image are applied to said differentiation circuit means and rendering substantially inoperative said differentiation circuit means except in that time.
(D) signal transforming means for non-linear transformation and absolute-value transformation of the electrical signals provided by said differentiation circuit means; and
(E) image sharpness output means for providing an output representing the sharpness of said image on said image-sensing means based on the non-linearly transformed and absolute-value transformed electrical signals by said signal transforming means.

42. A system according to claim 41, wherein said differentiation circuit means is arbitrarily adjustable in its differentiation constant, and said system further comprising:
differentiation constant adjusting means for adjusting the differentiation constant of said differentiation circuit means in accordance with the various optical factors of said image forming optical means.

43. A system according to claim 42, wherein said differentiation constant adjusting means is operatively related to said optical means so as to adjust the differentiation constant of said differentiation circuit means in accordance with the aperture ratio of said image forming optical means.

44. A system according to claim 42 or 43, wherein said image forming optical means is equipped with diaphragm means capable of arbitrarily adjusting the size of opening thereof, and said differentiation constant adjusting means is operatively related to said diaphragm means so as to adjust the differentiation constant of said differentiation circuit means in accordance with the size of opening of said diaphragm means.

45. A system for detecting the sharpness of an image formed by an image forming optical means, comprising:
(A) image sensing-means for sensing the image formed by said optical means, said image-sensing means having an array of a plurality of radiation sensitive elements, the individual elements producing electrical signals corresponding to the radiation incident thereon, and said image-sensing means having as its output to provide the electrical signals of the respective elements in a time-seriated manner;
(B) differentiating circuit means for providing electrical signals representing illuminance difference in the individual minute compartments of said image based on the output of said image-sensing means, said differentiation circuit means having its differentiation constant arbitrarily adjustable;
(C) differentiation constant adjusting means for adjusting the differentiation constant of said differentiation circuit means in accordance with the aperture ratio of said image forming optical means;
(D) signal transforming means for non-linear transformation and absolute-value transformation of the electrical signals provided by said differentiation circuit means; and
(E) image sharpness output means for providing an output representing the sharpness of said image on said image-sensing means based on the non-linearly transformed and absolute-value transformed electrical signals by said signal transforming means.

46. A system according to claim 45, wherein said differentiation constant adjusting means is operatively related to said optical means so as to adjust the differentiation constant of said differentiation circuit means in accordance with the aperture ratio of said image forming optical means.

47. A system according to claim 45 or 46, wherein said image forming optical means is equipped with diaphragm means capable of arbitrarily adjusting the size of opening thereof, and said differentiation constant adjusting means is operatively related to said diaphragm means so as to adjust the differentiation constant of said differentiation circuit means in accordance with the size of opening of said diaphragm means.

48. A system for detecting the sharpness of an image formed by an image forming optical means, comprising:
(A) image sensing means for sensing the image formed by said optical means, said image-sensing means having an array of a plurality of radiation sensitive elements, the individual elements producing electrical signals corresponding to the radiation incident thereon, and said image-sensing means having as its output to provide the electrical signals of the respective elements in a time-seriated manner;
(B) illuminance difference detecting means for providing electrical signal representing illuminance difference in the individual minute compartments of said image based on the output of said image-sensing means;
(C) signal transforming means for non-linear transformation and absolute-value transformation of the electrical signals provided by said illuminance difference detecting means; and
(D) image sharpness output means for providing an output representing the sharpness of said image on said image-sensing means based on the non-linearly transformed and absolute-value transformed electrical signals by said signal transforming means, said image sharpness output means comprising
signal integrating means for integrating those of the electrical signals non-linearly transformed and absolute-value transformed by said signal transforming means which correspond to a predetermined detection region previously set to said image; and
integration control means for causing the integration signal of said signal integrating means to damp at a rate having a predetermined characteristic whereby said image sharpness output means provides said output representing the sharpness of said image on said image-sensing means on the basis of the time measured from the start of damping of the integration signal of said signal integrating means and necessary for said integration signal to attain a predetermined level.

49. A system for scanning an image formed by an image forming optical means, comprising:
(A) image scanning means for scanning the image formed by said optical means, said image scanning means having an array of a plurality of radiation sensitive elements, the individual elements producing electrical signals corresponding to the radiations incident thereon, and said image scanning means having as its output to provide the electrical signals of the respective elements in a time-seriated manner; and
(B) image signal level adjusting means for adjusting the level of the image signal obtained by the output of said image scanning means, said image signal level adjusting means receptive of the output of said image scanning means for adding its electrical signals for every arbitrary number of consecutive elements in said array of the plurality of radiation sensitive elements in said image scanning means to produce output signals, whereby said added signals are produced as said image signal to adjust the level of said image signal given on the basis of the output of said image scanning means.

50. A system according to claim 49, further comprising:
addition control means responsive to the level of output of said image scanning means for controlling the number of radiation sensitive elements whose electrical signals are added together in said image signal level adjusting means.

51. A system according to claim 49 or 50, wherein said radiation sensitive elements in said image scanning means are signal integration and storing type radiation sensitive elements, and said system further comprising:

integration time control means for controlling the signal integration time of said radiation sensitive elements on the basis of the illuminance of said image on said image scanning means.

52. A system according to claim 51, wherein said integration time control means is arranged to control said signal integration time on the basis of the level of output of said image scanning means.

53. A system according to claim 52, wherein said integration time control means is arranged upon comparison of the level of output of said image scanning means with a predetermined standard level to control said signal integration time based on said comparison result.

54. A system according to claim 53, wherein said image scanning means further comprises signal output means for putting out the electrical signals of said respective radiation sensitive elements in a time-seriated manner, and said system further comprising:
   standard level setting means for obtaining said predetermined standard level through said signal output means in said image scanning means, and wherein said integration time control means is arranged upon comparison of the level of output of said image-sensing means with said predetermined standard level obtained through said signal output means in said image scanning means by said standard level setting means to control said integration time based on said comparison result.

55. A system according to claim 53, wherein said integration time control means comprises:
   peak detecting means for detecting the peak level of output of said image scanning means;
   comparing means for comparing the peak level detected by said peak detecting means with a predetermined standard level; and
   integration time adjusting means for adjusting the said signal integration time based on the comparison result of said comparing means.

56. A system according to claim 55, wherein said image scanning means further comprises signal output means for putting out the electrical signals of said respective radiation sensitive elements in a time-seriated manner, and said system further comprising:
   standard level setting means for obtaining said predetermined standard level through said signal output means in said image scanning means, and wherein said comparing means in said integration time control means compared said peak level detected by said peak detecting means with said predetermined standard level obtained through said signal output means in said image scanning means by said standard level setting means.

57. A system for scanning an image formed by an image forming optical means, comprising:
   (A) image scanning means for scanning the image formed by said image forming optical means, said image scanning means comprising:
      a plurality of signal integrating and storing type radiation sensitive elements, each element providing an electrical signal corresponding to the amount of incident radiation integrated; and
      signal output means for putting out the electrical signals of the respective elements in a time-seriated manner;
   (B) standard level setting means for obtaining a standard level through said signal output means in said image scanning means; and
   (C) integration time control means for controlling the signal integration time of said radiation sensitive elements in said image scanning means, said integration time control means comparing the level of output of said image scanning means with said standard level obtained by said standard level setting means through said signal output means in said image scanning means and controlling said signal integration time based on said comparison result.

58. A system according to claim 57, wherein said integration time control means comprises:
   peak detecting means for detecting the peak level of output of said image scanning means;
   comparing means for comparing the peak level detected by said peak detecting means with a predetermined standard level; and
   integration time adjusting means for adjusting said signal integration time based on the comparison result of said comparing means.

59. A system according to claim 36, wherein said damping rate has a characteristic such that the rate is constant with respect to the change in time.

60. A system according to claim 36, wherein said damping rate has a characteristic such that the rate varies in dependence upon the change in time.

61. A system according to claim 48, wherein said damping rate has a characteristic such that the rate is constant with respect to the change in time.

62. A system according to claim 48, wherein said damping rate has a characteristic such that the rate varies in dependence upon the change in time.

63. A system according to claim 60, wherein said integration control means is arranged to exponentially damp said integration signal of said signal integrating means.

64. A system according to claim 36 or 37 or 59 or 60, wherein said image sharpness output means further comprises:
   digitalizing means for converting said time measured from the start of damping of the integration signal of said signal integrating means and necessary for said integration signal to attain a predetermined level to a corresponding number of pulses; and
   said image sharpness output means provides said output representing the sharpness of said image on said image-sensing means on the basis of the output of said digitalizing means in the form of a digital word.

65. A system according to claim 64, wherein said signal integrating means is a dual-slope integrating means, said dual-slope integrating means having first and second slope modes, whereby when in said first slope mode, the signal corresponding to said predetermined detection region is integrated, and when in said second slope mode, said integration signal is reverse-integrated as is damping at said damping rate.

66. A system according to claim 36 or 63 or 59 or 60, wherein said signal integrating means is a dual-slope integrating means, said dual-slope integrating means having first and second slope modes, whereby when in said first slope mode, the signal corresponding to said predetermined direction region is integrated, and when in said second slope mode, said integration signal is reverse-integrated as is damping at said damping rate.

67. A system according to claim 62, wherein said integration control means is arranged to exponentially damp said integration signal of said signal integrating means.

68. A system according to claim 48 or 67 or 61 or 62, wherein said image sharpness output means further comprises:

digitalizing means for converting said time measured from the start of damping of the integration signal of said signal integrating means, and necessary for said integration signal to attain a predetermined level to a corresponding number of pulses; and said image sharpness output means provides said output representing the sharpness of said image on said image-sensing means on the basis of the output of said digitalizing means in the form of a digital word.

69. A system according to claim 68, wherein said signal integrating means is a dual-slope integrating means, said dual-slope integrating means having first and second slope modes, whereby when in said first slope mode, the signal corresponding to said predetermined detection region is integrated, and when in said second slope mode, said integration signal is reverse-integrated as is damping at said damping rate.

70. A system according to claim 48 or 67 or 61 or 62, wherein said signal integrating means is dual-slope integrating means, said dual-slope integrating means having first and second slope modes, whereby when in said first slope mode, the signal corresponding to said predetermined detection region is integrated, and when in said second slope mode, said integration signal is reverse-integrated as is damping at said damping rate.

71. A system according to claim 48 or 61 or 62 or 67, wherein said image sharpness output means further comprises:

comparing means for comparing the integration signal of said signal integration means with said predetermined level to detect whether the integration signal attains the predetermined level at the time of damping of the integration signal.

72. A system according to claim 71, wherein said image sharpness output means further comprises:

compensating means for compensating for the offset voltage of said signal integration means and said comparing means.

73. A system according to claim 72, wherein said compensating means includes:

a memory element for memorizing, as an offset compensation signal, the output of the comparing means at the time of resetting the signal integration means.

74. A system according to claim 72, wherein said signal integration means includes a memory element for memorizing the integration signal; and said compensating means includes a feed-back circuit for providing said memory element in the signal integration means with the output of the comparing means at the time of resetting the signal integrating means.

75. A system according to claim 69, wherein said image sharpness output means further comprises:

comparing means for comparing the integration signal of said signal integration means with said predetermined level to detect whether the integration signal attains the predetermined level at the time of damping of the integration signal.

76. A system according to claim 75, wherein said image sharpness output means further comprises:

compensating means for compensating for the offset voltage of said signal integrating means and said comparing means.

77. A system according to claim 76, wherein said compensating means includes:

a memory element for memorizing, as an offset compensation signal, the output of the comparing means at the time of resetting the signal integration means.

78. A system according to claim 76, wherein said signal integration means includes a memory element for memorizing the integration signal; and said compensating means includes a feed-back circuit for providing said memory element in the signal integration means with the output of the comparing means at the time of resetting the signal integrating means.

79. A system according to claim 70, wherein said image sharpness output means further comprises:

comparing means for comparing the integration signal of said signal integration means with said predetermined level to detect whether the integration signal attains the predetermined level at the time of damping of the integration signal.

80. A system according to claim 79, wherein said image sharpness output means further comprises:

compensating means for compensating for the offset voltage of said signal integration means and said comparing means.

81. A system according to claim 80, wherein said compensating means includes:

a memory element for memorizing, as an offset compensation signal, the output of the comparing means at the time of resetting the signal integration means.

82. A system according to claim 81, wherein said signal integration means includes a memory element for memorizing the integration signal; and said compensating means includes a feed-back circuit for providing said memory element in the signal integration means with the output of the comparing means at the time of resetting the signal integrating means.

83. A system according to claim 21, wherein said differentiation circuit means is arbitrarily adjustable in its differentiation constant, and said system further including:

differentiation constant adjusting means for adjusting the differentiation constant of said differentiation circuit means in accordance with the various optical factors of said image forming optical means.

84. A system as in claim 83, wherein said differentiation constant adjusting means is operatively related to said optical means so as to adjust the differentiation constant of said differentiation circuit means in accordance with the aperture ratio of said image forming optical means.

85. A system as in claim 84, wherein said image forming optical means is equipped with diaphragm means capable of arbitrarily adjusting the size of the opening thereof, and said differentiation constant adjusting means is operatively related to said diaphragm means so as to adjust the differentiation constant of said differentiation circuit means in accordance with the size of the opening of said diaphragm means.

86. A system as in claim 83, wherein said image forming optical means is equipped with diaphragm means capable of arbitrarily adjusting the size of the opening thereof, and said differentiation constant adjustment means is operatively related to said diaphragm means so as to adjust the differentiation constant of said differentiation circuit means in accordance with the size of the opening of said diaphragm means.

* * * * *